(12) United States Patent
Karanikos et al.

(10) Patent No.: US 12,368,322 B2
(45) Date of Patent: *Jul. 22, 2025

(54) FOLDABLE AND RIGID DOCKING STATIONS FOR CHARGING MULTIPLE DEVICES

(71) Applicant: Apple Inc., Cupertino, CA (US)

(72) Inventors: Demetrios B. Karanikos, San Francisco, CA (US); Christopher J. Walton, Sunnyvale, CA (US); Grant S. Haug, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 830 days.

This patent is subject to a terminal disclaimer.

(21) Appl. No.: 17/483,485

(22) Filed: Sep. 23, 2021

(65) Prior Publication Data

US 2022/0094202 A1 Mar. 24, 2022

Related U.S. Application Data

(60) Provisional application No. 63/082,263, filed on Sep. 23, 2020.

(51) Int. Cl.
*H02J 7/00* (2006.01)
*H02J 50/00* (2016.01)
(Continued)

(52) U.S. Cl.
CPC .......... *H02J 50/005* (2020.01); *H02J 7/0044* (2013.01); *H02J 50/10* (2016.02); *H02J 50/402* (2020.01); *H02J 2310/22* (2020.01)

(58) Field of Classification Search
USPC ...................................................... 320/108
See application file for complete search history.

(56) References Cited

U.S. PATENT DOCUMENTS 6,888,940 B1 5/2005 Deppen
8,073,324 B2 12/2011 Tsai
(Continued)

FOREIGN PATENT DOCUMENTS

CN 102640379 A 8/2012
CN 104467129 A 3/2015
(Continued)

OTHER PUBLICATIONS

Machine Translation of CN209001603 U (Year: 2019).*
(Continued)

*Primary Examiner* — Samuel Berhanu
(74) *Attorney, Agent, or Firm* — Kilpatrick Townsend & Stockton LLP

(57) ABSTRACT

Wireless chargers that can properly align and securely hold an electronic device, provide power to more than one electronic device, and fold into a compact shape. One example can provide a wireless charger having an alignment feature to align an electronic device to the wireless charger. The wireless charger can further include an attachment feature to attach the electronic device to the wireless charger such that the electronic device is securely held in place relative to the wireless charger. The wireless charger can include a first leaf having first charging components for charging a first electronic device and a second leaf having second charging components for charging a second electronic device. The first leaf and the second leaf can fold together into a compact shape.

17 Claims, 70 Drawing Sheets

(51) Int. Cl.
*H02J 50/10* (2016.01)
*H02J 50/40* (2016.01)

(56) References Cited

U.S. PATENT DOCUMENTS

| | | | |
|---|---|---|---|
| 8,193,781 B2* | 6/2012 | Lin | H02K 35/02 336/200 |
| 8,558,411 B2 | 10/2013 | Baarman | |
| 8,688,037 B2 | 4/2014 | Chatterjee et al. | |
| 8,907,752 B2 | 12/2014 | Wodrich et al. | |
| 8,912,686 B2 | 12/2014 | Stoner et al. | |
| 9,038,971 B1 | 5/2015 | Guthrie | |
| 9,106,083 B2 | 8/2015 | Partovi | |
| 9,112,364 B2 | 8/2015 | Partovi | |
| 9,413,191 B2 | 8/2016 | Kim et al. | |
| 9,627,130 B2 | 4/2017 | Golko et al. | |
| 10,153,666 B2 | 12/2018 | Lee et al. | |
| 10,243,402 B2 | 3/2019 | Park et al. | |
| 10,273,942 B2 | 4/2019 | Nakamura | |
| 10,298,037 B2 | 5/2019 | Wang et al. | |
| 10,404,089 B2 | 9/2019 | Kasar et al. | |
| 10,418,839 B2 | 9/2019 | Miller et al. | |
| 10,491,041 B2 | 11/2019 | Wittenberg et al. | |
| 10,615,552 B2 | 4/2020 | Miller et al. | |
| 10,622,842 B2 | 4/2020 | Lee et al. | |
| 11,342,800 B2 | 5/2022 | Oro et al. | |
| 2009/0212637 A1 | 8/2009 | Baarman et al. | |
| 2009/0278642 A1 | 11/2009 | Fullerton et al. | |
| 2010/0081377 A1 | 4/2010 | Chatterjee et al. | |
| 2011/0050164 A1* | 3/2011 | Partovi | H02J 50/402 320/108 |
| 2011/0057629 A1 | 3/2011 | Lin et al. | |
| 2012/0068942 A1 | 3/2012 | Lauder | |
| 2012/0112553 A1 | 5/2012 | Stoner, Jr. et al. | |
| 2012/0146576 A1 | 6/2012 | Partovi | |
| 2012/0306440 A1 | 12/2012 | Yeh | |
| 2013/0099730 A1 | 4/2013 | Yoon | |
| 2013/0113423 A1 | 5/2013 | Baarman | |
| 2013/0187596 A1 | 7/2013 | Eastlack | |
| 2013/0260677 A1 | 10/2013 | Partovi | |
| 2014/0242429 A1 | 8/2014 | Lee | |
| 2016/0058206 A1* | 3/2016 | Schwalbach | H02J 7/0042 361/752 |
| 2016/0094076 A1 | 3/2016 | Kasar et al. | |
| 2016/0103534 A1 | 4/2016 | Zhang et al. | |
| 2016/0105047 A1 | 4/2016 | Cui | |
| 2016/0128210 A1 | 5/2016 | Lee | |
| 2016/0206065 A1 | 7/2016 | Ehrlich | |
| 2017/0005399 A1 | 1/2017 | Ito et al. | |
| 2017/0070076 A1 | 3/2017 | Karanikos | |
| 2017/0237280 A1* | 8/2017 | Baarman | H02J 50/12 320/108 |
| 2017/0245040 A1 | 8/2017 | Hankey | |
| 2018/0248406 A1 | 8/2018 | Bae et al. | |
| 2018/0301936 A1 | 10/2018 | Lee et al. | |
| 2019/0089188 A1 | 3/2019 | Chien et al. | |
| 2019/0198212 A1 | 6/2019 | Levy | |
| 2019/0363565 A1 | 11/2019 | Graham et al. | |
| 2020/0259368 A1 | 8/2020 | Miller et al. | |
| 2020/0346006 A1 | 11/2020 | Eigentler et al. | |
| 2021/0099026 A1 | 4/2021 | Larsson | |
| 2021/0099027 A1 | 4/2021 | Larsson | |
| 2022/0014655 A1 | 1/2022 | Hu | |

FOREIGN PATENT DOCUMENTS

| | | |
|---|---|---|
| CN | 205670700 U | 11/2016 |
| CN | 106505654 A | 3/2017 |
| CN | 106877429 A | 6/2017 |
| CN | 107079579 A | 8/2017 |
| CN | 207442540 U | 6/2018 |
| CN | 208352996 U | 1/2019 |
| CN | 208581077 U | 3/2019 |
| CN | 209001603 | 6/2019 |
| CN | 210201503 U | 3/2020 |
| EP | 0823717 A2 | 2/1998 |
| JP | 2012019666 A | 1/2012 |
| JP | 2013500692 A | 1/2013 |
| JP | 2013120837 A | 6/2013 |
| JP | 3197750 U | 5/2015 |
| JP | 2015171166 A | 9/2015 |
| JP | 2017055645 A | 3/2017 |
| JP | 2017107439 A | 6/2017 |
| JP | 6233504 B2 | 11/2017 |
| KR | 20140098239 A | 8/2014 |
| KR | 20190028809 A | 3/2019 |
| TW | M414057 U | 10/2011 |
| TW | 201347349 A | 11/2013 |
| TW | 201711335 A | 3/2017 |
| WO | 2010129369 A2 | 11/2010 |
| WO | 2011156768 A2 | 12/2011 |
| WO | 2016053633 A1 | 4/2016 |
| WO | 2017065272 A1 | 4/2017 |

OTHER PUBLICATIONS

Machine Translation of 210201503 (Year: 2019).*
Korean Patent Application No. 10-2021-0125792 , "Office Action", Jun. 29, 2023, 4 pages.
Indian Patent Application No. 202114042856, First Examination Report mailed on Mar. 29, 2022, 5 pages.
Japanese Patent Application No. 2021-154566, Office Action (English Translation) dated Aug. 19, 2022, 4 pages.
CES 2020: Satechi Launches New Trio Wireless Charging Pad, U.S.A., MacRumors, Jan. 7, 2020, 7 pages.
Japanese Patent Application No. 2021-154566, Office Action (English Translation) mailed Jan. 23, 2023, 6 pages.
Chinese Patent Application No. 202111112283.5 , "Office Action", Aug. 6, 2024, 23 pages.
Korean Patent Application No. 10-2021-0125792 , "Notice of Decision to Grant", Jun. 7, 2024, 4 pages.

* cited by examiner

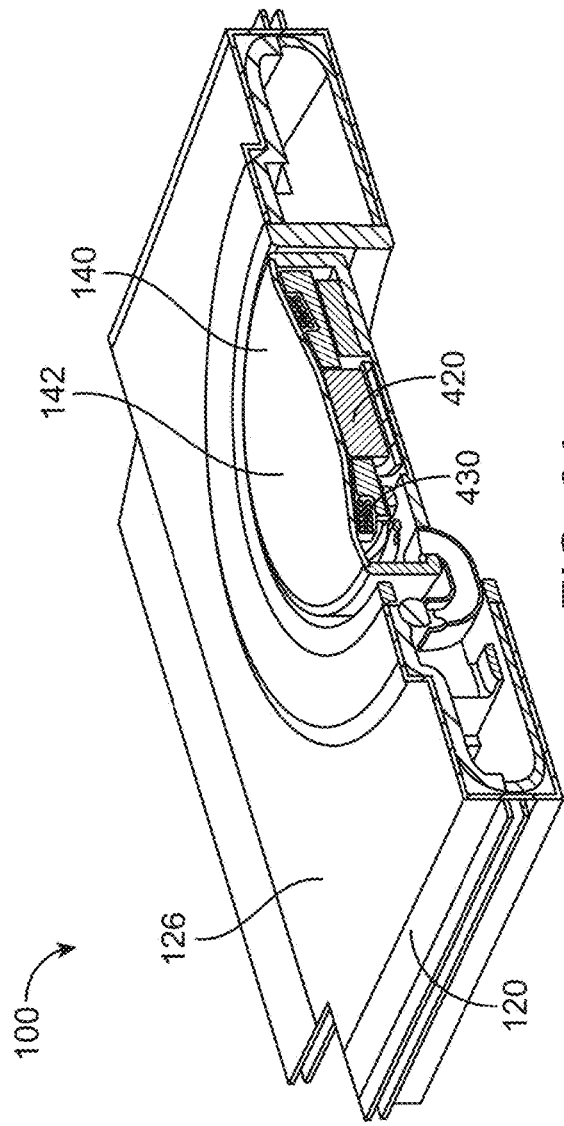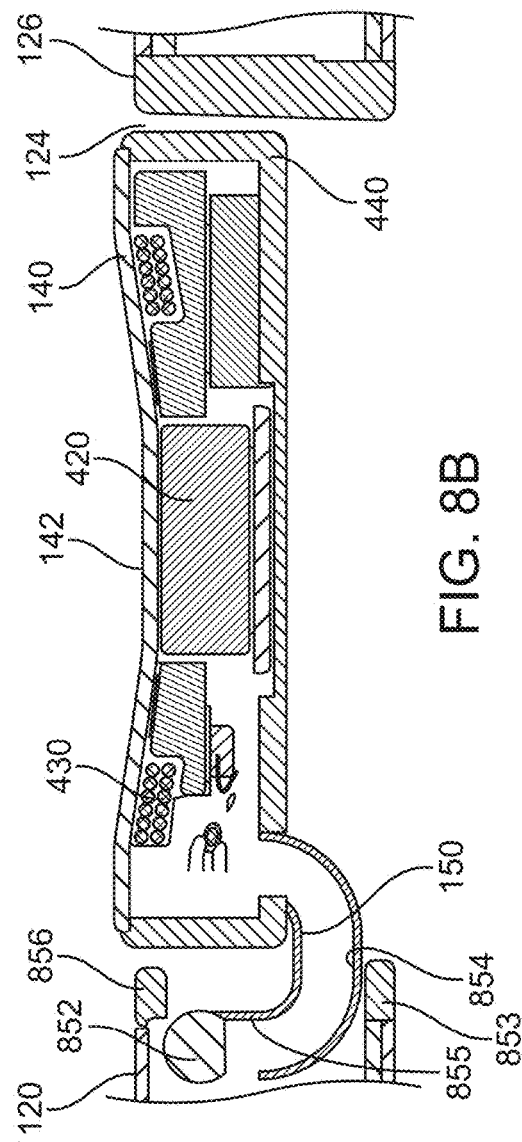

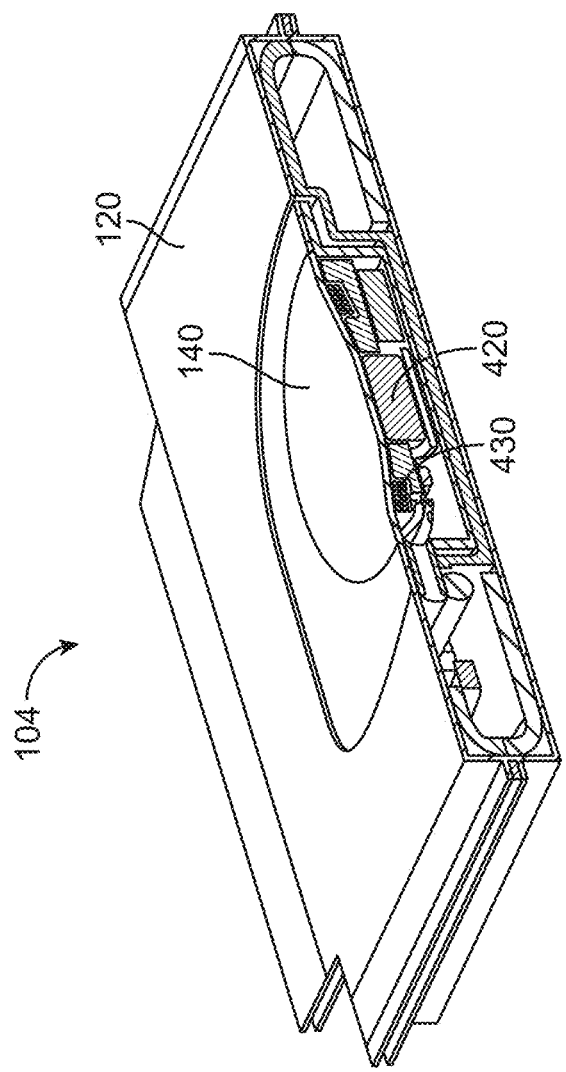
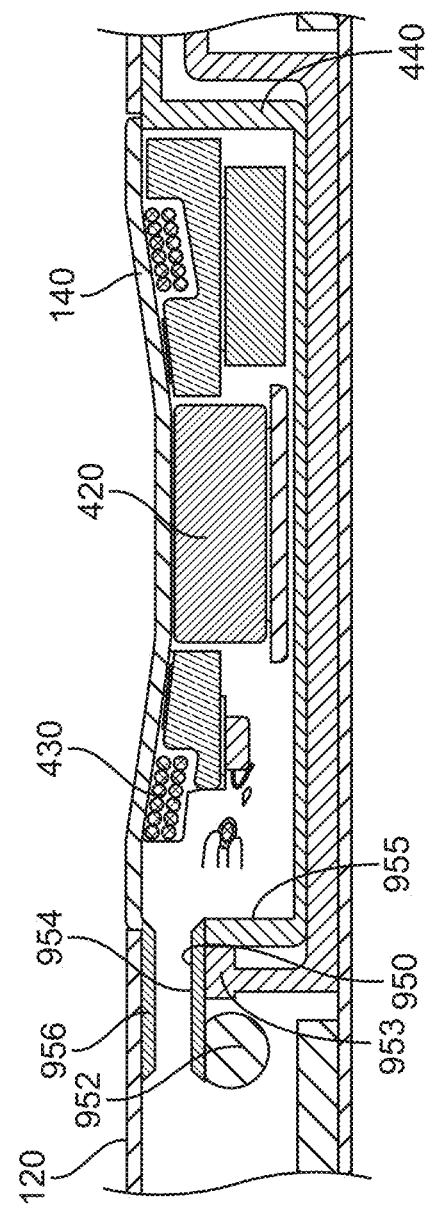
FIG. 9A
FIG. 9B

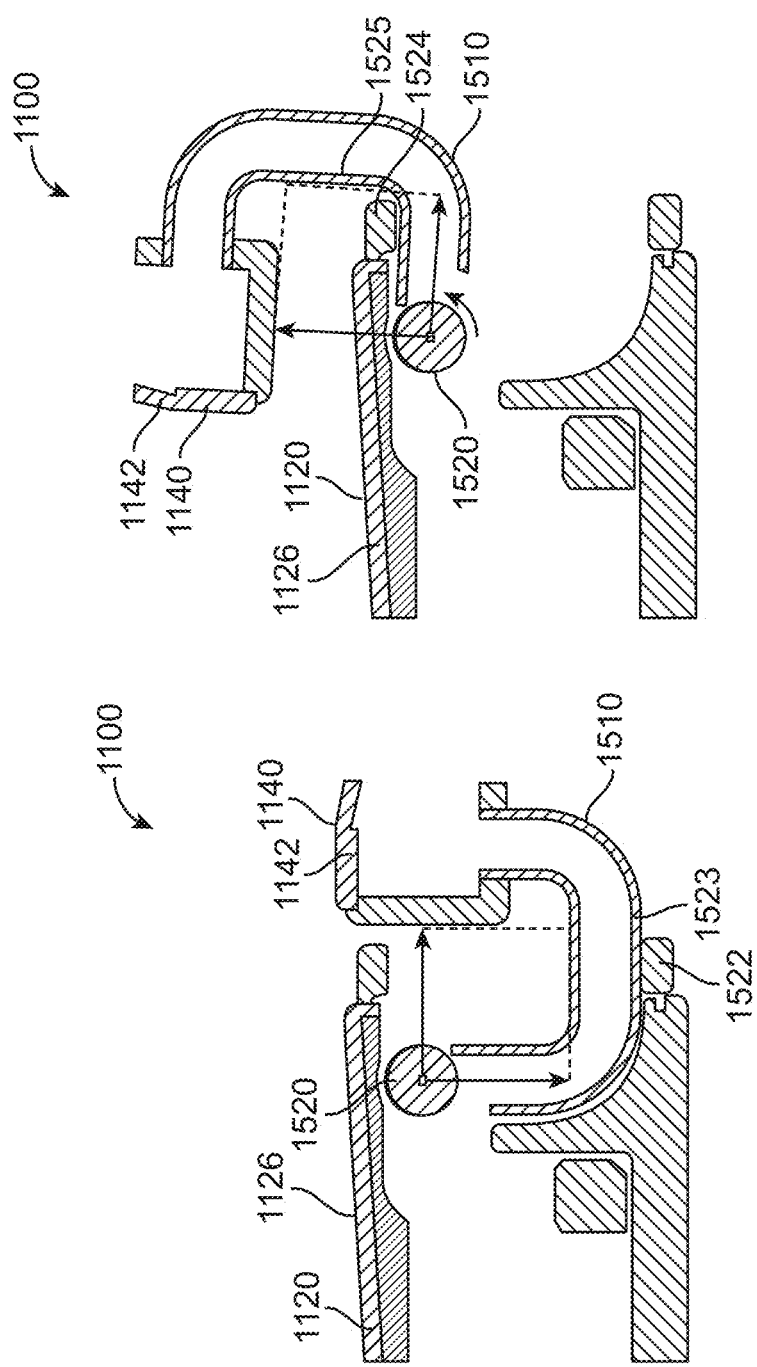

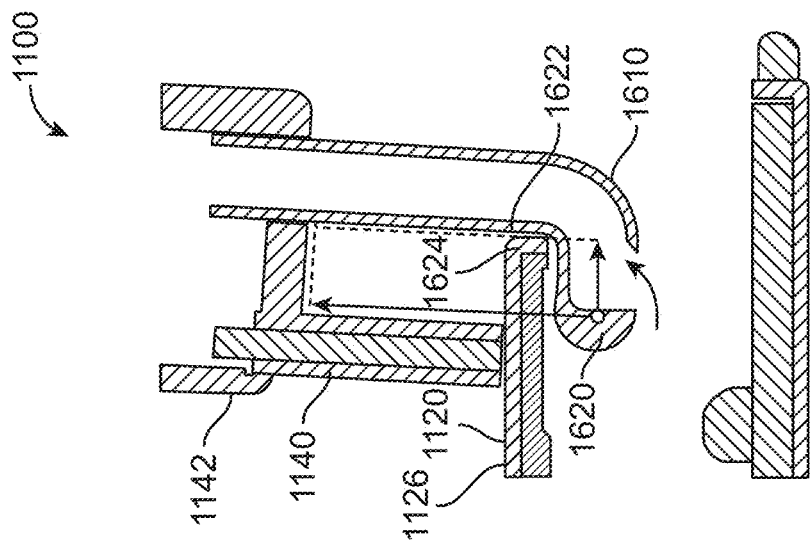
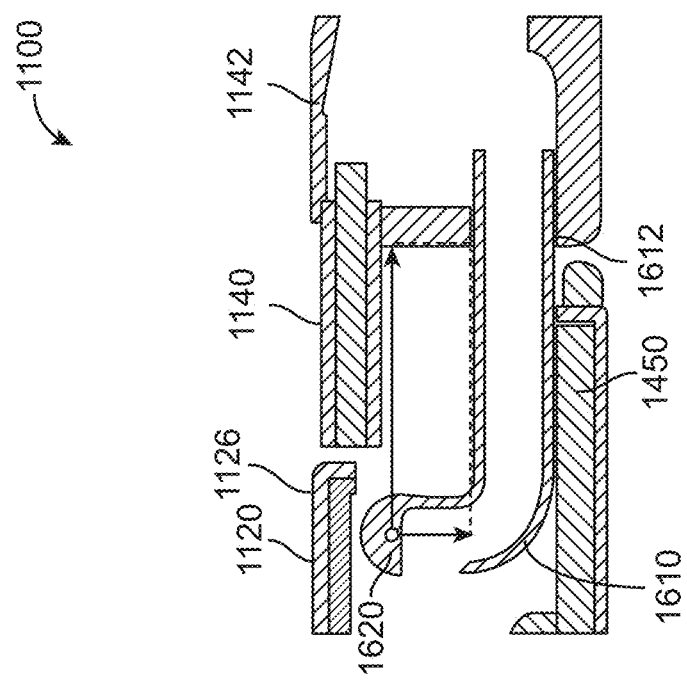
FIG. 16A
FIG. 16B

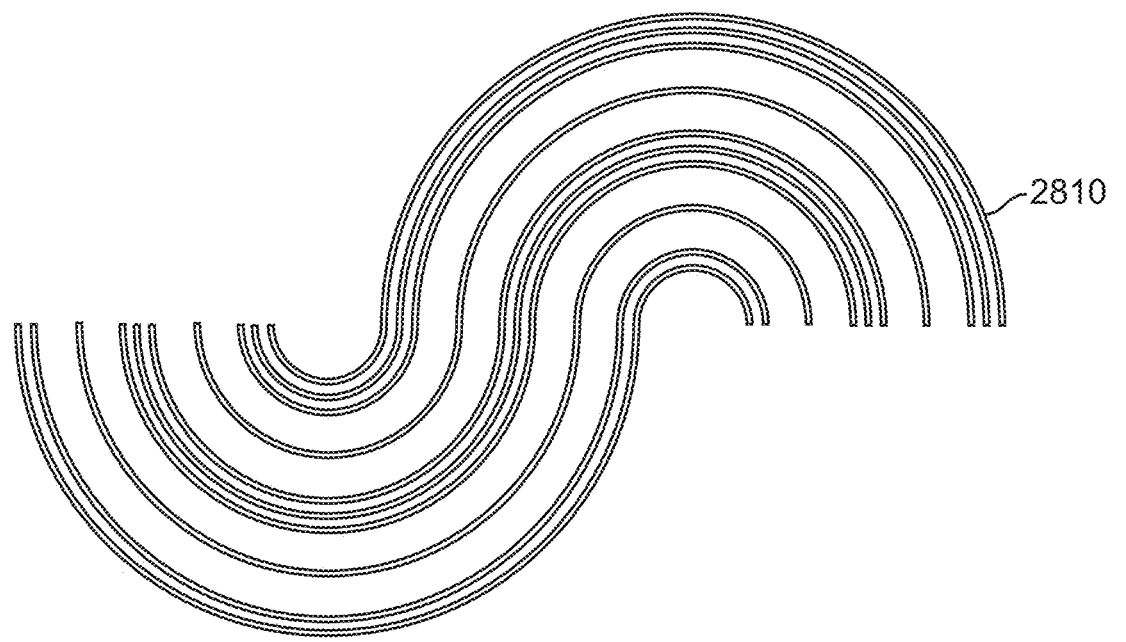
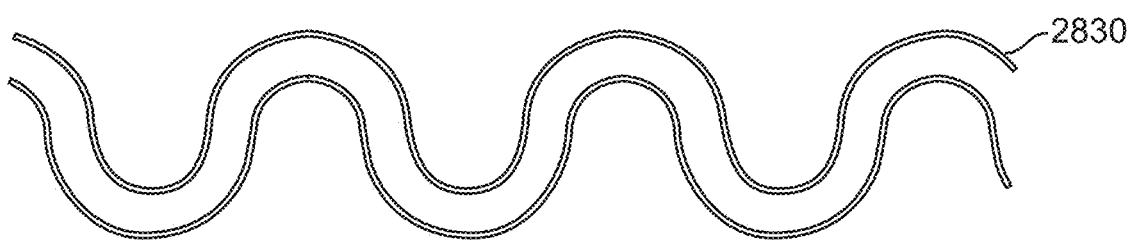
FIG. 28A

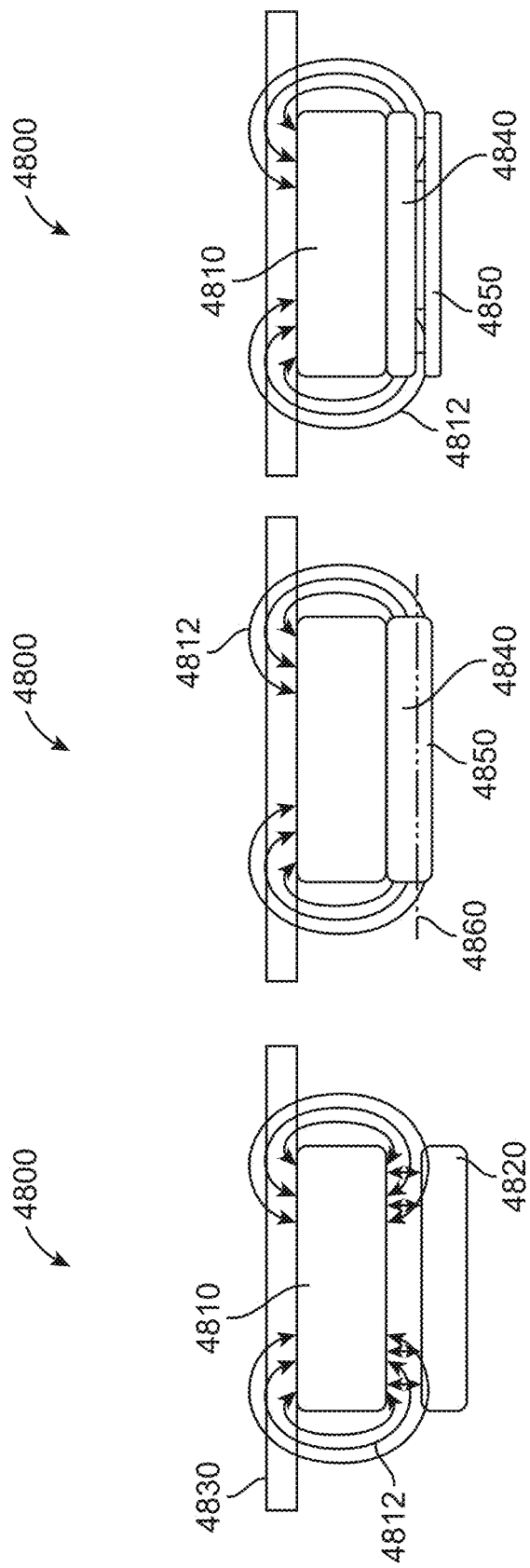

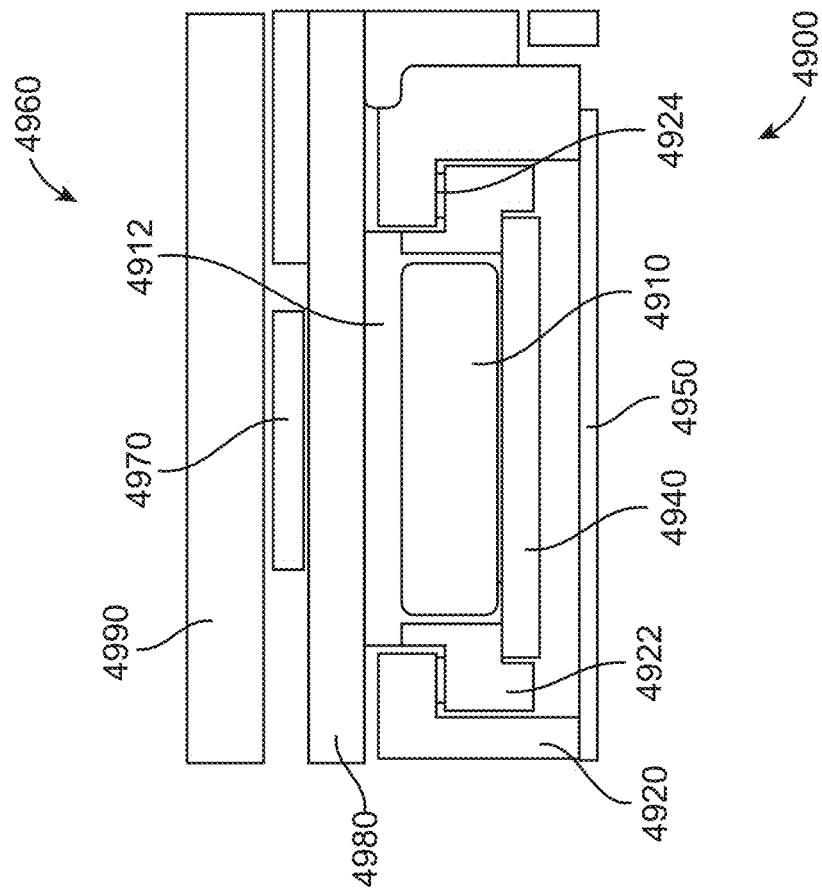
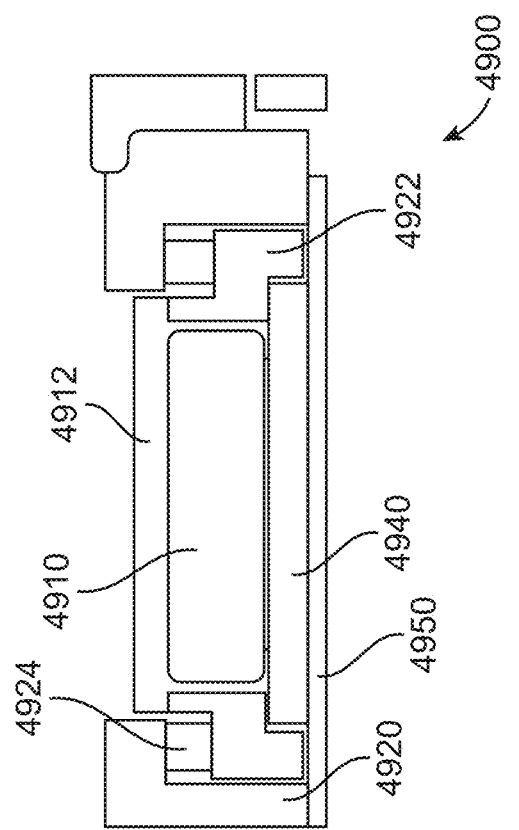
FIG. 49B
FIG. 49A

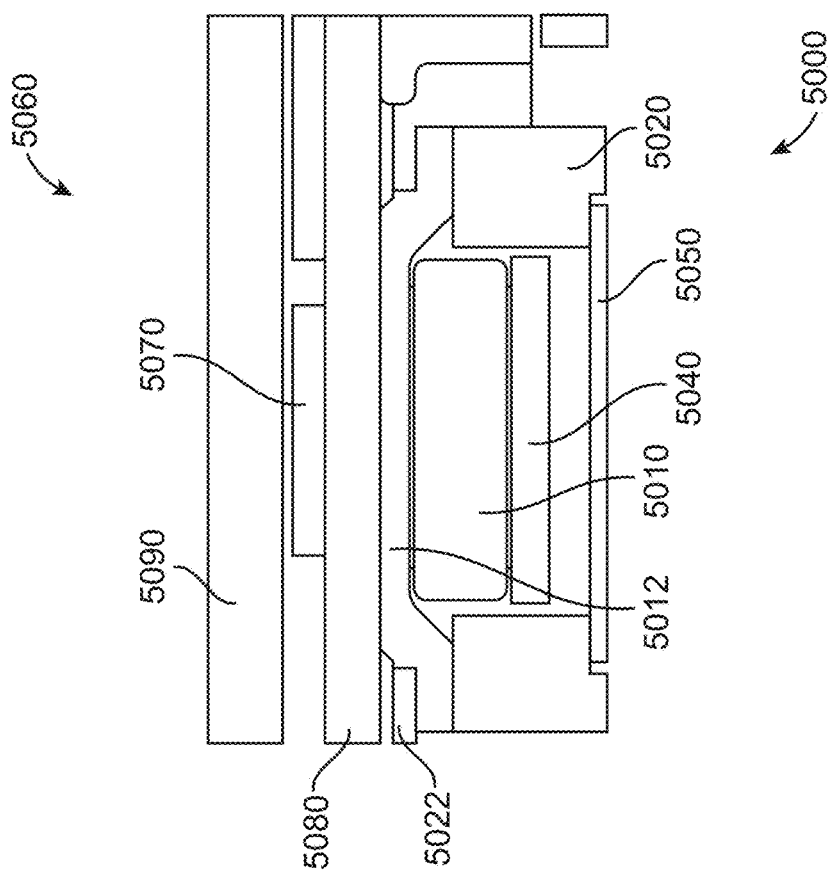
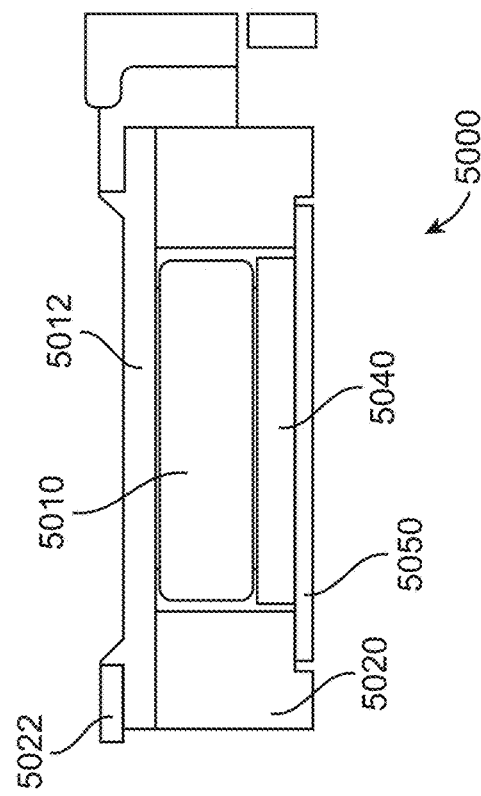
FIG. 50B
FIG. 50A

FOLDABLE AND RIGID DOCKING STATIONS FOR CHARGING MULTIPLE DEVICES

CROSS-REFERENCES TO RELATED APPLICATIONS

The present application claims the benefit of and priority to U.S. Provisional Application No. 63/082,263, filed Sep. 23, 2020, which is incorporated by reference.

BACKGROUND

Electronic devices have become ubiquitous over the past several years. We take them wherever we go. An electronic device can be integral to some of our actives, such as checking email, watching a video, or catching up on news. An electronic device can also be a supplement to some of our activities, such as when providing email updates or acting as a meeting reminder.

These electronic devices need to be charged periodically. Every so often, a cable needs to be inserted into the electronic device or the electronic device needs to be put on a wireless charger in order to charge a battery internal to or otherwise associated with the electronic device.

When an electronic device is placed on a wireless charger, it can be desirable that charging electronics in the electronic device properly align to electronics in the wireless charger. Proper alignment can increase an efficiency of charging from the wireless charger to the electronic device, thereby saving power and decreasing charge time. But once properly aligned, the electronic device can be inadvertently jostled and moved. Accordingly, it can also be desirable that the electronic device be held securely in place relative to the wireless charger.

Charging can take place in various locations, for example, on a bedside table, in a hotel room while traveling, at work, in coffee shops, and other locations. As a result, it can be desirable to bring these wireless chargers along. To facilitate this, it can be desirable that the wireless chargers fold up or otherwise close into a compact form.

These electronic devices are so popular that it is often desirable to be able to charge more than one device at a time. Accordingly, it can be desirable that wireless chargers be able to charge multiple devices simultaneously.

Thus, what is needed are wireless chargers that can provide power to more than one electronic device, can properly align to and securely hold the electronic devices, and fold into a compact shape.

SUMMARY

Accordingly, embodiments of the present invention can provide wireless chargers that can provide power to more than one electronic device, can properly align to and securely hold the electronic devices, and fold into a compact shape.

An illustrative embodiment of the present invention can provide a wireless charger having an alignment feature to align an electronic device to the wireless charger. The wireless charger can further include an attachment feature to attach the electronic device to the wireless charger such that the electronic device is securely held in place relative to the wireless charger. In these and other embodiments of the present invention, the alignment feature and the attachment feature can be the same feature, though in other embodiments they can be separate features. In these and other embodiments of the present invention, more than one alignment and attachment feature can be included to align and attach more than one electronic device to the wireless charger.

An illustrative embodiment of the present invention can employ a magnet as both an alignment feature and an attachment feature. The magnet in a wireless charger can attract a corresponding magnet in an electronic device. This magnetic attraction can help to align the electronic device with the wireless charger. This magnetic attraction can also help to secure the electronic device in place relative to the wireless charger.

A coil can be located circumferentially around the magnet in the wireless charger. When the magnet in the wireless charger is aligned with the corresponding magnet in the electronic device, the coil in the wireless charger can be aligned with a corresponding coil that is circumferentially located around the corresponding magnet in the electronic device. Shielding can be included in the wireless charger to increase the coupling between the coil in the wireless charger and the coil in the electronic device to improve charging efficiency and reduce charging time.

An illustrative embodiment of the present invention employ a magnet array as both an alignment feature and an attachment feature. The magnet array in a wireless charger can attract a corresponding magnet array in an electronic device. This magnetic attraction can help to align the electronic device with the wireless charger. This magnetic attraction can also help to secure the electronic device in place relative to the wireless charger.

The magnet array can be located circumferentially around a coil in the wireless charger. When the magnet array in the wireless charger is aligned with the corresponding magnet array in the electronic device, the coil in the wireless charger can be aligned with a corresponding coil that is circumferentially surrounded by the corresponding magnet array in the electronic device. Shielding can be included in the wireless charger to increase the coupling between the coil in the wireless charger and the coil in the electronic device to improve charging efficiency and reduce charging time.

An illustrative embodiment of the present invention can provide a wireless charger that can charger more than one electronic device at a time. For example, a wireless charger can include a first leaf having first alignment, attachment, and charging components for charging a first electronic device and a second leaf having second alignment, attachment, and charging components for charging a second electronic device. The first leaf can include a first contacting surface on a top side. A magnet array can be positioned below the first contacting surface. The magnet array can laterally and circumferentially surround a first coil. A first enclosure can support the magnet array and the first coil. The first enclosure can provide shielding for the first coil and improve coupling between the first coil and a corresponding coil in the first electronic device.

The second leaf can include a charging puck for charging a second electronic device. The charging puck can include a magnet that can be positioned below a second contacting surface. The magnet can be laterally and circumferentially surrounded by a second coil. A puck enclosure can support the magnet and the second coil. The puck enclosure can provide shielding for the second coil and improve coupling between the second coil and a corresponding coil in the second electronic device.

The puck can be attached to a second enclosure in the second leaf by a puck hinge. The puck hinge can utilize a single shaft that can provide an axis of rotation whereby the charging puck can rotate above the second leaf. This can allow the puck to be in a position to attract and secure a second electronic device when the second electronic device does not have a design that allows it to readily be positioned on a flat surface. The puck hinge can allow the charging puck to move from an up position where it is above the top side of the second leaf and at or near a right angle relative to the second leaf to a down position where the charging puck resides in an opening or passage in the second leaf.

A main hinge can be used to join the first leaf to the second leaf. The main hinge can fold in a first direction such that a top side of the first leaf can be adjacent to a top side of the second leaf. The main hinge can fold in a second direction such that a bottom side of the first leaf can be adjacent to a bottom side of the second leaf. These arrangements can provide a wireless charger having a compact form for travel. Closing magnets can be placed in both the first leaf and the second leaf to secure the first leaf to the second leaf when folded. The closing magnets can be placed close to the hinge. This can help to keep the wireless charger in a closed position while allowing an easy opening.

When the bottom side of the first leaf is adjacent to the bottom side of the second leaf, the contacting surface of the first leaf and the charging puck of the second leaf can be exposed. The contacting surface can be placed on a surface of a first electronic device, for example on a back of a phone that has been placed face-down. A second electronic device can then be placed on top of the wireless charger and attached to the charging puck, which might be in the up position or the down position, depending on the second electronic device. This can provide a space-saving arrangement for charging multiple devices.

The main hinge can include a flexible circuit board for data and power transmission between the first leaf and the second leaf. The flexible circuit board can include a number of conductors to form electrical connections between the first leaf and the second leaf. The conductors can each be formed of two or more traces for redundancy. This redundancy can help to protect the main hinge from developing open circuits caused by the folding and unfolding of the first leaf and the second leaf. Also or instead, one or more conductors or traces can have a serpentine pattern, where the serpentine pattern is either a partially or fully nested serpentine pattern.

The wireless charger can receive power and data through a cable. The cable can also provide data to an external device using this same cable. The cable can be connected to the main hinge, the first leaf, or the second leaf. The cable can be tethered directly to circuits or components in the main hinge, the first leaf, or the second leaf. The cable can instead terminate in a connector insert that can be inserted into a connector receptacle, where the connector receptacle is located in the main hinge, the first leaf, or the second leaf.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 8A and FIG. 8B illustrate cutaway views of a portion of the wireless charger of FIG. 11;

FIG. 9A and FIG. 9B illustrate cutaway views of a portion of a wireless charger according to an embodiment of the present invention;

FIG. 15A and FIG. 15B illustrate a puck hinge according to an embodiment of the present invention;

FIG. 16A and FIG. 16B illustrate a puck hinge according to an embodiment of the present invention;

FIGS. 28A and 28B illustrate examples of traces that can be used on a flexible circuit board in the main hinge according to an embodiment of the present invention;

FIG. 42B shows an axial cross-section view through a portion of the system of FIG. 42A, while

FIG. 48A through FIG. 48C illustrate moving magnets according to an embodiment of the present invention;

FIGS. 49A and 49B illustrate a moving magnetic structure according to an embodiment of the present invention;

FIGS. 50A and 50B illustrate a moving magnetic structure according to an embodiment of the present invention;

DESCRIPTION OF ILLUSTRATIVE EMBODIMENTS

Figure 1:
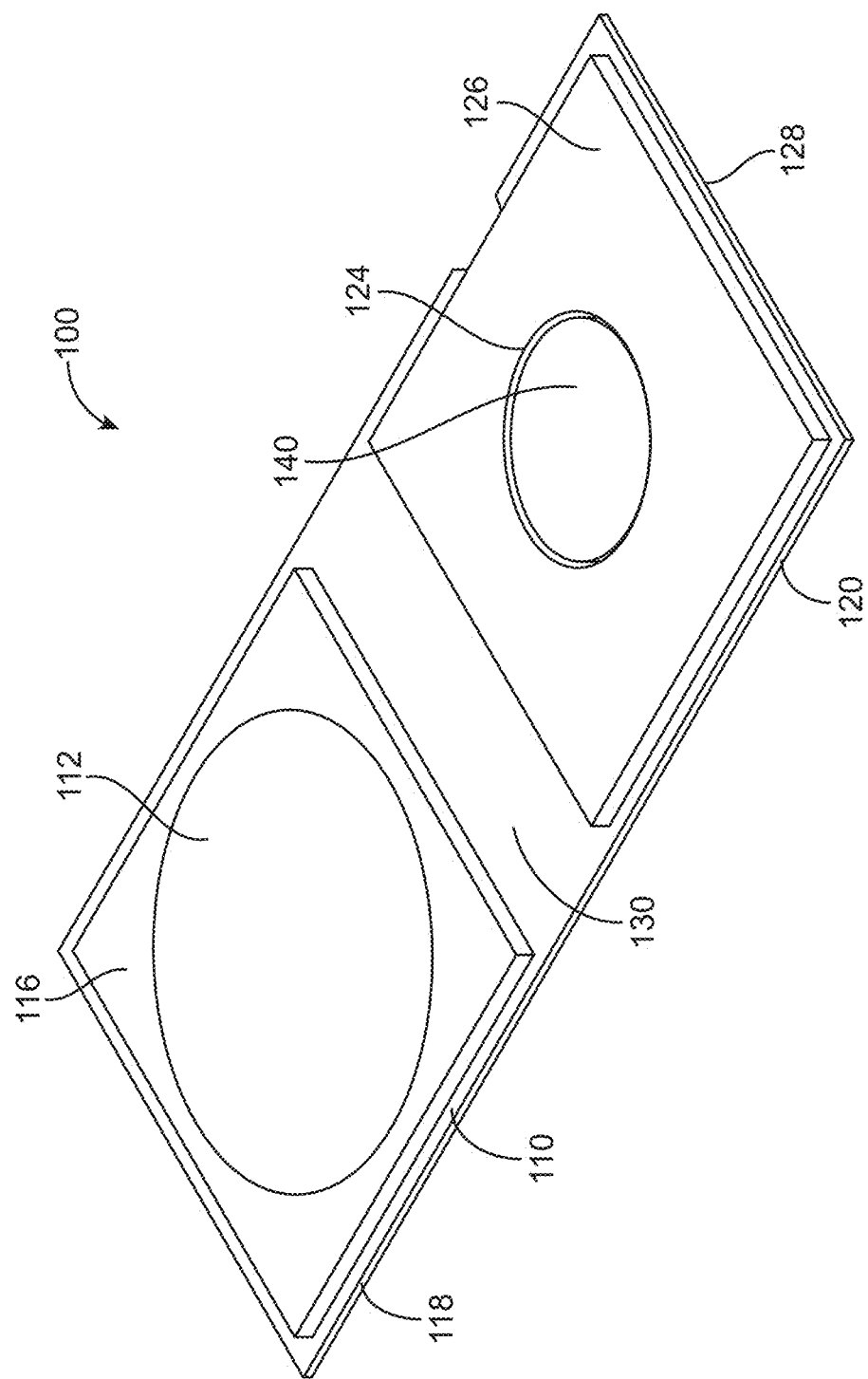
FIG. 1 illustrates a wireless charger according to an embodiment of the present invention.

FIG. 1 illustrates a wireless charger according to an embodiment of the present invention. This figure, as with the other included figures, is shown for illustrative purposes and does not limit either the possible embodiments of the present invention or the claims.

Wireless charger 100 can include a first leaf 110 and a second leaf 120. First leaf 110 and second leaf 120 can be joined by main hinge 130. First leaf 110 can include a top surface 116 and a bottom surface 118. First leaf 110 can further include a contacting surface 112. Second leaf 120 can include charging puck 140, shown here in a down position and located in cavity 124 of second leaf 120. Second leaf 120 can include top surface 126 and bottom surface 128.

Embodiments of the present invention can provide wireless chargers that can properly align to and securely hold one or more electronic devices. Accordingly, first leaf 110 can include one or more alignment features to align charging circuitry in a first electronic device (not shown) to charging circuitry in first leaf 110. First leaf 110 can further include one or more attachment features to attach the first electronic device to the first leaf 110. Further, second leaf 120 can include one or more alignment features to align charging circuitry in a second electronic device (not shown) to charging circuitry in charging puck 140 of second leaf 120. Second leaf 120 can further include one or more attachment features to attach the second electronic device to the second leaf 120. Examples of these various alignment features and attachment features are shown below.

Embodiments of the present invention can further charge more than one electronic device at a time. Accordingly, wireless charger 100 can include first leaf 110 for charging a first electronic device and second leaf 120 having charging puck 140 for charging a second electronic device. In this example, first leaf 110 can be configured to charge a phone, while second leaf 120 and charging puck 140 can be configured to charge a watch or other wearable computing device. In these and other embodiments of the present invention, first leaf 110 and second leaf 120 can be configured to charge a same type of device. For example, both first leaf 110 and second leaf 120 can be configured to charge a phone. Alternatively, both first leaf 110 and second leaf 120 can be configured to charge a watch or other wearable computing device. In these and other embodiments of the present invention, a wireless charger can include three or more leaves, where each leaf is configured to charge a same or different type of electronic device.

Embodiments of the present invention can further provide wireless chargers that can fold into a compact shape. In this example, main hinge 130 can allow wireless charger 100 to close such that top surface 116 of first leaf 110 is adjacent to top surface 126 of second leaf 120. Main hinge 130 can further allow wireless charger 100 to close such that bottom surface 118 of first leaf 110 is adjacent to bottom surface 128 of second leaf 120.

Charging puck 140 can be attached to second leaf 120 via a puck hinge 150. Puck hinge 150 can allow charging puck 140 move from the closed or down position as shown to an open or up position. In the open or up position, charging puck 140 can be at or near a right angle to top surface 126 of second leaf 120.

Main hinge 130 and puck hinge 150 can provide wireless charger 100 with a great deal of flexibility when charging. For example, main hinge 130 can allow bottom surface 118 of first leaf 110 to be adjacent to bottom surface of second leaf 120. In this configuration, first leaf 110 can be used to charge the first electronic device while second leaf 120 can be used the charge the second device. For example, contacting surface 112 of first leaf 110 of wireless charger 100 can be placed on a back side of the first electronic device, where the first electronic device is a phone. Charging puck 140 of second leaf 120 can be used to charge the second electronic device. Charging puck 140 can be in the up position or down position, depending on specific characteristics of the second electronic device, as well as any user preferences.

Figure 2:
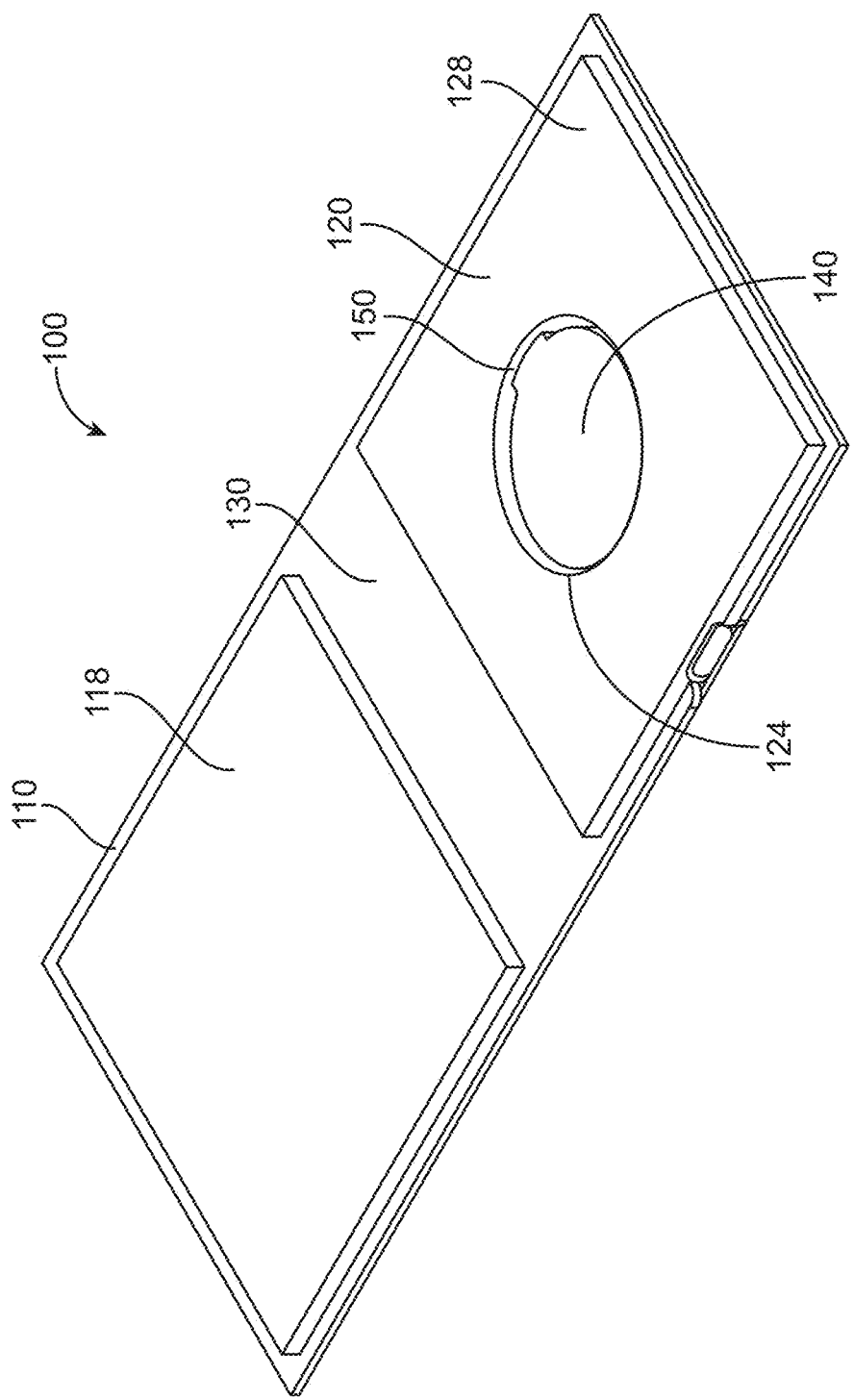
FIG. 2 illustrates a bottom side view of the wireless charger of FIG. 1.

FIG. 2 illustrates a bottom side view of the wireless charger of FIG. 1. Wireless charger 100 can include first leaf 110 and second leaf 120. First leaf 110 and second leaf 120 can be joined by main hinge 130. First leaf 110 can include a bottom surface 118, while second leaf 120 can include a bottom surface 128.

Charging puck 140 can be located in cavity 124 in second leaf 120. Charging puck 140 can be attached to second leaf 120 by puck hinge 150. Puck hinge 150 can allow charging puck 140 to rotate relative to second leaf 120 to an up position, which can be more suitable for charging an electronic device such as a watch or other wearable computing device. To facilitate the rotation of charging puck 140, a back side of charging puck 140 can be available at bottom surface 128 of second leaf 120. This can allow force to be applied to charging puck 140 in order to move it into the open or up position.

Figure 3:
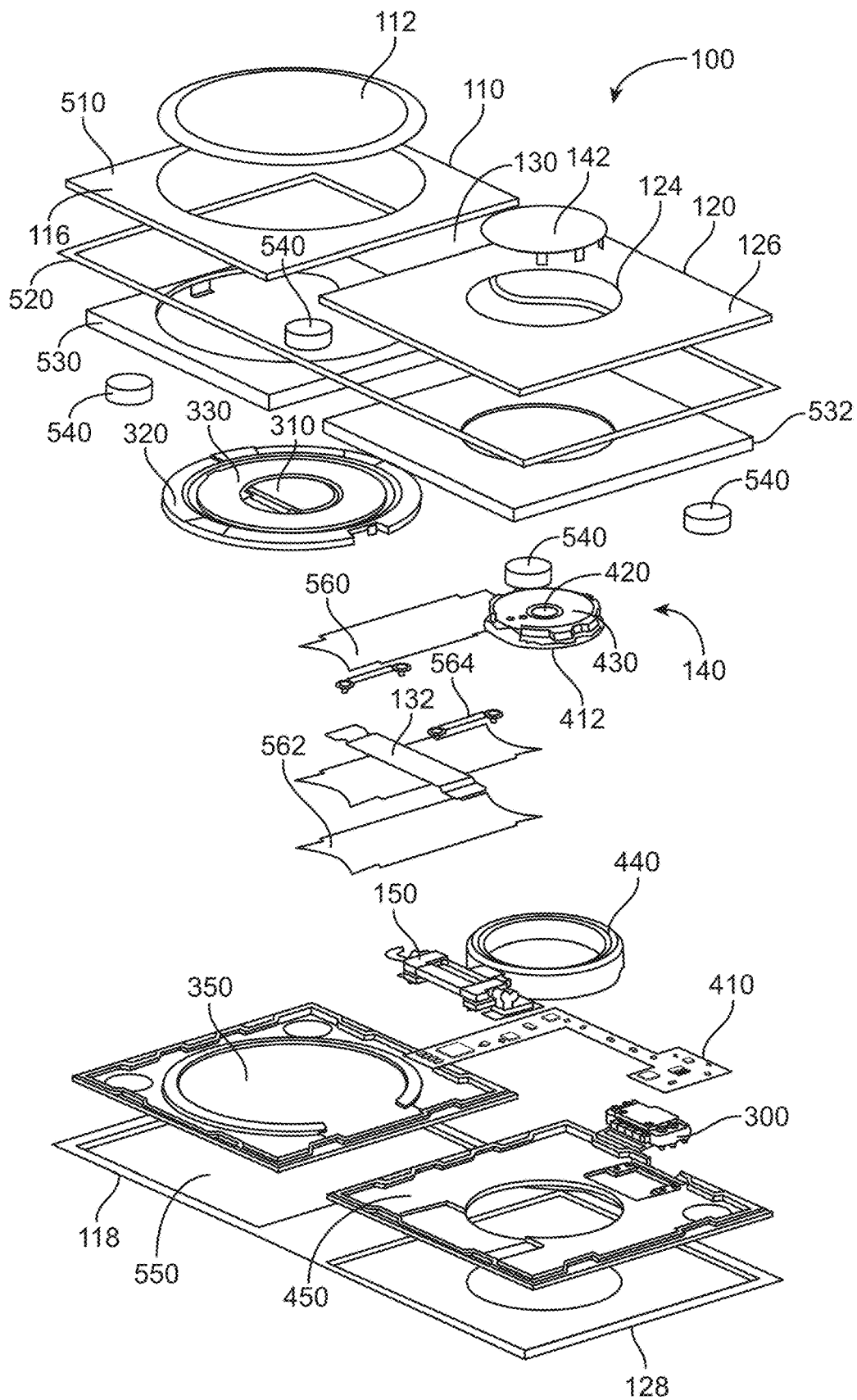
FIG. 3 is an exploded diagram of the wireless charger of FIG. 1.

FIG. 3 is an exploded diagram of the wireless charger of FIG. 1. Wireless charger 100 can include first leaf 110 for charging a first electronic device and second leaf 120 for charging a second electronic device. First leaf 110 can be joined to second leaf 120 by main hinge 130.

First leaf 110 can include one or more alignment features to align the first electronic device to first leaf 110. Specifically, first leaf 110 can include annular magnet array 320. Magnet array 320 can attract a corresponding magnet array (not shown) in the first electronic device (not shown) when the first electronic device is brought into proximity with first leaf 110. Magnet array 320 can further act as an attachment device to attach the first electronic device to first leaf 110. Contacting surface of 112 can also act as an attachment device. Specifically, contacting surface 112 can be formed of a high friction or high stiction material that holds a back side of a phone (for example) to first leaf 110. The high friction or high stiction surface of contacting surface 112 can increase a shear force needed to remove the first electronic device from first leaf 110. Contacting surface 112 can also or instead be formed using an adhesive. Using an adhesive can increase a normal force needed to remove the first electronic device from first leaf 110.

Once aligned, first leaf 110 can provide charging to the first electronic device using coil 330. Magnet array 320 can latterly and circumferentially surround coil 330. Power can be received at connector 300. Connector 300 can be a lightning, USB type C, or other type of connector. This power can be provided through board 410 to control circuitry 310. Control circuitry 310 can generate alternating currents in coil 330. These alternating currents can generate a time-varying magnetic flux that couples to a corresponding coil (not shown) in the first electronic device. The first electronic device can use these induced currents to charge a battery in the first electronic device. Coil 330 and magnet array 320 can be supported by first bottom enclosure 350.

Second leaf 120 can include one or more alignment features to align the second electronic device to second leaf 120. Specifically, second leaf 120 can include magnet 420. Magnet 420 can attract a corresponding magnet (not shown) in the second electronic device (not shown) when the second electronic device is brought into proximity with charging puck 140. Magnet 420 can further act as an attachment device to attach the second electronic device to charging puck 140.

Once aligned, charging puck 140 can provide charging to the second electronic device using coil 430. Coil 430 can laterally and circumferentially surround magnet 420. Power received at connector 300 can be provided by board 410 to control circuitry 412 in charging puck 140. Control circuitry 412 can generate alternating currents in coil 430. These alternating currents can generate a time varying magnetic flux that couples to a corresponding coil (not shown) in the second electronic device. The second electronic device can use these induced currents to charge a battery and the second electronic device. Coil 430, magnet 420, and control circuitry 412 can be supported in charging puck enclosure 440. Second leaf 120 can be supported by second bottom enclosure 450. Puck hinge 150 can attach charging puck enclosure 440 to second bottom enclosure 450. Board 410 can communicate with control circuitry 412 over cable 414 (shown in FIG. 4.) Board 410 can communicate with control circuitry 310 over flexible circuit board 132.

Wireless charger 100 can further include a top layer 510 and a bottom layer 550. These layers can be natural or man-made and can have a surface that is appealing to the touch. First top enclosure 530 and second top enclosure 532 can be joined to top layer 510 by spacer 520. Flexible circuit board 132 and main hinge 130 can be protected by protective layer 560 and protective layer 562. Strain relief brackets 564 can further help to protect flexible circuit board 132 from strain that can occur as main hinge 130 is folded. Wireless charger 100 can further include magnets 540. Magnets 540 can be arranged to secure top surface 116 of first leaf 110 to top surface 126 of second leaf 120 when wireless charger 100 is folded in a first direction. Magnets 540 can be arranged to secure bottom surface 118 of first leaf 110 to bottom surface 128 of second leaf 120 when wireless charger 100 is folded in a second direction.

Portions of these wireless chargers can be formed of various materials. Contacting surface 112 and other high-friction surfaces can be formed of an elastomer, plastic, PVC plastic, rubber, silicon rubber, urethane, polyurethane, nitrile, neoprene, silicone, or other material. Contacting surface 112 can be formed using a double-shot molding process. For example, contacting surface 112 can be formed of a polycarbonate layer covered by a softer, silicone layer. Charging puck enclosure 440, puck hinge 150, first bottom enclosure 350, second bottom enclosure 450, and other portions can be formed of aluminum, stainless steel, or other material. These and other structures can be formed by computer-numerically controlled (CNC) machining, metal-injection-molding, stamping, forging, by using a deep-draw process, or other technique. Top layer 510 and bottom layer 550 can be formed of leather or other natural or man-made material.

Figure 4:
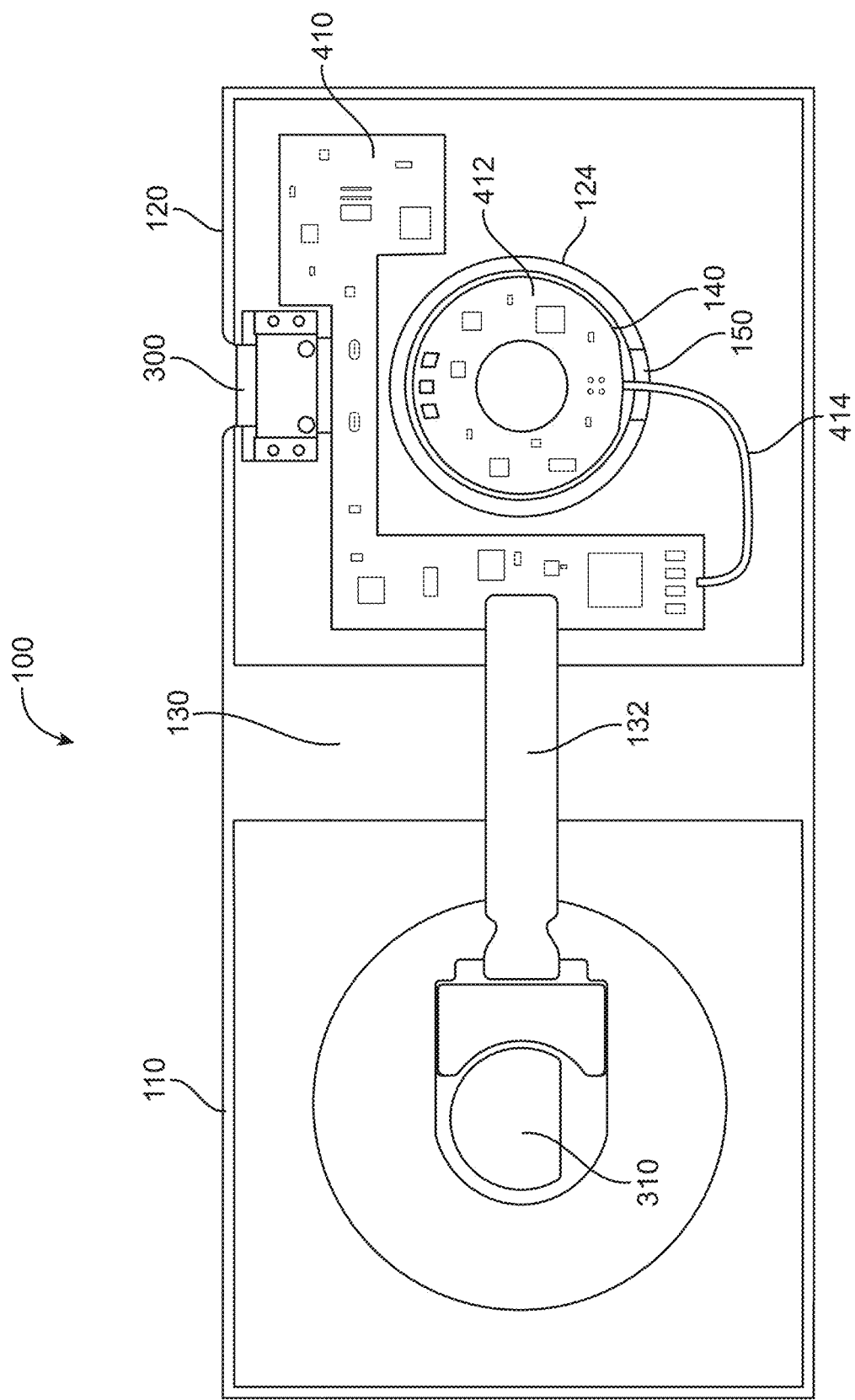
FIG. 4 illustrates a layout of electronic circuits the can be used in the wireless charger FIG. 1.

FIG. 4 illustrates a layout of electronic circuits the can be used in the wireless charger FIG. 1. Wireless charger 100 can include first leaf 110 and second leaf 120. First leaf 110 and second leaf 120 can be joined by main hinge 130. Power can be received by wireless charger 100 at connector 300. Connector 300 can be a lightning, USB Type C, or other type of connector. Power received at connector 300 can be used by board 410 to provide power over cable 414 to control circuitry 412 in charging puck 140. Again, charging puck 140 can be attached to second leaf 120 at puck hinge 150. Power from board 410 can be provided to control circuitry 310 over flexible circuit board 132 in the main hinge 130.

In these and other embodiments of the present invention, connector 300 can be located on other portions of wireless charger 100. Also, connector 300 can be omitted and a tethered cable can be connected directly to one of these or other circuits or components in wireless charger 100. Examples are shown in the following figures.

Figure 5A:
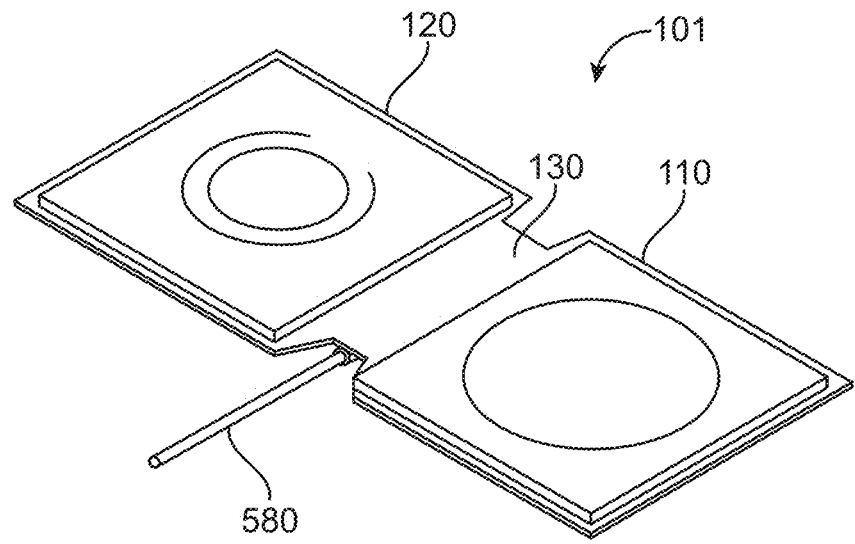
FIG. 5A and FIG. 5B illustrate a wireless charger according to an embodiment of the present invention.
Figure 5B:
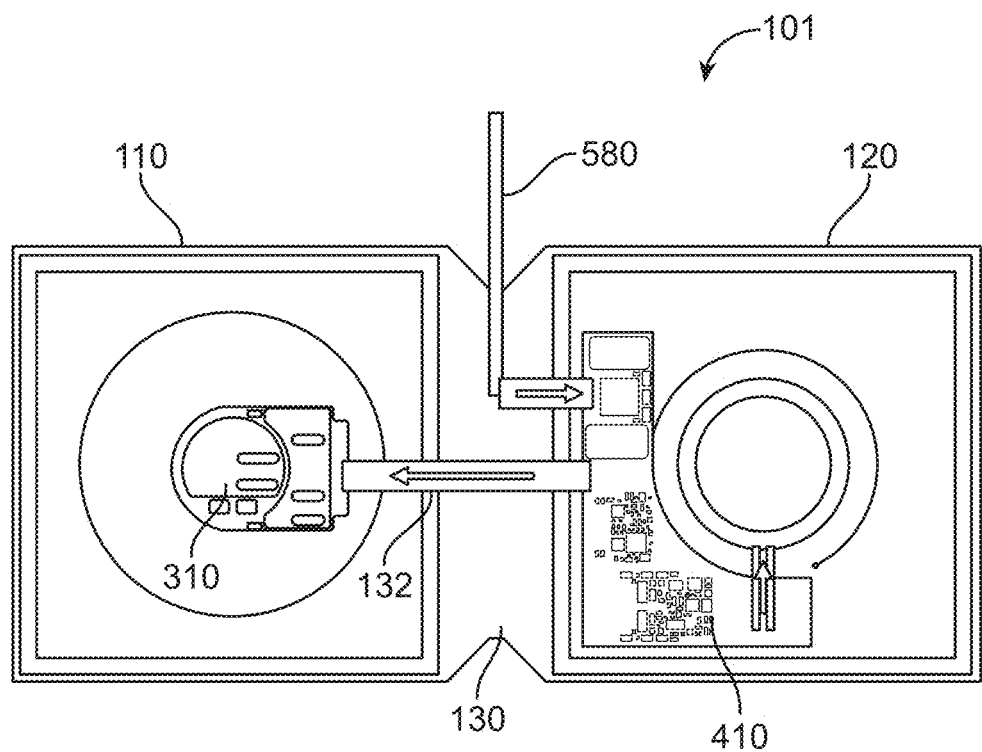

FIG. 5A and FIG. 5B illustrate a wireless charger according to an embodiment of the present invention. In this example, wireless charger 101 can be similar to wireless charger 100 (shown in FIG. 1.) Wireless charger 101 can include first leaf 110 and second leaf 120. First leaf 110 can be joined to second leaf 120 with main hinge 130. Cable 580 can be a tethered cable that connects directly into main hinge 130. As shown in FIG. 5B, power received on cable 580 by wireless charger 101 can be received by board 410. Board 410 can provide power over flexible circuit board 132 to control circuitry 310.

Figure 6A:
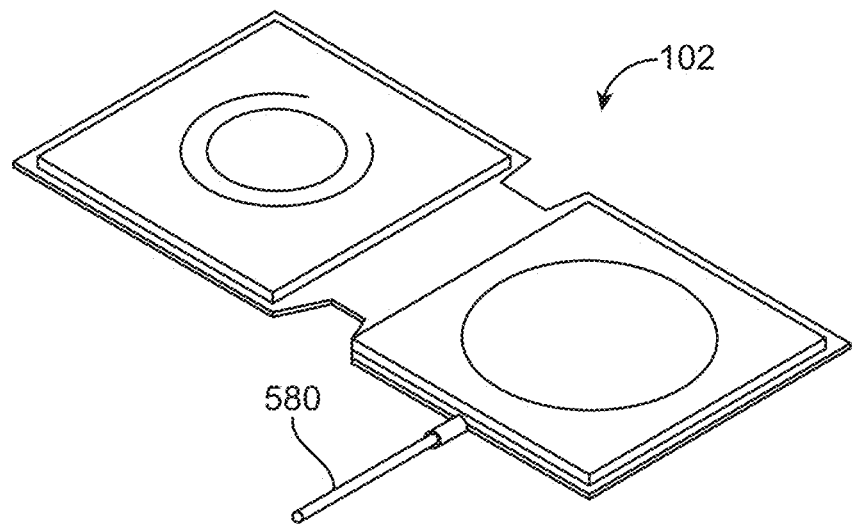
FIG. 6A and FIG. 6B illustrate a wireless charger according to an embodiment of the present invention.
Figure 6B:
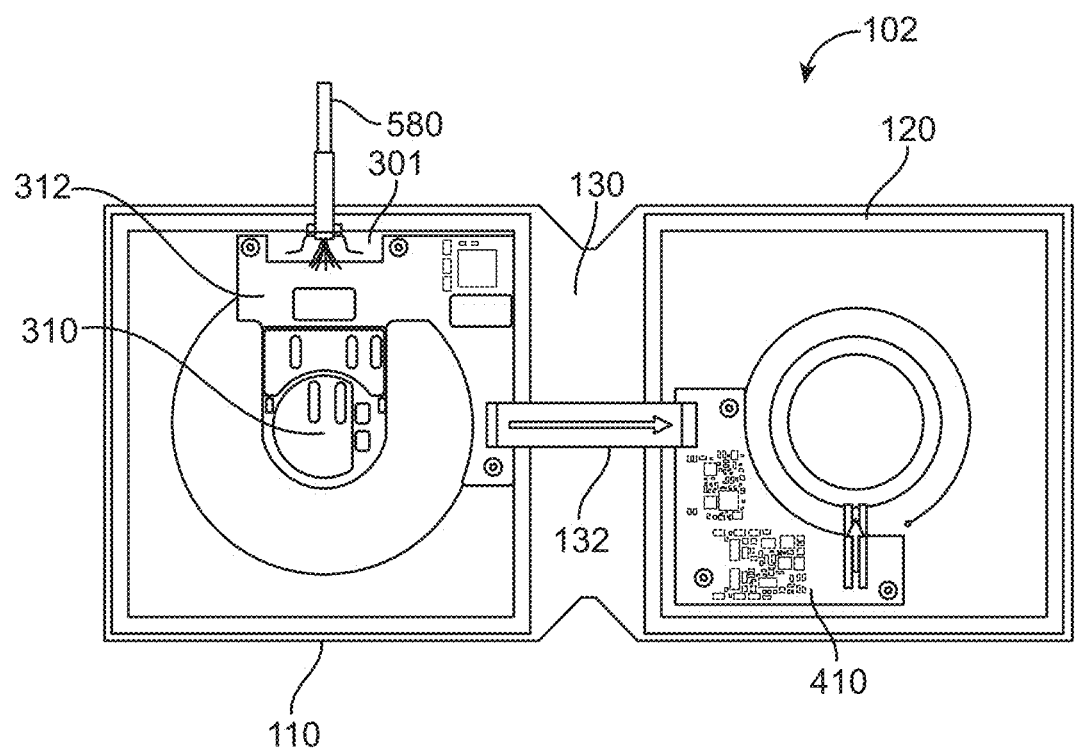

FIG. 6A and FIG. 6B illustrate a wireless charger according to an embodiment of the present invention. In this example, In this example, wireless charger 102 can be similar to wireless charger 100 (shown in FIG. 1.) Wireless charger 102 can receive power over cable 580. Cable 580 can be a tethered cable that is tethered to connector 301 in first leaf 110 of wireless charger 102. Power can be received over cable 580 by board 312. Board 312 can provide power to control circuitry 310. Board 312 can further provide power over flexible circuit board 132 in main hinge 130 to board 410 in second leaf 120.

Figure 7A:
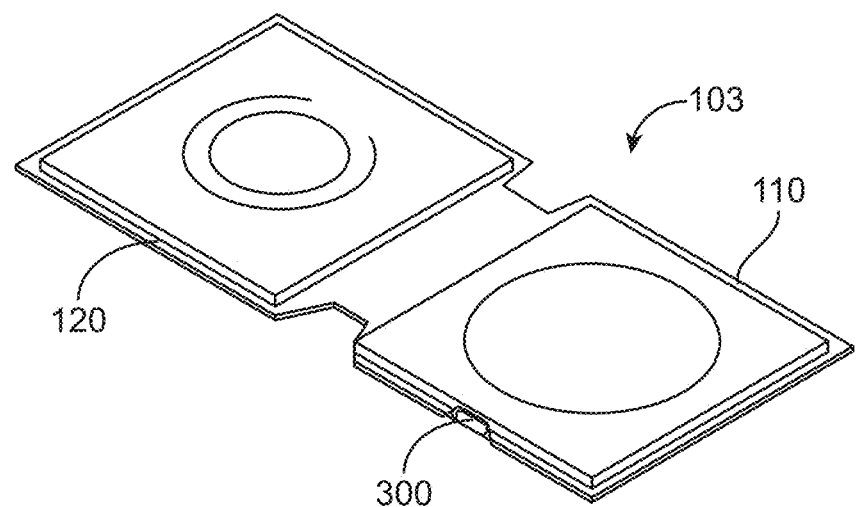
FIG. 7A and FIG. 7B illustrate a wireless charger according to an embodiment of the present invention.
Figure 7B:
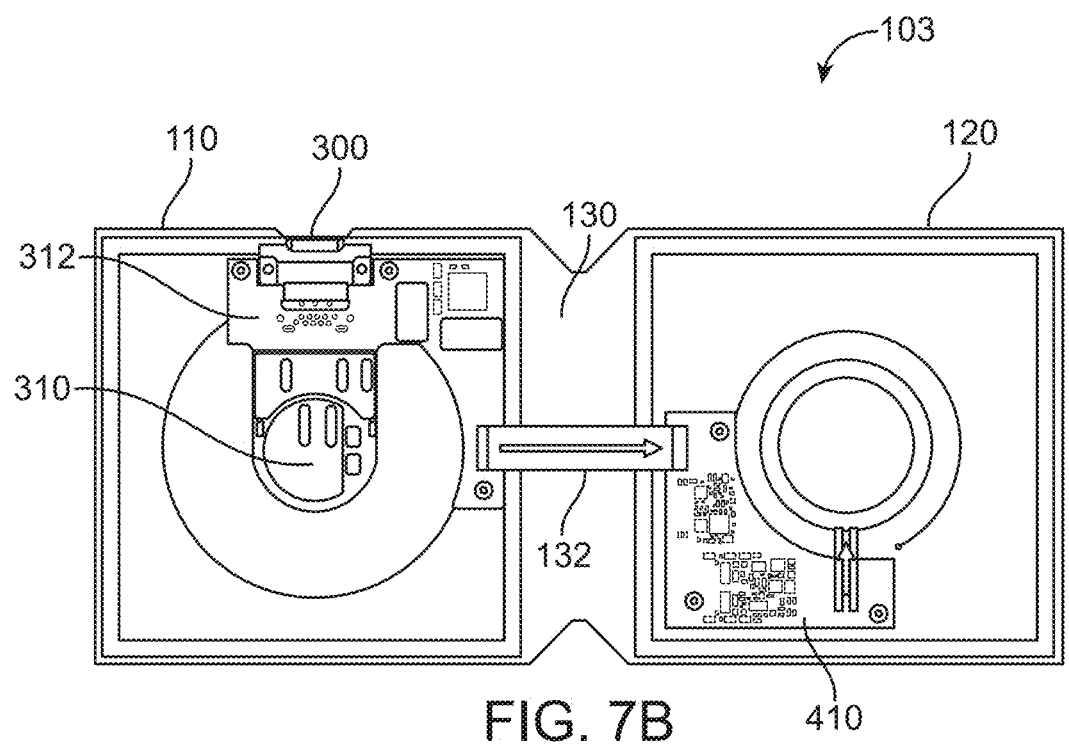

FIG. 7A and FIG. 7B illustrate a wireless charger according to an embodiment of the present invention. In this example, wireless charger 103 can be similar to wireless charger 100 (shown in FIG. 1.) In this example, connector 300 can be located in first leaf 110 of wireless charger 103. Power received at connector 300 can be provided to board 312. Board 312 can provide power to control circuitry 310 in first leaf 110. Board 312 can further provide power over flexible circuit board 132 and main hinge 130 to board 410 in second leaf 120.

In these and other embodiments of the present invention, data can flow in the same or similar manner as power. For example, data can be provided through coil 330 in first leaf 110 to the first electronic device. Data can also be provided through coil 430 in second leaf 120 to the second electronic device. Similarly, data can be received through coil 330 in first leaf 110 from the first electronic device. Data can also be received through coil 430 and second leaf 120 from the second electronic device.

In the above example, charging puck 140 can be attached to second bottom enclosure 450 by puck hinge 150. In these and other embodiments of the present invention, other puck hinges can be used. Examples are shown in the following figures.

FIGS. 8A and 8B illustrate cutaway views of a portion of the wireless charger of FIG. 1. Second leaf 120 can include charging puck 140 attached to second leaf 120 through puck hinge 150. Charging puck 140 can include top surface 142, magnet 420, and coil 430. Magnet 420 and coil 430 can be housed in charging puck enclosure 440. Puck hinge 150 can attach to shaft 852, which can be attached to second bottom enclosure 450. In the closed position as shown, surface 154 of puck hinge 150 can rest on stop 853. This can provide a proper alignment between a top surface 842 of charging puck 140 and a top surface 126 of second leaf 120 when charging puck 140 is in the down position and in cavity 124. In this position, wireless charger 100 is closed. Puck hinge 150 can rotate about shaft 852 until surface 855 of puck hinge 150 encounters stop 856. At this point, charging puck 140 can be in the up position and out of cavity 124. In this position, wireless charger 100 is open. Charging puck 140 can be at approximately a right angle to a top surface 126 of second leaf 120. For example, charging puck 140 can be at an angle between 85 and 90 degrees relative to a top surface 126 of second leaf 120. For example, charging puck 140 can be at an angle of 87 degrees relative to a top surface 126 of second leaf 120. Charging puck 140 can instead be at an angle of 89 degrees relative to a top surface 126 of second leaf 120 when it is in the up position.

In this configuration, stop 853 can encounter surface 854 of puck hinge 150 when wireless charger 100 is closed. This can align top surface 142 of charging puck 140 to top surface 126 of second leaf 120. Also, stop 856 can encounter surface 855 on puck hinge 150 when wireless charger 100 is open. Stop 853 and stop 856 can be attached to enclosure portions of second leaf 120 during assembly. This can allow stop 853 and stop 856 to be accurately positioned such that charging puck 140 is correctly positioned in second leaf 120 when open or closed.

FIG. 9A and FIG. 9B illustrate cutaway views of a portion of a wireless charger according to an embodiment of the present invention. Wireless charger 104 can be the same or similar to wireless charger 100 (shown in FIG. 1) with some alterations to the puck hinge. Charging puck 140 can include magnet 420 and coil 430 in charging puck enclosure 440 in second leaf 120. Charging puck enclosure 440 can be attached through puck hinge 950 to second bottom enclosure 450 (shown in FIG. 3.) Puck hinge 950 can rotate about axis 952. In the closed position, stop 953 can encounter surface 954 of puck hinge 950. In the open state, stop 956 can encounter surface 955 of puck hinge 950. Various magnets (not shown) can be used to secure charging puck 140 in the open state, the closed state, or both.

Figure 10A:
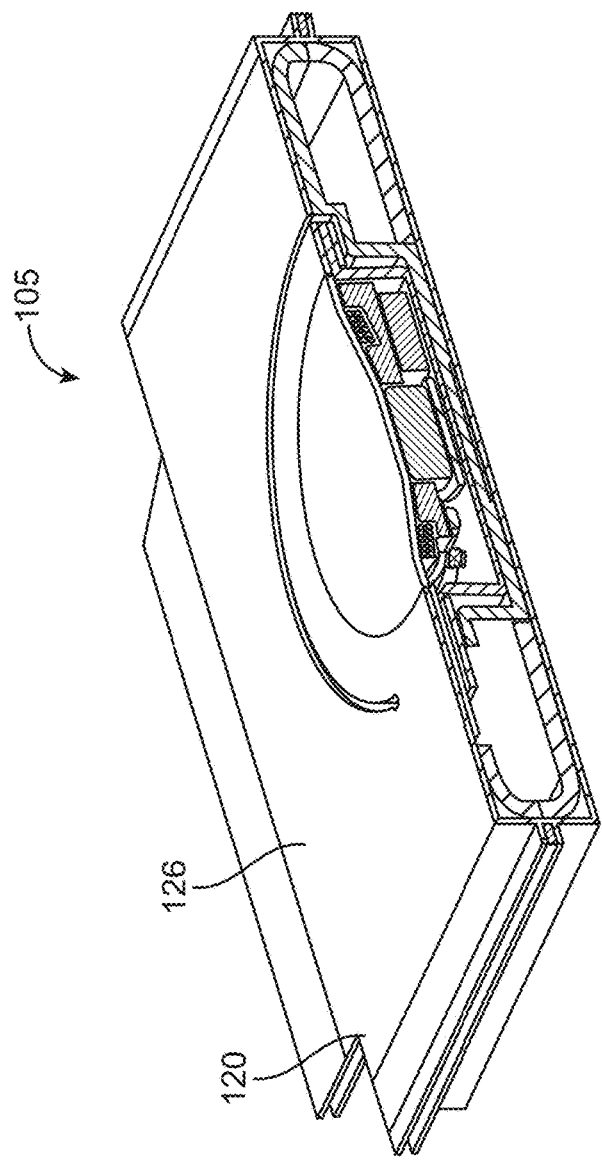
FIG. 10A and FIG. 10B illustrate cutaway views of a portion of a wireless charger according to an embodiment of the present invention.
Figure 10B:
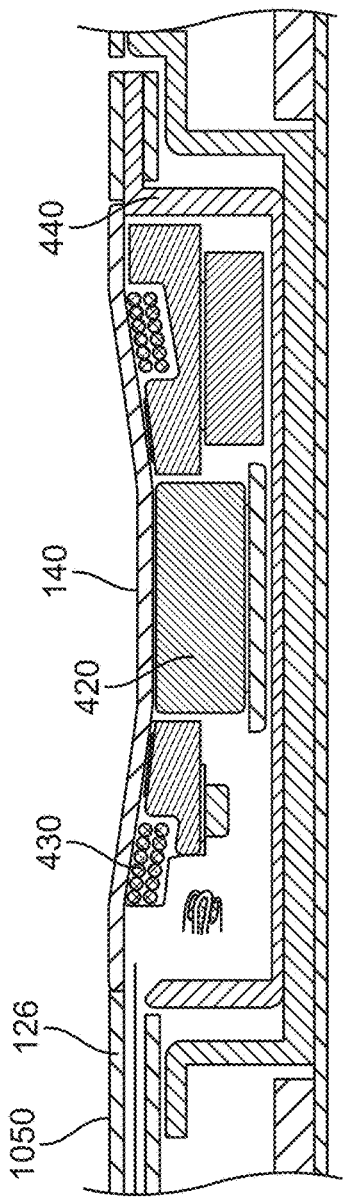

FIG. 10A and FIG. 10B illustrate cutaway views of a portion of a wireless charger according to an embodiment of the present invention. Wireless charger 105 can be the same or similar to wireless charger 100 (shown in FIG. 1) with some alterations to the puck hinge. Charging puck 140 can include magnet 420 and coil 430 in charging puck enclosure 440. Puck hinge 150 can be formed of a pliable material that forms top surface 126 of wireless charger 105. Accordingly, hinge 1050 can fold and allow charging puck 140 to move from a down position to an up position. Various magnets (not shown) can be used to secure charging puck 140 in the open state, the closed state, or both.

Again, it can be desirable that a wireless charger be able to fold into a compact shape to facilitate its conveyance. An example of such a wireless charger is shown in the following figure.

Figure 11:
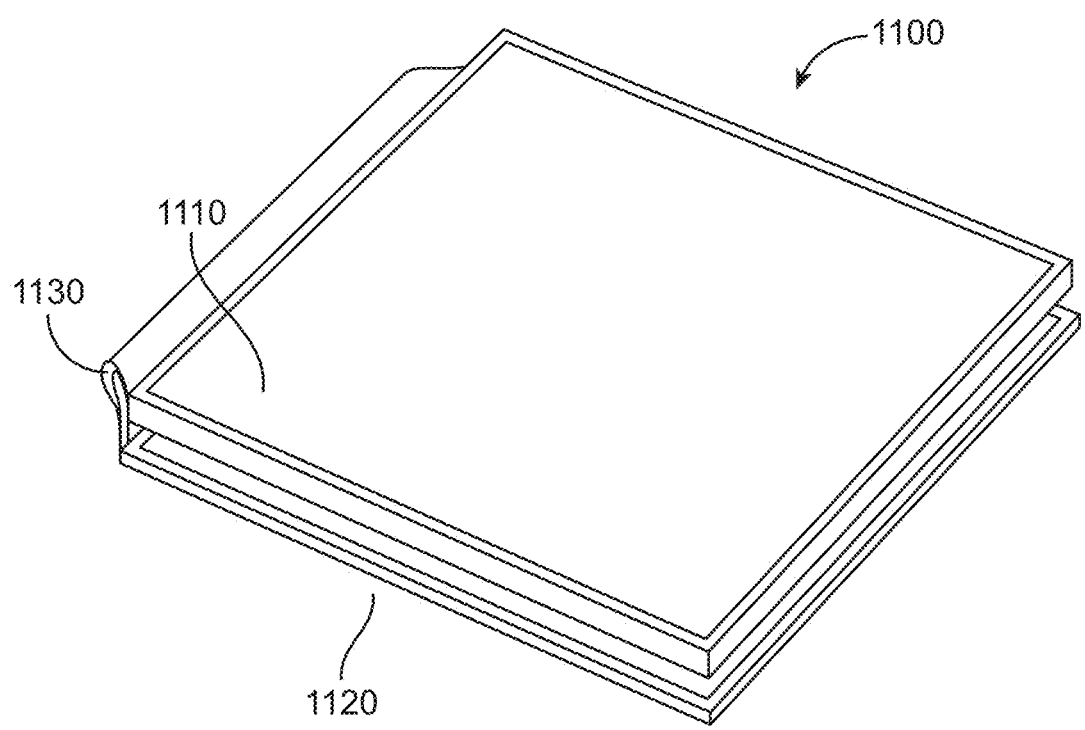
FIG. 11 illustrates a wireless charger according to an embodiment of the present invention.

FIG. 11 illustrates a wireless charger according to an embodiment of the present invention. Wireless charger 1100 can include first leaf 1110 and second leaf 1120. First leaf 1110 can support charging of a first electronic device, while second leaf 1120 can support charging of a second electronic device. First leaf 1110 can be attached to second leaf 1120 through main hinge 1130.

Figure 12:
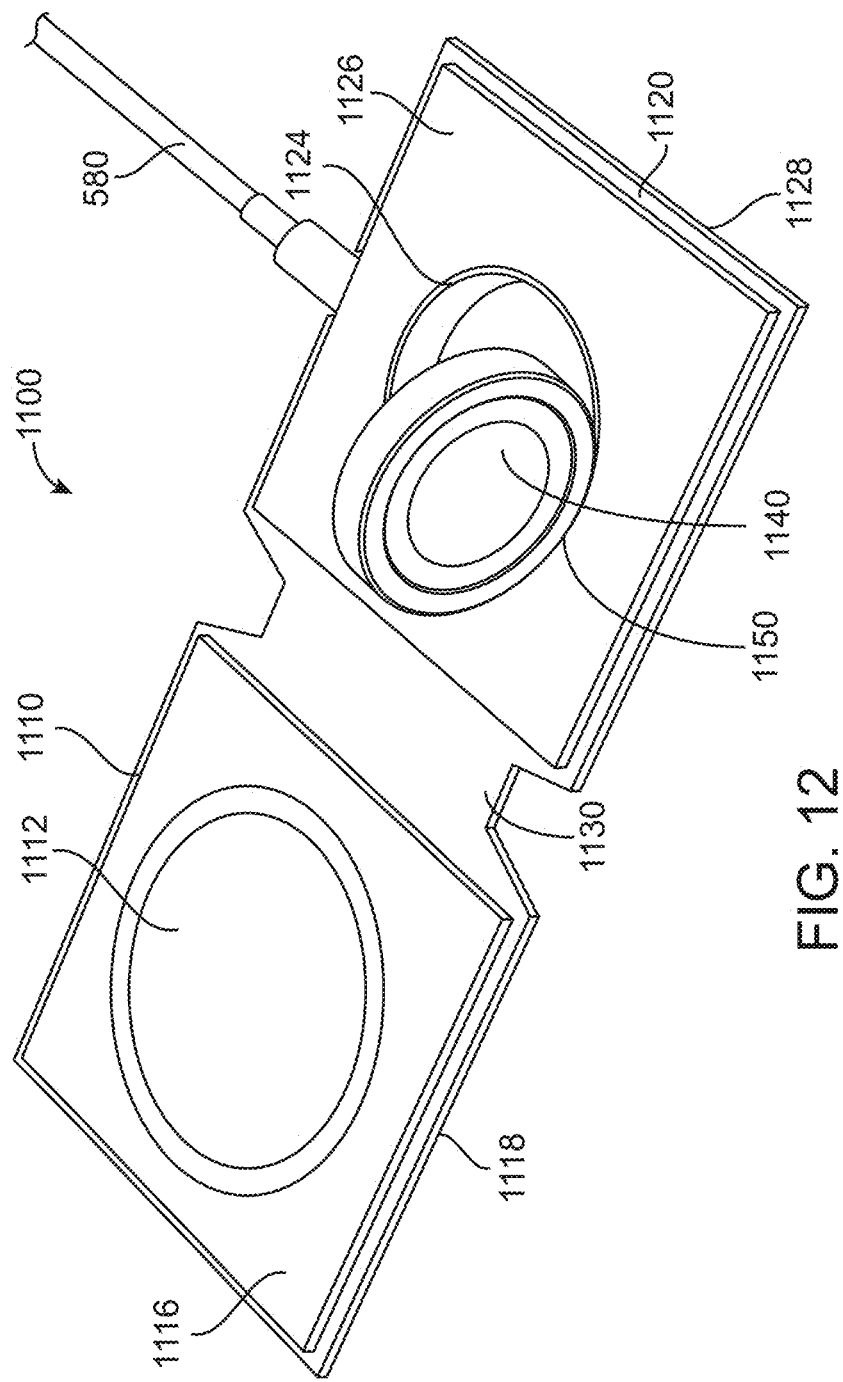
FIG. 12 illustrates the wireless charger of FIG. 11.

FIG. 12 illustrates the wireless charger of FIG. 11. Wireless charger 1100 can be similar to wireless charger 100 (shown in FIG. 1.) Wireless charger 1100 can receive power on cable 580. Wireless charger 1100 can include first leaf 1110 and second leaf 1120. First leaf 1110 and second leaf 1120 can be joined by main hinge 1130. Second leaf 1120 can include charging puck 1140. Charging puck 1140 can be connected to a second leaf 1120 by puck hinge 1150.

First leaf 1110 can include a top surface 1116 and a bottom surface 1118. First leaf 1110 can further include a contacting surface 1112. Second leaf 1120 can include charging puck 1140, shown here in a down position and located in cavity 1124 of second leaf 1120. Second leaf 1120 can include top surface 1126 and bottom surface 1128.

Embodiments of the present invention can provide wireless chargers that can properly align to and securely hold one or more electronic devices. Accordingly, first leaf 1110 can include one or more alignment features to align charging circuitry in a first electronic device (not shown) to charging circuitry in first leaf 1110. First leaf 1110 can further include one or more attachment features to attach the first electronic device to the first leaf 1110. Further, second leaf 1120 can include one or more alignment features to align charging circuitry in a second electronic device (not shown) to charging circuitry in charging puck 1140 of second leaf 1120. Second leaf 1120 can further include one or more attachment features to attach the second electronic device to the second leaf 1120. Examples of these various alignment features and attachment features are shown below.

Embodiments of the present invention can further charge more than one electronic device at a time. Accordingly, wireless charger 1100 can include first leaf 1110 for charging a first electronic device, and second leaf 1120 having charging puck 1140 for charging a second electronic device. In this example, first leaf 1110 can be configured to charge a phone, while second leaf 1120 and charging puck 1140 can be configured to charge a watch or other wearable computing device. In these and other embodiments of the present invention, first leaf 1110 and second leaf 1120 can be configured to charge a same type of device. For example, both first leaf 1110 and second leaf 1120 can be configured to charge a phone. Alternatively, both first leaf 1110 and second leaf 1120 can be configured to charge a watch or other wearable computing device. In these and other embodiments of the present invention, a wireless charger can include three or more leaves, where each leaf is configured to charge a same or different type of electronic device.

Embodiments of the present invention can further provide wireless chargers that can fold into a compact shape. In this example, main hinge 1130 can allow wireless charger 1100 to close such that top surface 1116 of first leaf 1110 is adjacent to top surface 1126 of second leaf 1120. Main hinge 1130 can further allow wireless charger 1100 to close such that bottom surface 1118 of first leaf 1110 is adjacent to bottom surface 1128 of second leaf 1120.

Charging puck 1140 can be attached to second leaf 1120 via a puck hinge 1150. Puck hinge 1150 can allow charging puck 1140 move from the closed or down position as shown to an open or up position. In the open or up position, charging puck 1140 can be at or near a right angle to top surface 1126 of second leaf 1120.

Figure 13:
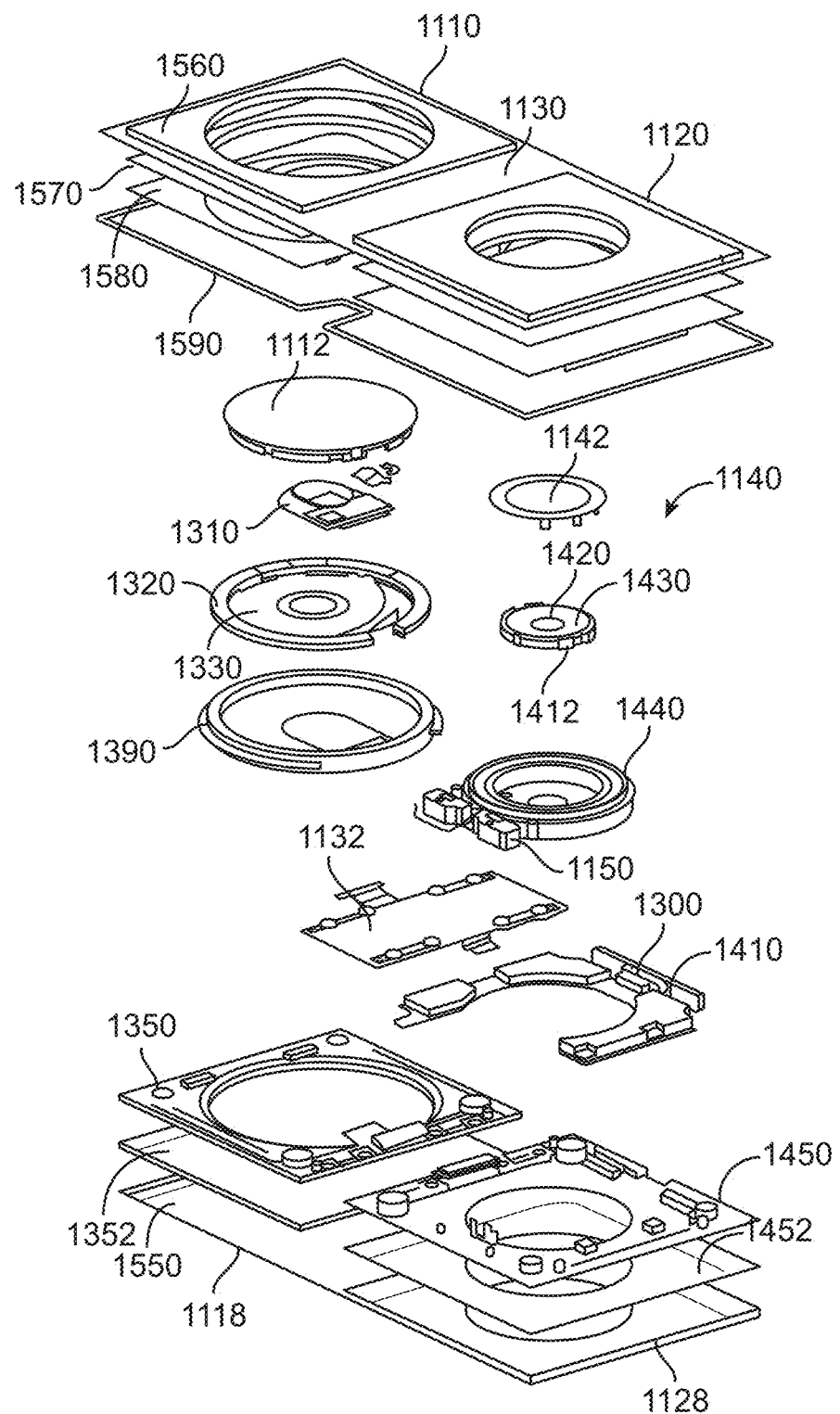
FIG. 13 is an exploded diagram of the wireless charger of FIG. 11.

FIG. 13 is an exploded diagram of the wireless charger of FIG. 11. Wireless charger 1100 can include first leaf 1110 for charging a first electronic device and second leaf 1120 for charging a second electronic device. First leaf 1110 can be joined to second leaf 1120 by main hinge 1130.

First leaf 1110 can include one or more alignment features to align the first electronic device to first leaf 1110. Specifically, first leaf 1110 can include annular magnet array 1320. Magnet array 1320 can attract a corresponding magnet array (not shown) in the first electronic device (not shown) when the first electronic device is brought into proximity with first leaf 1110. Magnet array 1320 can further act as an attachment device to attach the first electronic device to first leaf 1110. Contacting surface of 1112 can also act as an attachment device. Specifically, contacting surface 1112 can be formed of a high friction or high stiction material that holds a back side of a phone (for example) to first leaf 1110. The high friction or high stiction surface of contacting surface 1112 can increase a shear force needed to remove the first electronic device from first leaf 1110. Contacting surface 1112 can also or instead be formed using an adhesive. Using an adhesive can increase a normal force needed to remove the first electronic device from first leaf 1110.

Once aligned, first leaf 1110 can provide charging to the first electronic device using coil 1330. Magnet array 1320 can latterly and circumferentially surround coil 1330. Power can be received at connector 1300. Connector 1300 can be a lightning, USB type C, or other type of connector. This power can be provided through board 1410 to control circuitry 1310. Control circuitry 1310 can generate alternating currents in coil 1330. These alternating currents can generate a time-varying magnetic flux that couples to a corresponding coil (not shown) in the first electronic device. The first electronic device can use these induced currents to charge a battery in the first electronic device. Coil 1330 and magnet array 1320 can be supported by coil enclosure 1390 and first bottom enclosure 1350.

Second leaf 1120 can include one or more alignment features to align the second electronic device to second leaf 1120. Specifically, second leaf 1120 can include magnet 1420 in charging puck 1140. Charging puck 1140 can be covered by top surface 1142. Magnet 1420 can attract a corresponding magnet (not shown) in the second electronic device (not shown) when the second electronic device is brought into proximity with charging puck 1140. Magnet 1420 can further act as an attachment device to attach the second electronic device to charging puck 1140.

Once aligned, charging puck 1140 can provide charging to the second electronic device using coil 1430. Coil 1430 can laterally and circumferentially surround magnet 1420. Power received at connector 1300 can be provided by board 1410 to control circuitry 1412 in charging puck 1140. Control circuitry 1412 can generate alternating currents in coil 1430. These alternating currents can generate a time varying magnetic flux that couples to a corresponding coil (not shown) in the second electronic device. The second electronic device can use these induced currents to charge a battery and the second electronic device. Coil 1430, magnet 1420, and control circuitry 1412 can be supported in puck enclosure 1440. Second leaf 1120 can be supported by second bottom enclosure 1450. Puck hinge 1150 can attach puck enclosure 1440 to second bottom enclosure 1450. Board 1410 can communicate with control circuitry 1310 over flexible circuit board 1132.

Wireless charger 1100 can further include a top layer 1560 and a bottom layer 1550. These layers can be natural or man-made and can have a surface that is appealing to the touch. Compliant layer 1570 can be between top layer 1560 and top enclosure 1580. Spacer 1590 can be positioned below top enclosure 1580. Flexible circuit board 1132 and main hinge 1130 can be included. Compliant layer 1352 can be positioned between bottom layer 1550 and first bottom enclosure 1350, while compliant layer 1452 can be positioned between bottom layer 1550 and second bottom enclosure 1450. Wireless charger 1100 can further include magnets (not shown) that can be arranged to secure top surface 1116 of first leaf 1110 to top surface 1126 of second leaf 1120 when wireless charger 1100 is folded in a first direction. These magnets can be arranged to secure bottom surface 1118 of first leaf 1110 to bottom surface 1128 of second leaf 1120 when wireless charger 1100 is folded in a second direction.

Portions of these wireless chargers can be formed of various materials. Contacting surface 1112 and other high-friction surfaces can be formed of an elastomer, plastic, PVC plastic, rubber, silicon rubber, urethane, polyurethane, nitrile, neoprene, silicone, or other material. Contacting surface 1112 can be formed using a double-shot molding process. For example, contacting surface 1112 can be formed of a polycarbonate layer covered by a softer, silicone layer. Charging puck enclosure 1440, puck hinge 1150, first bottom enclosure 1350, second bottom enclosure 1450, and other portions can be formed of aluminum, stainless steel, or other material. These and other structures can be formed by computer-numerically controlled (CNC) machining, metal-injection-molding, stamping, forging, by using a deep-draw process, or other technique. Top layer 510 and bottom layer 550 can be formed of leather or other natural or man-made material. First bottom enclosure 1350 and second bottom enclosure 1450 can instead be plastic or other material.

Figure 14:
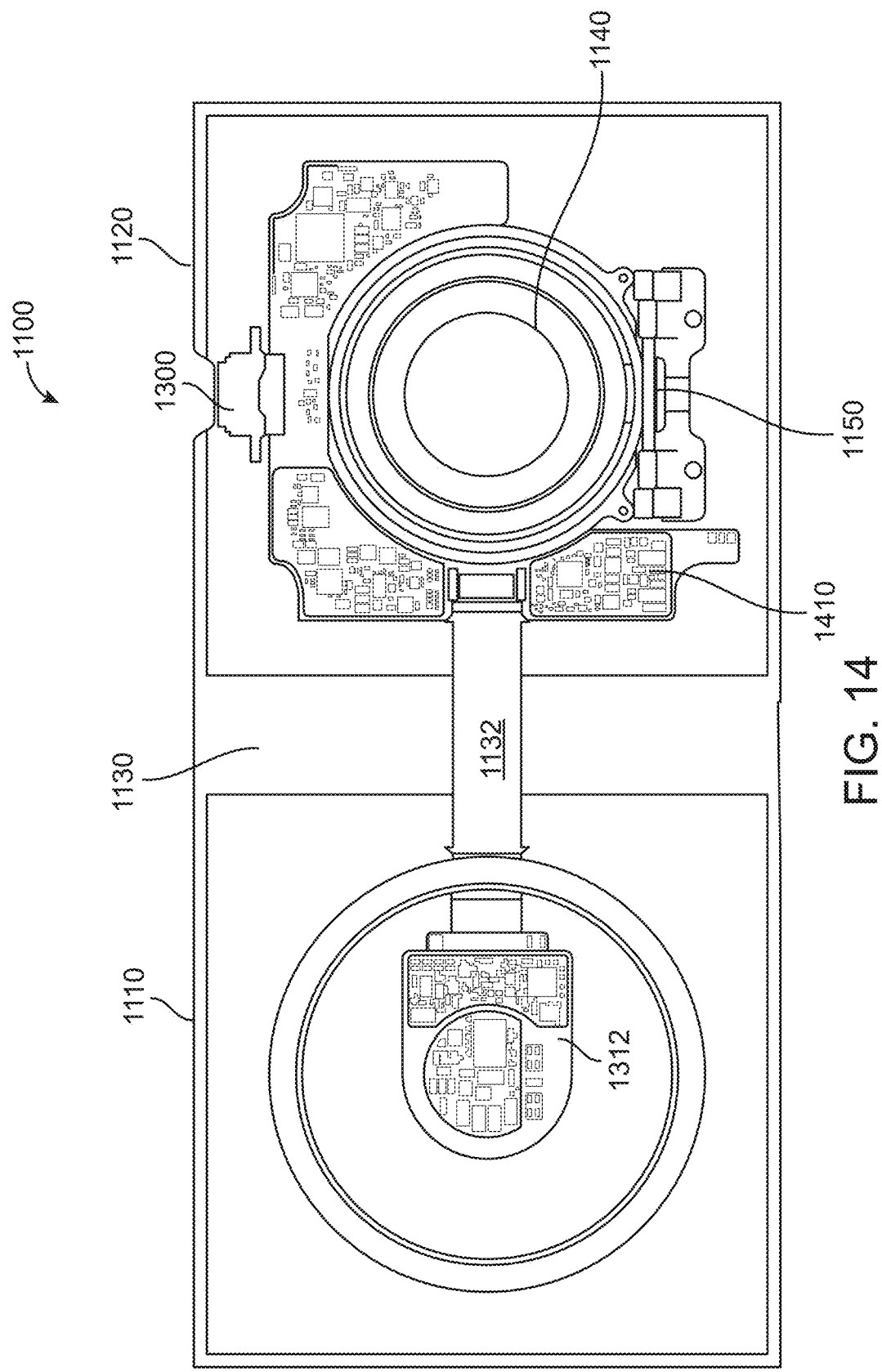
FIG. 14 illustrates a layout of electronic circuits the can be used in the wireless charger FIG. 11.

FIG. 14 illustrates circuitry that can be used in the wireless charger of FIG. 11. Wireless charger 1100 can include first leaf 1110 and second leaf 1120. Power can be received by wireless charger 1100 at connector 1300. Connector 1300 can be a lightning, USB type C, or other connector receptacle. Board 1410 can receive this power and provide power to control circuitry 1412 (shown in FIG. 13) in charging puck 1140. Board 1410 can provide power over flexible circuit board 1132 to control circuitry 1312 in first leaf 1110. Data can be received at connector 1300 of wireless charger 1100. This data can be received by board 1410 and provided to control circuitry 1144 in charging puck 1140. Charging puck 1140 can utilize coil 1430 to provide the data to a second electronic device. Alternatively, board 1410 can provide data to control circuitry 1312 over flexible circuit board 1132 in main hinge 1130. Control circuitry 1312 can use coil 1330 to provide data to a first electronic device. Data can similarly be received by control circuitry 1312 and control circuitry 1412 (shown in FIG. 13) and either used by wireless charger 1100 or provided to an external device via connector 1300. Charging puck 1140 can be attached to second leaf 1120 by puck hinge 1150.

FIG. 15A and FIG. 15B illustrate a puck hinge according to an embodiment of the present invention. Puck hinge 1510 can be used as puck hinge 1150 in FIG. 12 or as a puck hinge in other embodiments of the present invention. Wireless charger 1100 can include second leaf 1120 supporting charging puck 1140. Charging puck 1140 can be connected to second leaf 1120 by puck hinge 1510. Second leaf 1120 can include top surface 1126, while charging puck 1140 can include top surface 1142. Puck hinge 1510 can include rotatable shaft 1520. In FIG. 15A, wireless charger 1100 can be closed and charging puck 1140 can be in the down position. Surface 1523 of puck hinge 1610 can be adjacent to stop 1522. In this position, top surface 1126 of second leaf 1120 can be parallel to or aligned with top surface 1142 of charging puck 1140. In FIG. 15B, charging puck 1140 can be rotated to an up position and wireless charger 1100 can be open. In this position, surface 1525 can be adjacent to stop 1524 of second leaf 1120. In this position, top surface 1142 of charging puck 1140 can be approximately orthogonal or normal to top surface 1126 of second leaf 1120. For example, top surface 1142 can be at an angle between 85 degrees and 89 degrees relative to top surface 1126. Top surface 1142 can be an angle of 89 degrees relative to top surface 1126.

FIG. 16A and FIG. 16B illustrate a puck hinge according to an embodiment of the present invention. Puck hinge 1610 can be used as puck hinge 1150 in FIG. 12 or as a puck hinge in other embodiments of the present invention. Wireless charger 1100 can include second leaf 1120 supporting charging puck 1140. Charging puck 1140 can be connected to second leaf 1120 by puck hinge 1610. Second leaf 1120 can include top surface 1126, while charging puck 1140 can include top surface 1142. Puck hinge 1610 can include rotatable shaft 1620. In FIG. 16A, wireless charger 1100 can be closed and charging puck 1140 can be in the down position. Surface 1612 of puck hinge 1610 can be adjacent to second bottom enclosure 1450. In this position, top surface 1126 of second leaf 1120 can be parallel to or aligned with top surface 1142 of charging puck 1140. In FIG. 16B, charging puck 1140 can be rotated to an up position and wireless charger 1100 can be open. In this position, surface 1622 can be adjacent to surface 1624 of second leaf 1120. In this position, top surface 1142 of charging puck 1140 can be approximately orthogonal or normal to top surface 1126 of second leaf 1120. For example, top surface 1142 can be at an angle between 85 degrees and 89 degrees relative to top surface 1126. Top surface 1142 can be an angle of 89 degrees relative to top surface 1126.

Figure 17A:
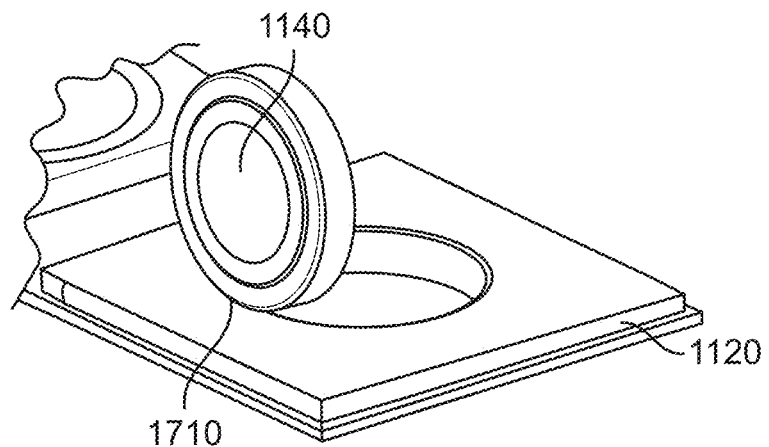
FIG. 17A and FIG. 17B illustrate another puck hinge according to an embodiment of the present invention.
Figure 17B:
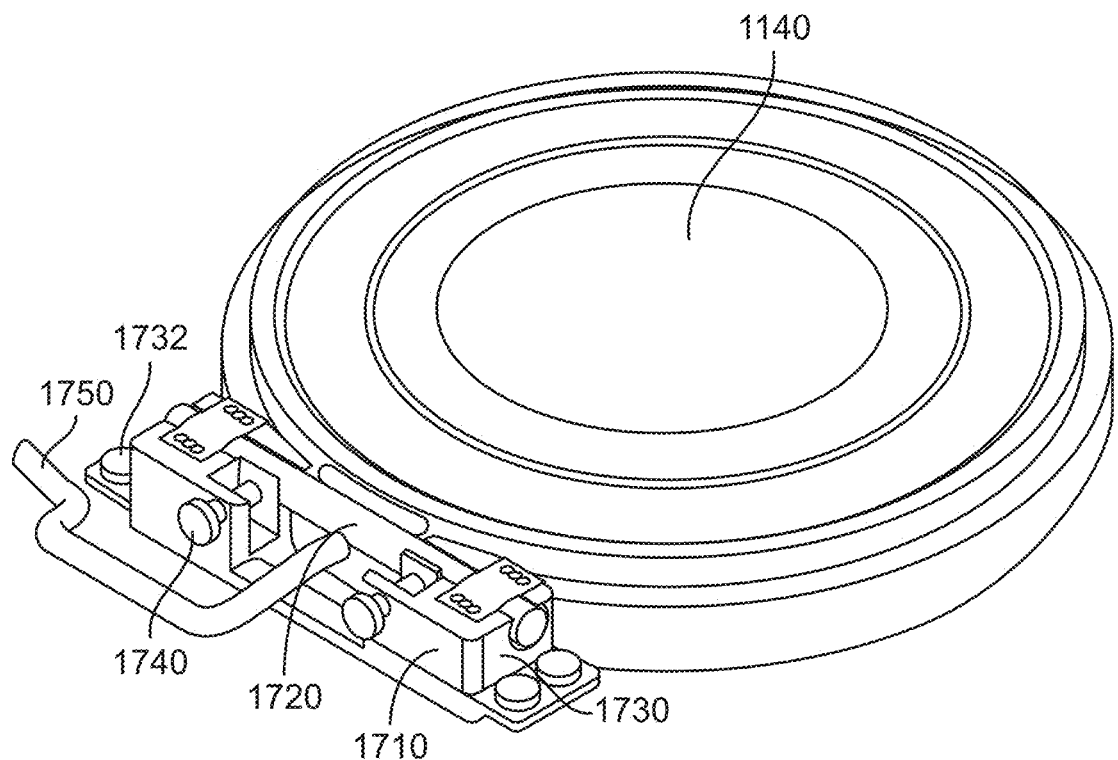

FIG. 17A and FIG. 17B illustrate another puck hinge according to an embodiment of the present invention. This puck hinge 1710 can be used as puck hinge 1150 in FIG. 12 or as a puck hinge and other embodiments of the present invention. Puck hinge 1710 can connect charging puck 1140 to second leaf 1120. Puck hinge 1710 can include shaft 1720 supported by block 1730. Block 1730 can be fastened to second bottom enclosure 1450 (shown in FIG. 13) or other appropriate structure using fasteners 1732. Wire 1750 can be electrically connected to circuitry and other components in charging puck 1140.

In these and other embodiments of the present invention, it can be desirable that a puck hinge, such as puck hinge 1150 in FIG. 12, or puck hinge 1710, provide a resistance to movement. This resistance to movement can help to maintain a position of charging puck 1140 relative to second leaf 1120 when charging puck 1140 is charging a second electronic device. Accordingly, fasteners 1740 can be used to adjust an amount of tension or pressure applied to shaft 1720. An increase in the pressure on shaft 1720 applied by fasteners 1740 can increase a resistance to a movement of charging puck 1140 relative to second leaf 1120.

In these and other embodiments of the present invention, it can further be desirable that a puck hinge, such as puck hinge 1150 in FIG. 12 or puck hinge 1710, provide an increased physical clearance to second leaf 1120. An example of a puck hinge that can provide this additional physical clearance is shown in the following figure.

Figure 18A:
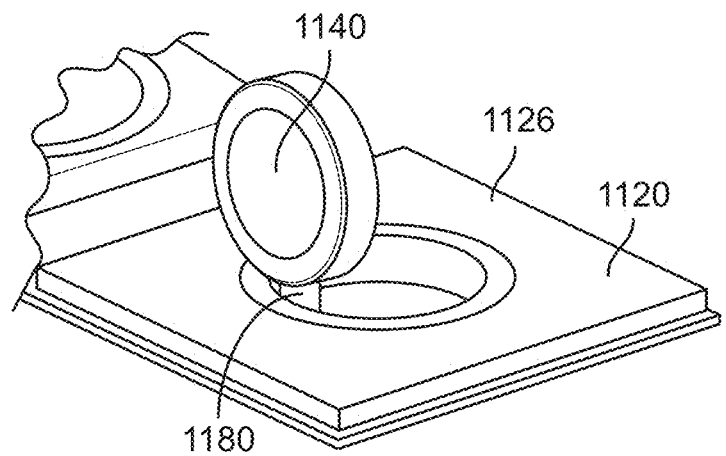
FIG. 18A and FIG. 18B illustrate another puck hinge according to an embodiment of the present invention
Figure 18B:
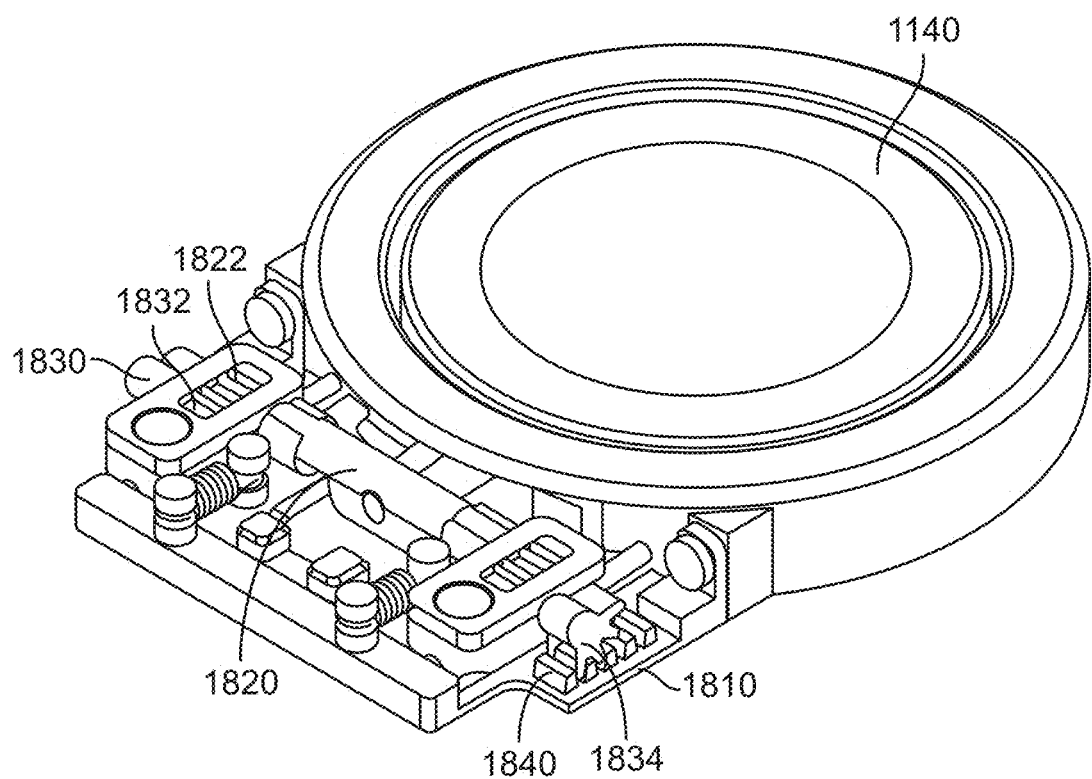

FIG. 18A and FIG. 18B illustrate another puck hinge according to an embodiment of the present invention. Puck hinge 1810 can be used as puck hinge 1150 in FIG. 12 or as a puck hinge in other embodiments of the present invention. Puck hinge 1180 can connect charging puck 1140 to second leaf 1120. Puck hinge 1810 can include first shaft 1820. First shaft 1820 can include gears 1822 which can drive gears 1832 of second shafts 1830. Second shafts 1830 can include gears 1834. Gears 1834 can mesh with rack 1840 to provide lateral movement for first shaft 1820 and second shafts 1830.

In this configuration, the axis of rotation for puck hinge 1810 can move laterally along rack 1840. As a result, charging puck 1140 can rotate from the down position to the up position and have a greater clearance to top surface 1126 of second leaf 1120. This can facilitate positioning of second electronic device on second leaf 1120 for charging.

Again, in these and other embodiments of the present invention, it can be desirable but a puck hinge, such as puck hinge 1150 in FIG. 12, or puck hinge 1710, provide a resistance to movement. This resistance to movement can help to maintain a position of charging puck 1140 relative to second leaf 1120 when charging puck 1140 is charging a second electronic device. Accordingly embodiments of the present invention can utilize structures, such as friction clips, to provide resistance to this movement. This resistance can be symmetrical, that is, the resistance can be the same for an upward movement of charging puck 1140 as a downward movement of charging puck 1140. In other embodiments of the present invention, the resistance to downward movement can be increased relative to the resistance of upward movement. This can provide a puck hinge 1150 that can hold a second device in place while being charged, while allowing wireless charger 1100 to be readily opened for use. Examples are shown in the following figures.

Figure 19A:
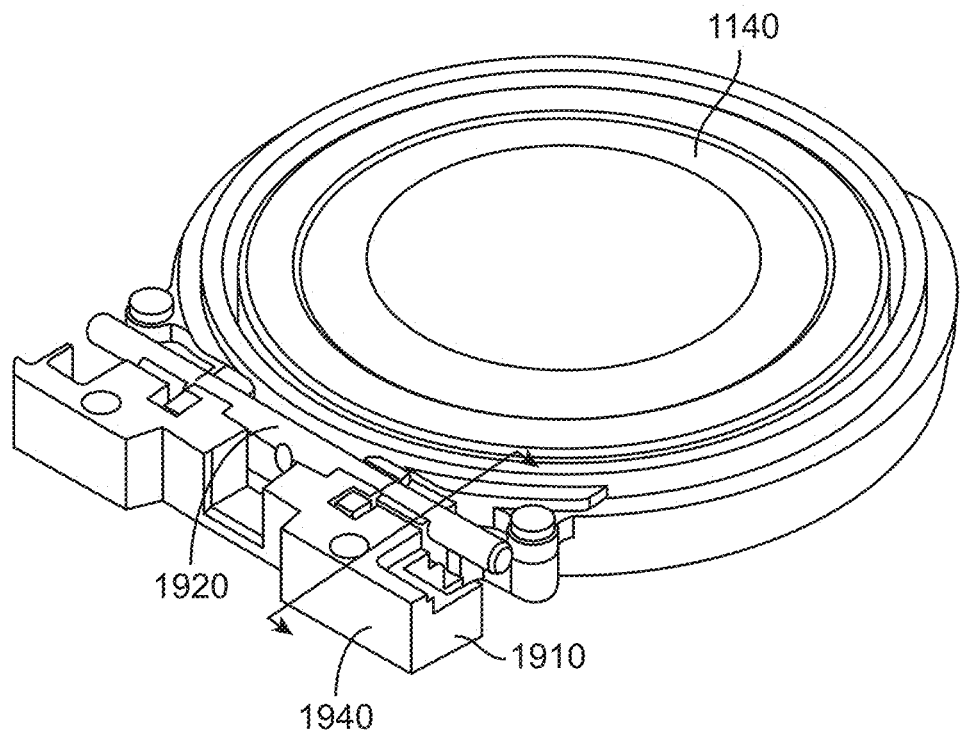
FIG. 19A and FIG. 19B illustrate a puck hinge according to an embodiment of the present invention.
Figure 19B:
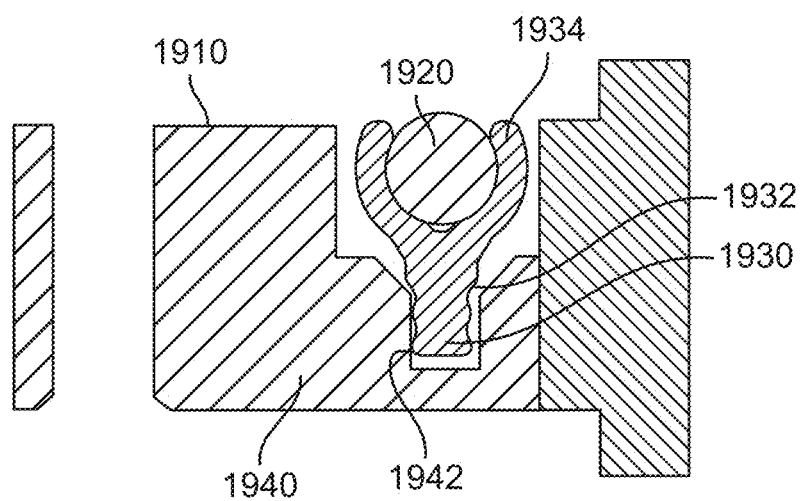

FIG. 19A and FIG. 19B illustrate a puck hinge according to an embodiment of the present invention. In this example, charging puck 1140 can be attached to puck hinge 1910. Puck hinge 1910 can include shaft 1920 and spring clip 1930. Spring clip 1930 can be a single spring clip, or it can be formed of several spring clips placed parallel in slot 1942 of block 1940. Spring clip 1930 can include tab 1932 and arms 1934. Tab 1932 can be inserted into slot 1942, while arms 1934 can hold shaft 1920. Interference at surfaces between shaft 1920 and arms 1934 can provide resistance to movement of charging puck 1140 relative to second leaf 1120 (shown in FIG. 12.) Arms 1934 can have differing widths to provide an asymmetrical resistance to an up and down movement of charging puck 1140, or arms 1934 can provide a symmetrical resistance to an up-and-down movement of charging puck 1140.

Figure 20A:
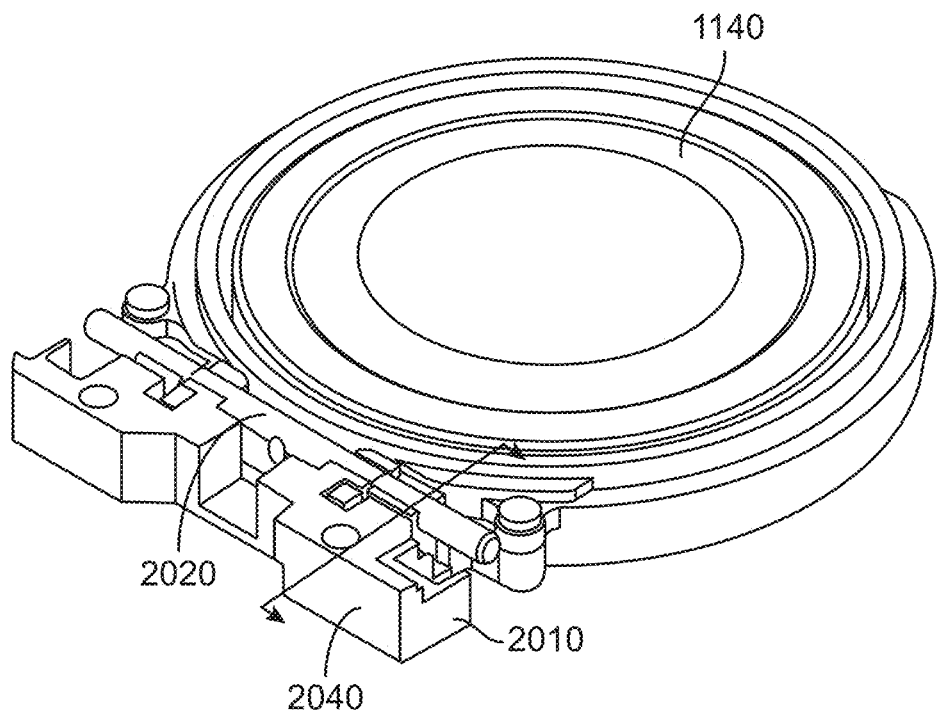
FIG. 20A and FIG. 20B illustrate a puck hinge according to an embodiment of the present invention.
Figure 20B:
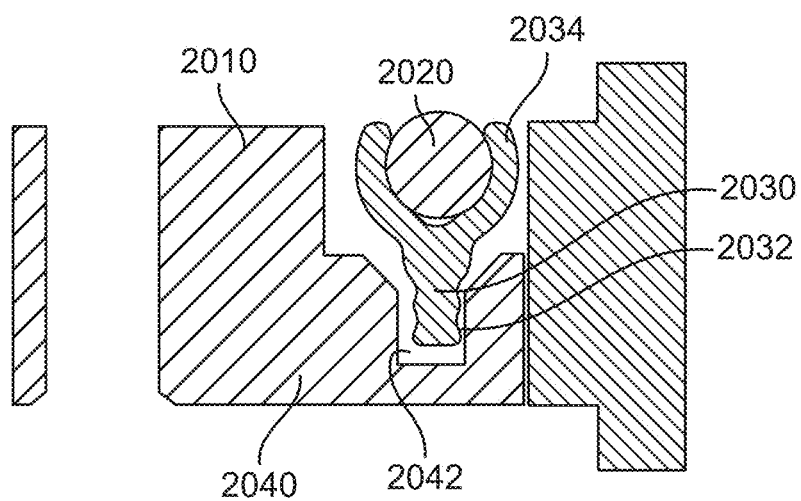

FIG. 20A and FIG. 20B illustrate a puck hinge according to an embodiment of the present invention. In this example, hinge 2010 can include shaft 2020. Shaft 2020 can be held in place by spring clips 2030, which can be the same or similar to spring clips 1930 (shown in FIG. 19B.) Spring clip 2030 can include tab 2032 that can be located in slot 2042 of block 2040 of hinge 2010. Shaft 2020 can be cammed or otherwise non-cylindrical to provide a differential resistance between up-and-down movements of charging puck 1140. Arms 2034 can have differing widths to provide an asymmetrical resistance to up-and-down movement of charging puck 1140, or arms 2034 can be equal to provide a symmetrical resistance to up-and-down movement of charging puck 1140.

Figure 21A:
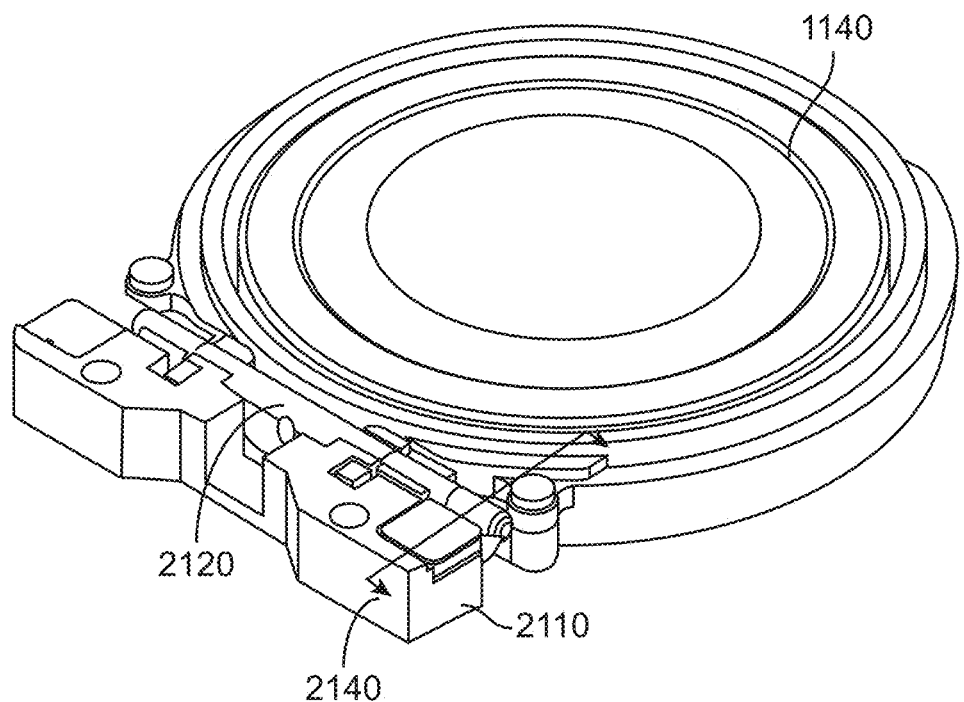
FIG. 21A and FIG. 21B illustrate a puck hinge according to an embodiment of the present invention.
Figure 21B:
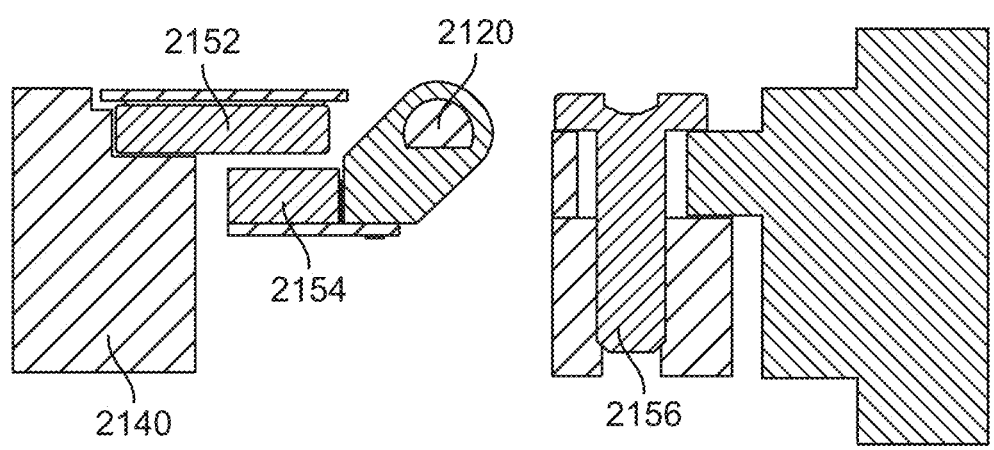

FIG. 21A and FIG. 21B illustrate a puck hinge according to an embodiment of the present invention. In this example, puck hinge 2110 can provide for movement of charging puck 1140. In this example, shaft 2120 of puck hinge 2110 can be supported by block 2140. Shaft 2120 can rotate between an up position and a down position. Magnets 2152 and 2154 can be arranged to attract each other to secure charging puck 1140 in place when charging puck 1140 is in the down position. Magnets 2154 and magnet 2156 can attract each other to secure charging puck 1140 in place when charging puck 1140 is in the up position. The magnetic fields between these magnets can provide a resistance to movement of charging puck 1140. Magnet 2152 and magnet 2156 can be sized to provide and adjust resistances to movements of charging puck 1140. A resistance to a down movement and a resistance to an up movement can be symmetrical or asymmetrical depending on sizing.

Figure 22:
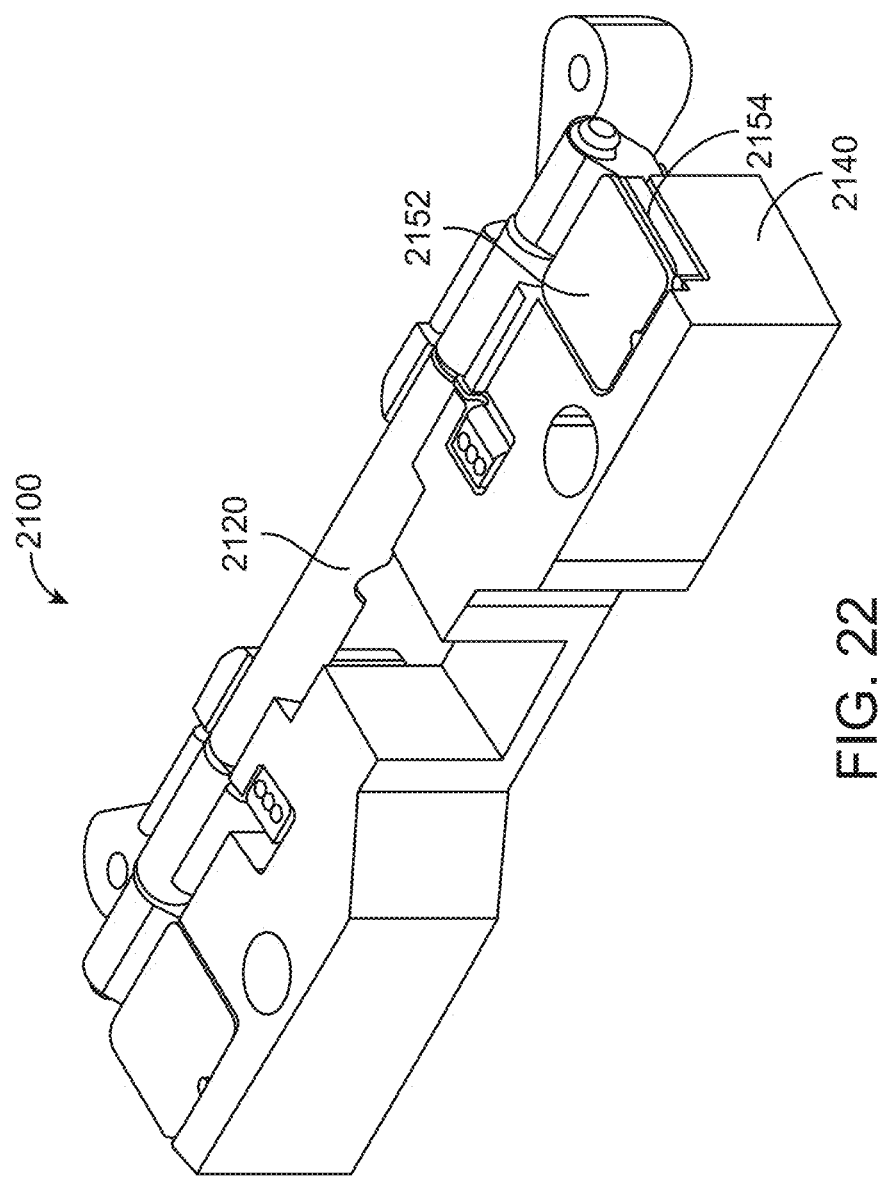
FIG. 22 is a more detailed view of the puck hinge of FIG. 21A and FIG. 21B.

FIG. 22 is a more detailed view of the puck hinge of FIG. 21A and FIG. 21B. In this example, shaft 2120 of puck hinge 2100 can be supported by block 2140. Magnet 2154 can be attached to shaft 2120, while magnet 2152 can be attached to block 2140.

Figure 23:
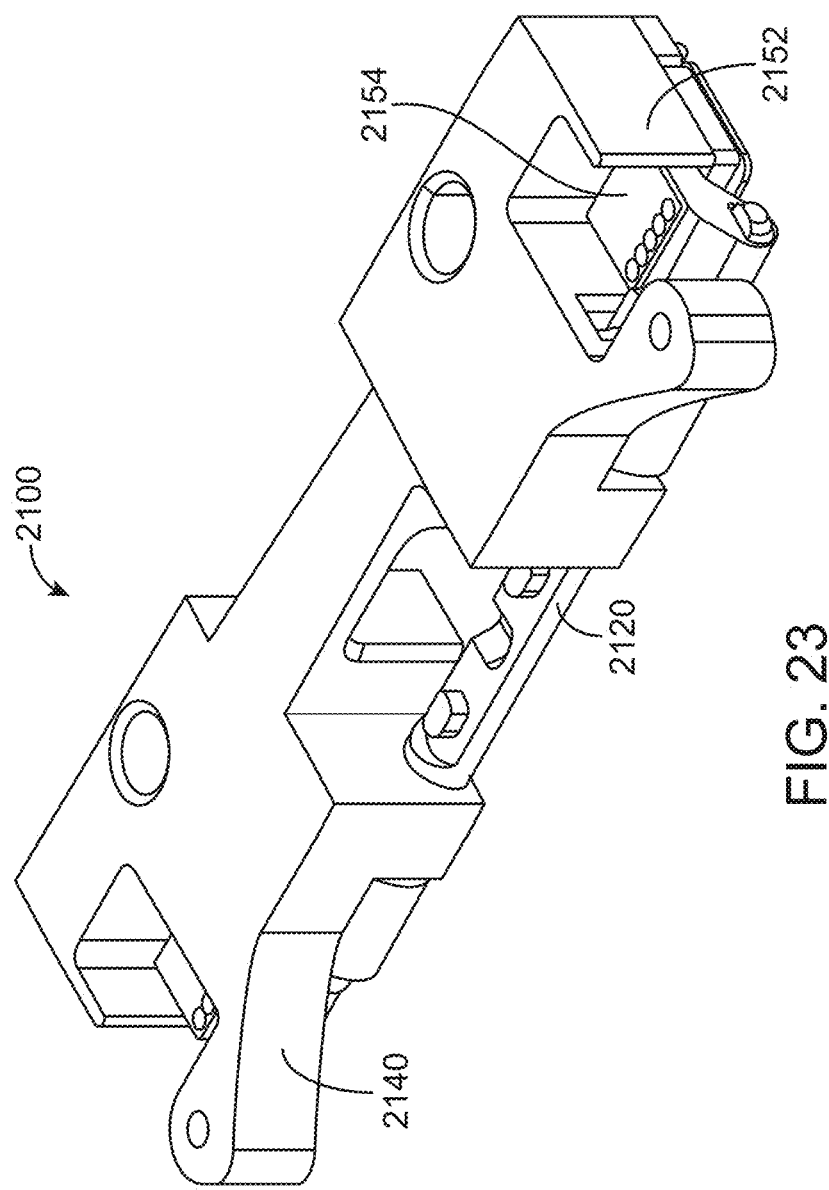
FIG. 23 is an underside view of the puck hinge of FIG. 21A and FIG. 21B.

FIG. 23 is an underside view of the puck hinge of FIG. 21A and FIG. 21B. In this example, shaft 2120 of puck hinge 2100 can be supported by block 2140. Magnet 2154 can be attached to shaft 2120, while magnet 2152 can be attached to block 2140.

As shown in FIG. 12, first leaf 1110 and second leaf 1120 can be connected by main hinge 1130. Main hinge 1130 can allow wireless charger 1100 to fall the compact shape. For example, main hinge 1130 can allow top surface 1116 of first leaf 1110 to fold adjacent to top surface 1126 of second leaf 1120. Similarly, main hinge 1130 can allow bottom surface 1118 of first leaf 1110 to fold adjacent to bottom surface 1128 of second leaf 1120. Unfortunately this folding can wear main hinge 1130 and its components. For example, main hinge 1130 can include flexible circuit board 1132. Accordingly, flexible circuit board 1132 can include features to improve its reliability. Examples are shown in the following figures.

Figure 24:
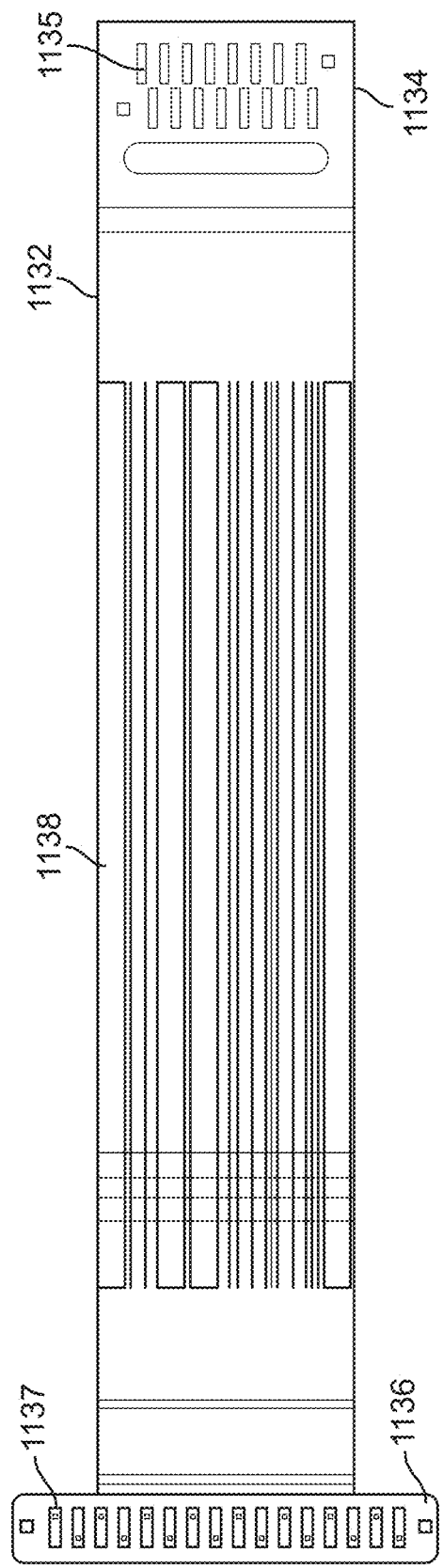
FIG. 24 illustrates a flexible circuit board that can be used in the main hinge according to an embodiment of the present invention.

FIG. 24 illustrates a flexible circuit board that can be used in the main hinge according to an embodiment of the present invention. Flexible circuit board 1132 can include a first end 1134 for connecting to board 1410 as shown in FIG. 14, and a second end 1136 for connecting to control circuitry 1312, also as shown in FIG. 14. First end 1134 can include contacts 1135 for mating with corresponding contacts on board 1410, while second end 1136 can include contacts 1137 for mating with corresponding contacts on control circuitry 1312. Flexible circuit board 1132 can include a number of traces 1138 for connecting contacts 1135 to contacts 1137.

Figure 25:
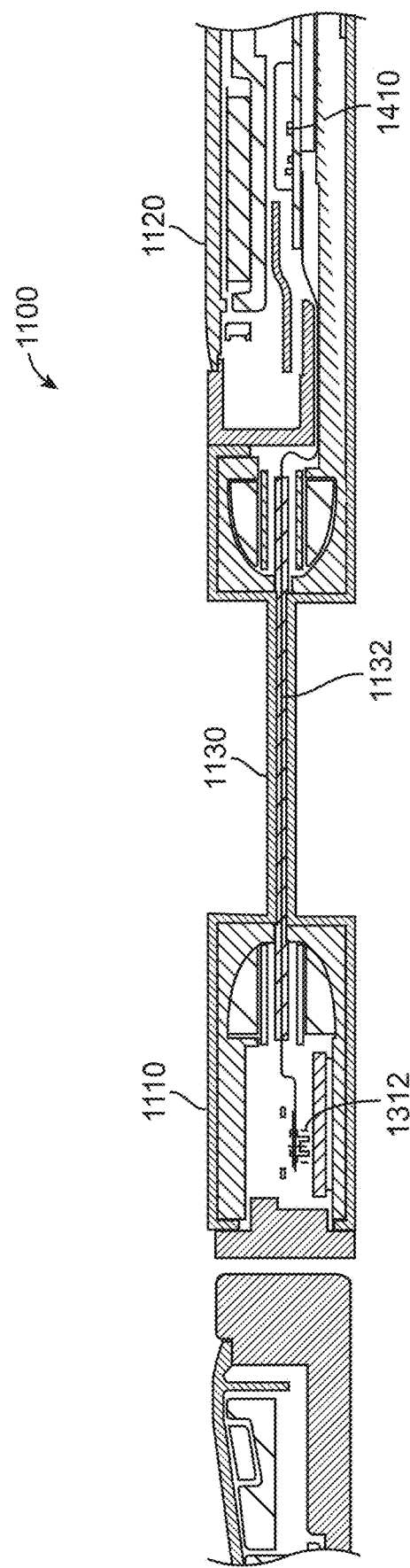
FIG. 25 illustrates a side view of a portion of a wireless charger according to an embodiment of the present invention.

FIG. 25 illustrates a side view of a portion of a wireless charger according to an embodiment of the present invention. Main hinge 1130 of wireless charger 1100 can include flexible circuit board 1132. Flexible circuit board 1132 can provide pathways from board 1410 in the first leaf 1110 to control circuitry 1312 in second leaf 1200.

To provide an improved durability, traces on flexible circuit board 1132 can have non-linear shapes, such as curved, looped, or serpentine shapes or patterns. These serpentine shapes or patterns can be more resilient to stretching and compressing as main hinge 1130 folds and unfolds. Examples are shown in the following figures.

Figure 26:
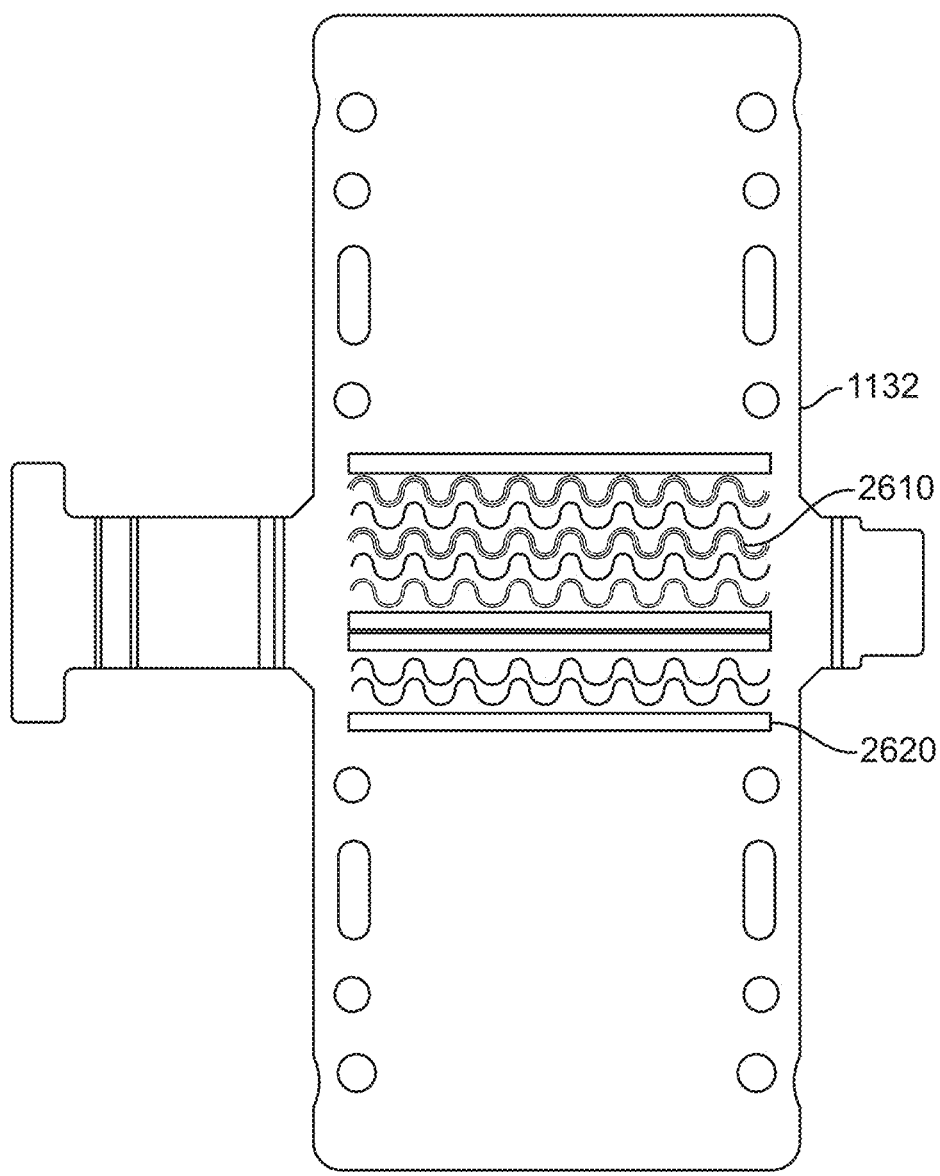
FIG. 26 illustrates an example of a flexible circuit board having serpentine conductors according to an embodiment of the present invention.

FIG. 26 illustrates an example of a flexible circuit board having serpentine conductors according to an embodiment of the present invention. In this example, traces 2610 can have a serpentine shape. This can be particularly useful were traces are narrow and otherwise more susceptible to damage due to the folding of main hinge 1130. Traces 2620 can be wider, for example to convey power. Since traces 2620 are wider and therefore potentially more robust, they might not require a serpentine shape.

Figure 27A:
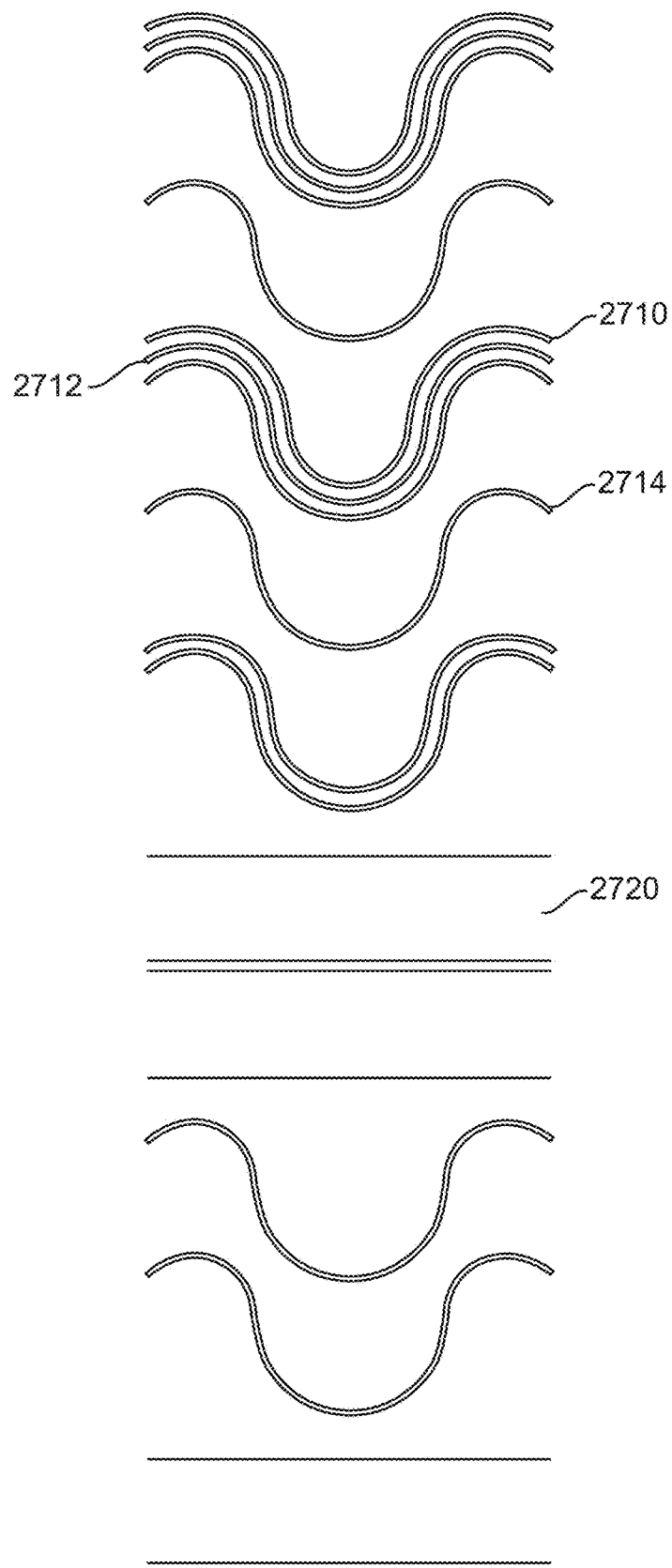
FIGS. 27A and 27B illustrate examples of traces that can be used on a flexible circuit board in a main hinge according to an embodiment of the present invention.
Figure 27B:
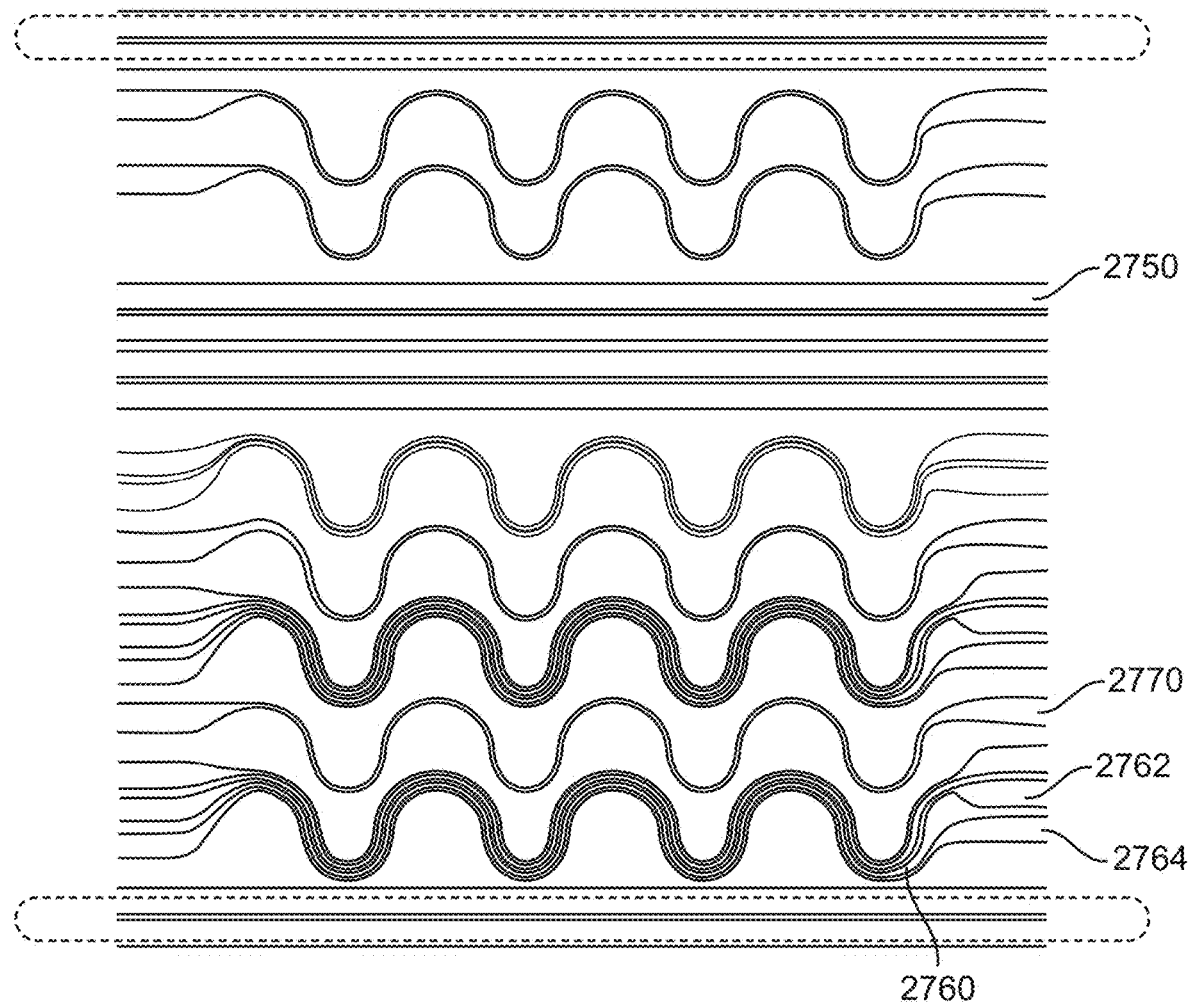

FIGS. 27A and 27B illustrate examples of traces that can be used on a flexible circuit board in a main hinge according to an embodiment of the present invention. In FIG. 27A, traces 2710 can have a serpentine shape, while traces 2720 do not. The serpentine shapes can be nested as shown by traces 2712, or they can be separate as shown by traces 2714. Traces 2710 can be partially nested traces. In FIG. 27B, traces 2750 can have sufficient width that is not serpentine. Traces 2760 can be nested and serpentine. Traces 2760 can terminate in ends 2762 and 2764. These traces can be used for one or more signals, where multiple traces are used for redundancy. Traces 2770 can be single traces.

Figure 28B:
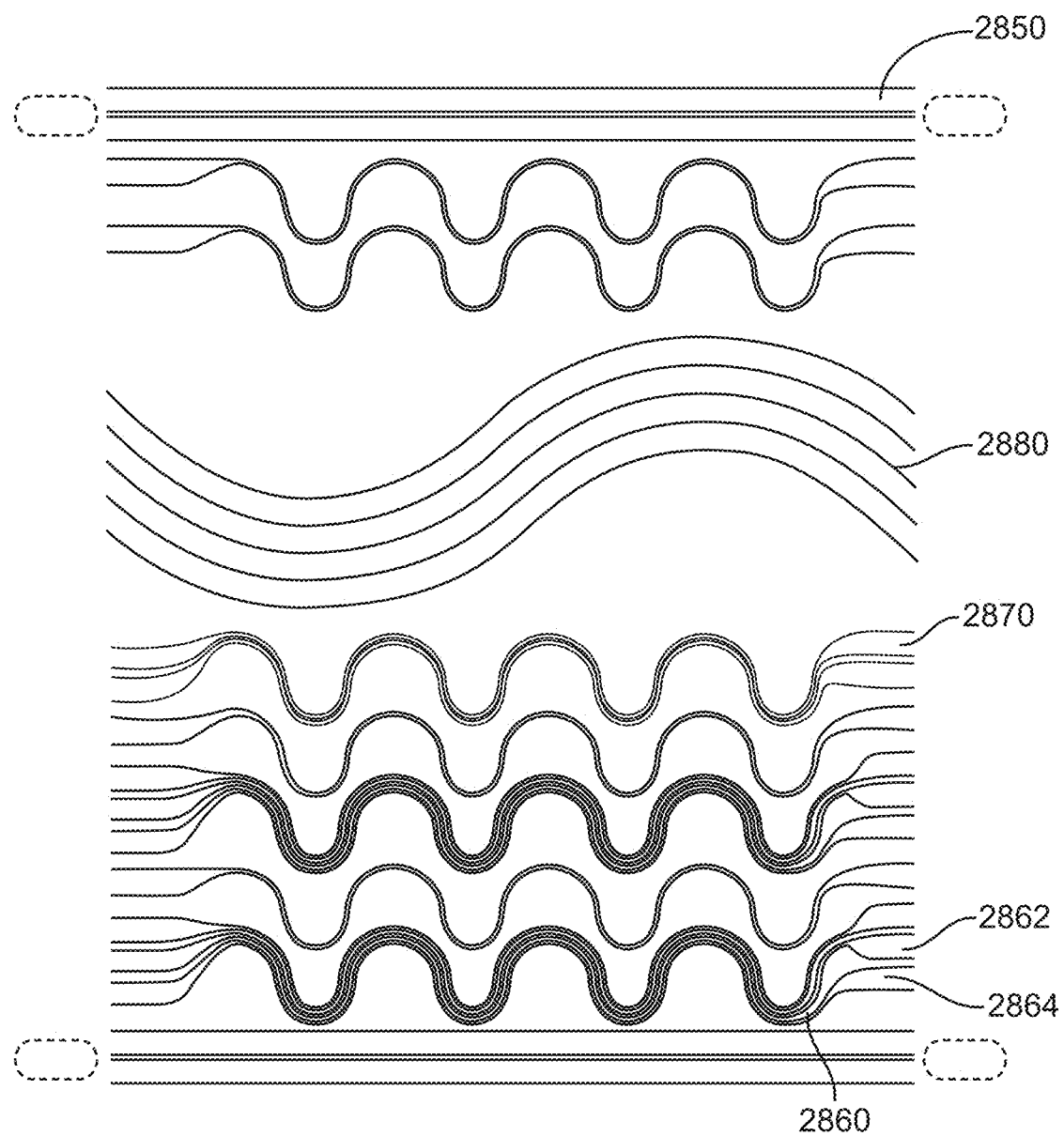

FIGS. 28A and 28B illustrate examples of traces that can be used on a flexible circuit board in the main hinge according to an embodiment of the present invention. In FIG. 28A, traces 2810 can be fully nested serpentine traces. Traces 2820 can be wider traces and accordingly might not have a serpentine shape. Traces 2830 can also be fully nested traces. In FIG. 28B, traces 2850 can have sufficient width that is not serpentine. Traces 28800 can be nested and serpentine. Traces 2860 can terminate in ends 2862 and 2864. These traces can be used for one or more signals, where multiple traces are used for redundancy. Traces 2870 can be single traces.

Figure 29:
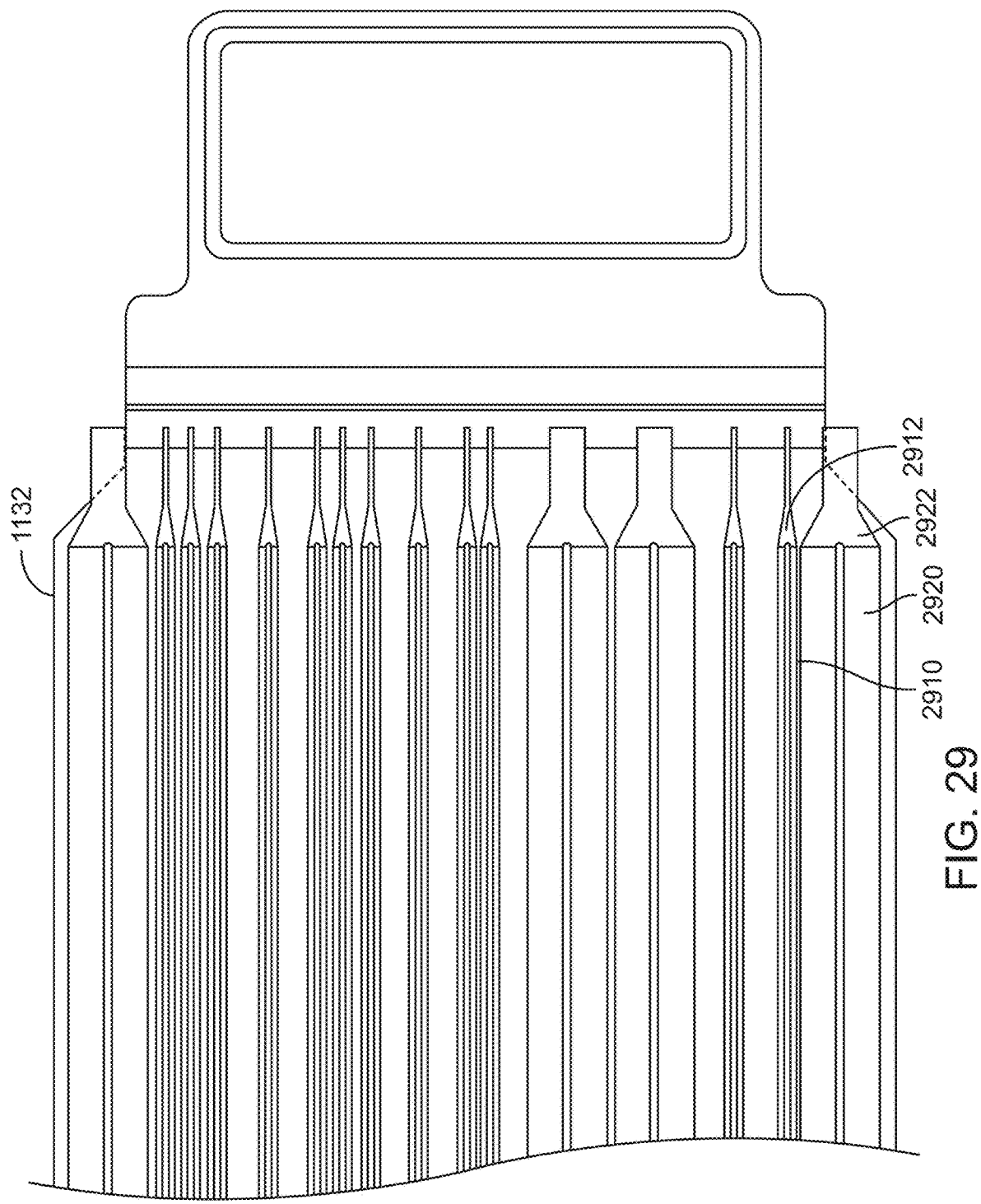
FIG. 29 illustrates examples of traces that can be used on a flexible circuit board in a main hinge according to an embodiment of the present invention.

FIG. 29 illustrates examples of traces that can be used on a flexible circuit board in a main hinge according to an embodiment of the present invention. In this example, traces 2910 can be conductors formed of two individual traces 2910 that are joined together at end 2912. Similarly, traces 2920 can be conductors formed of two individual traces 2920 that are joined together at end 2922.

In these and other embodiments of the present invention, various layers can be used in main hinge 1130 to improve durability. An example is shown in the following figure.

Figure 30:
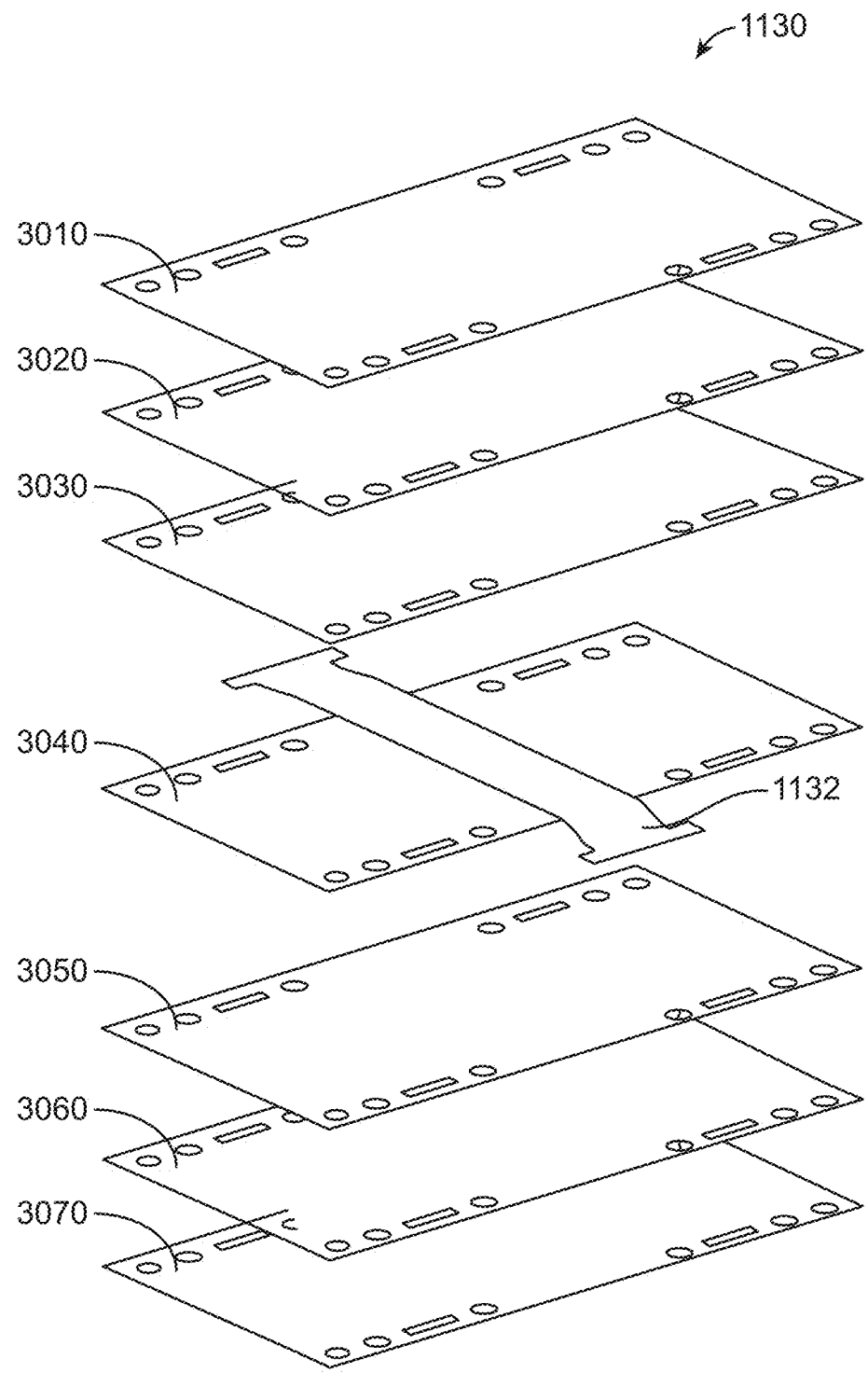
FIG. 30 illustrates layers that can be used for a main hinge according to an embodiment of the present invention.

FIG. 30 illustrates layers that can be used for a main hinge according to an embodiment of the present invention. In this example, first layer 3010 can be attached to second layer 3030 using a heat activated film 3020 or other adhesive layer. Second layer 3030 and flexible circuit board 1132 can be attached to third layer 3050 by heat activated film 3040 or other adhesive layer. Third layer 3050 can be attached to fourth layer 3070 by heat activated film 3060 or other adhesive layer. First layer 3010 and fourth layer 3070 can be a pliable material such as nitrile rubber. Second layer 3030 and third layer 3050 can be formed of plastic or other material such as a liquid-crystal polymer.

Figure 31:
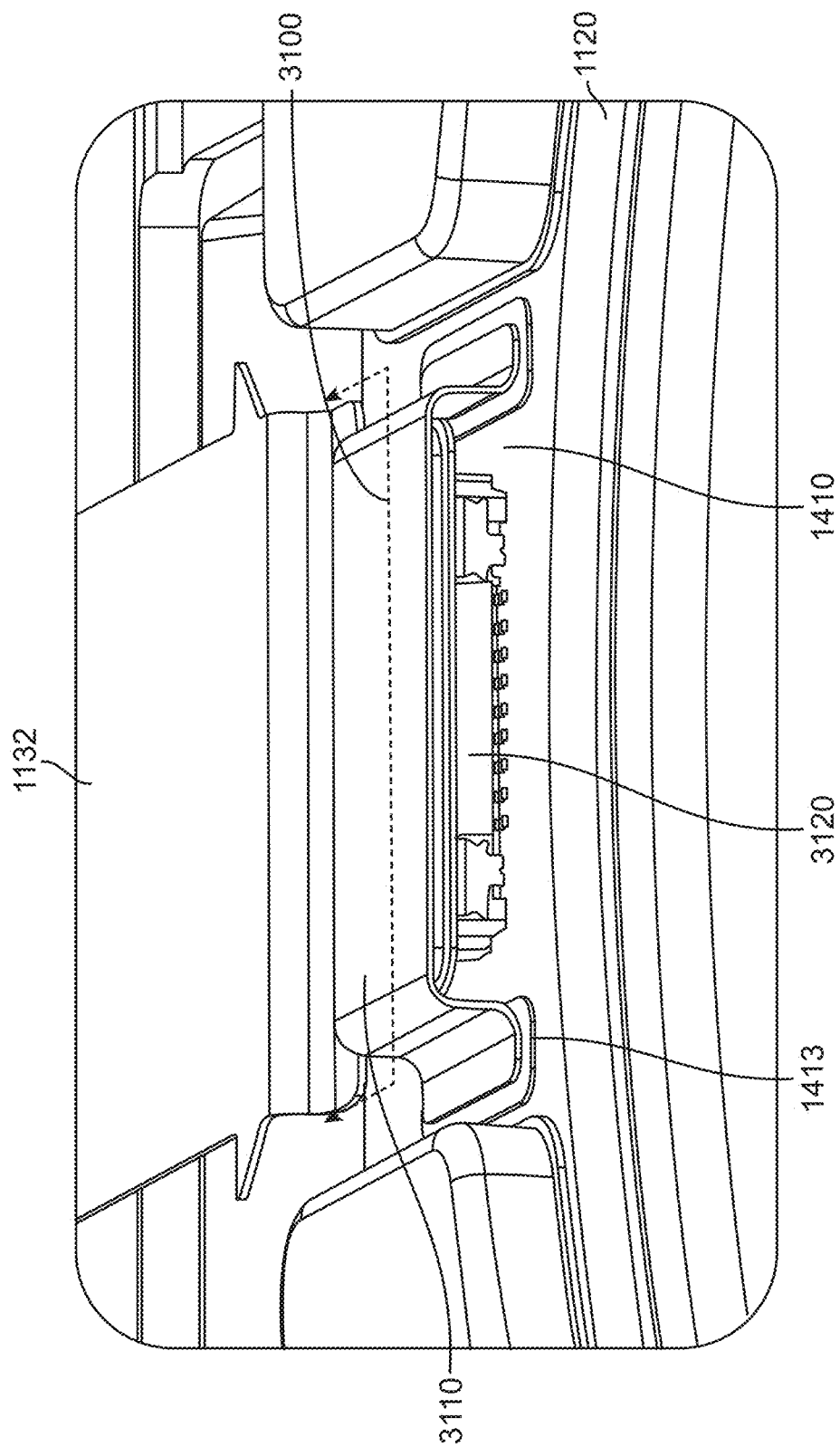
FIG. 31 illustrates a connector that can be used in attaching a flexible circuit board for a main hinge to a board in a leaf according to an embodiment of the present invention.

FIG. 31 illustrates a connector that can be used in attaching a flexible circuit board for a main hinge to a board in a leaf according to an embodiment of the present invention. In this example, connector 3100 can connect flexible circuit board 1132 to second leaf 1120. Connector 3100 can include cowling 3110 soldered to pads 1413 on board 1410. Board-to-board connector 3120 can form connections between flexible circuit board 1132 and board 1410.

Figure 32:
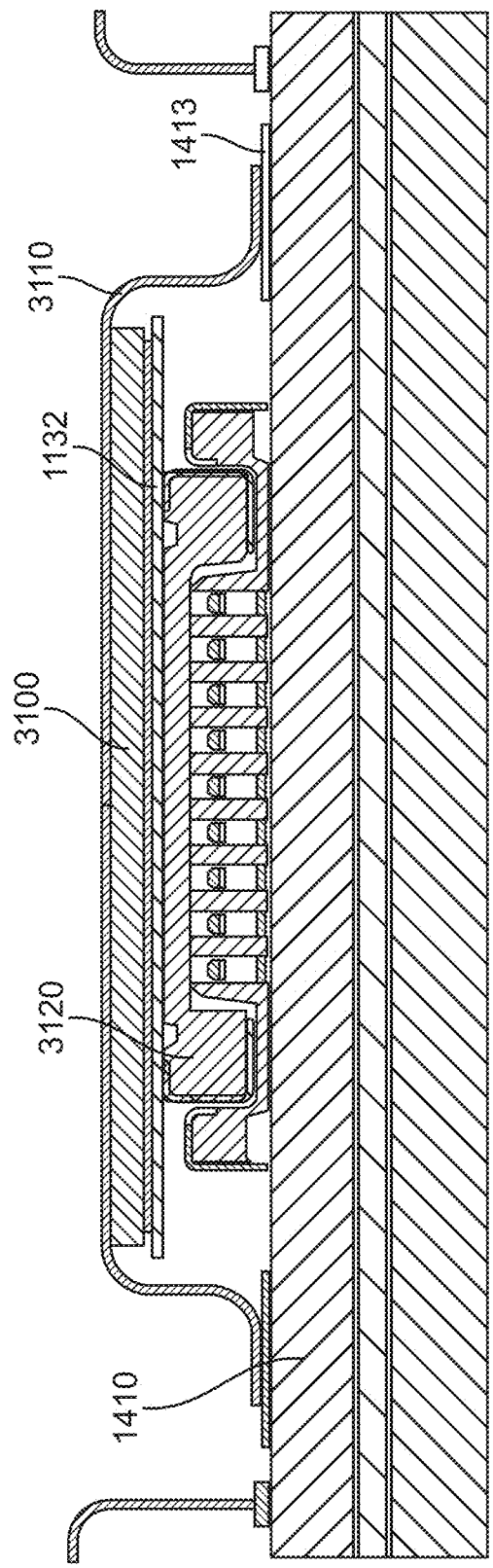
FIG. 32 illustrates a side view of the connector FIG. 31.

FIG. 32 illustrates a side view of the connector FIG. 31. This cutaway side view is indicated along line A-B in FIG. 31. Connector 3100 can include cowling 3110 that is soldered to pads 1413 on board 1410. Board-to-board connector 3120 can connect flexible circuit board 1132 to board 1410.

Figure 33A:
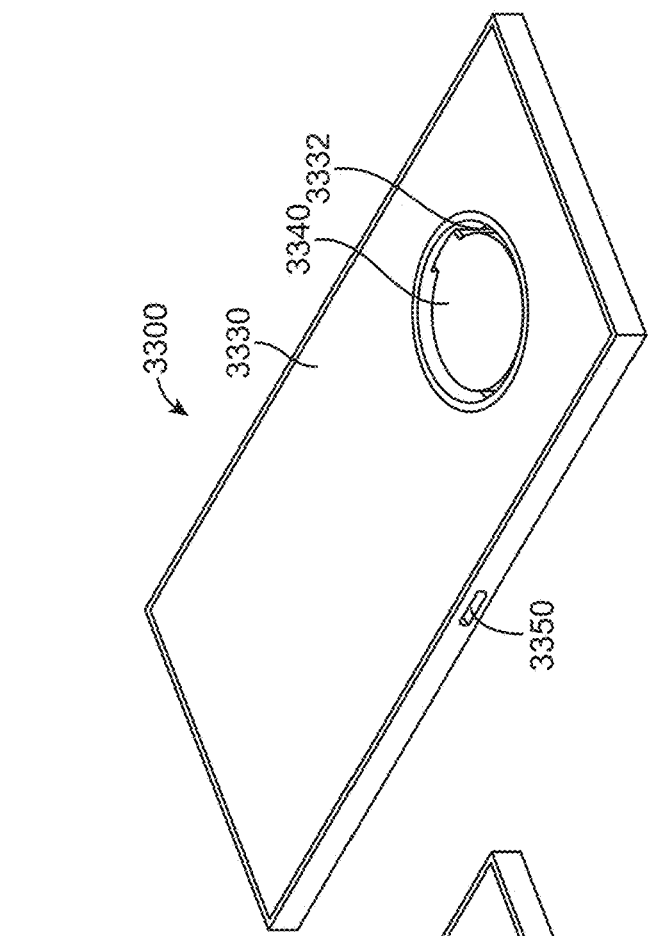
FIG. 33A and FIG. 33B illustrate a wireless charger according to an embodiment of the present invention.
Figure 33B:
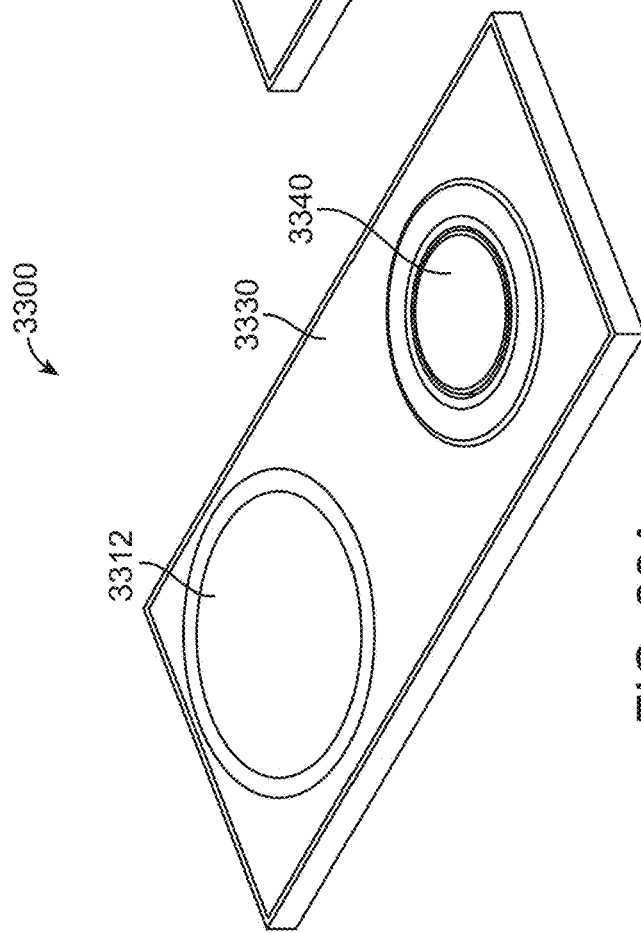

FIG. 33A and FIG. 33B illustrate a wireless charger according to an embodiment of the present invention. Wireless charger 3300 can be similar to wireless charger 100 (shown in FIG. 1) and wireless charger 1100 (shown in FIG. 12), other than base 3330 can be rigid and not foldable. Wireless charger 3300 can include base 3330 supporting charging puck 3340 and contacting surface 3312. Contacting surface 3312 can be similar to the other contacting services shown above, such as contacting surface 112 in FIG. 1. Charging puck 3340 can be similar to the other charging pucks shown herein, such as charging puck 1140, shown in FIG. 12. Charging puck 3340 can be attached to base 3330 through puck hinge 3650. Base 3330 can include opening 3332 to allow access for a user to push charging puck 3340 into an up position for use in charging a second electronic device. Wireless charger 3300 can further include connector 3350 for receiving power. Connector 3350 can also be used for receiving and providing data. Connector 3350 can be a Lightning, USB Type-C, or other type of connector receptacle.

Figure 34:
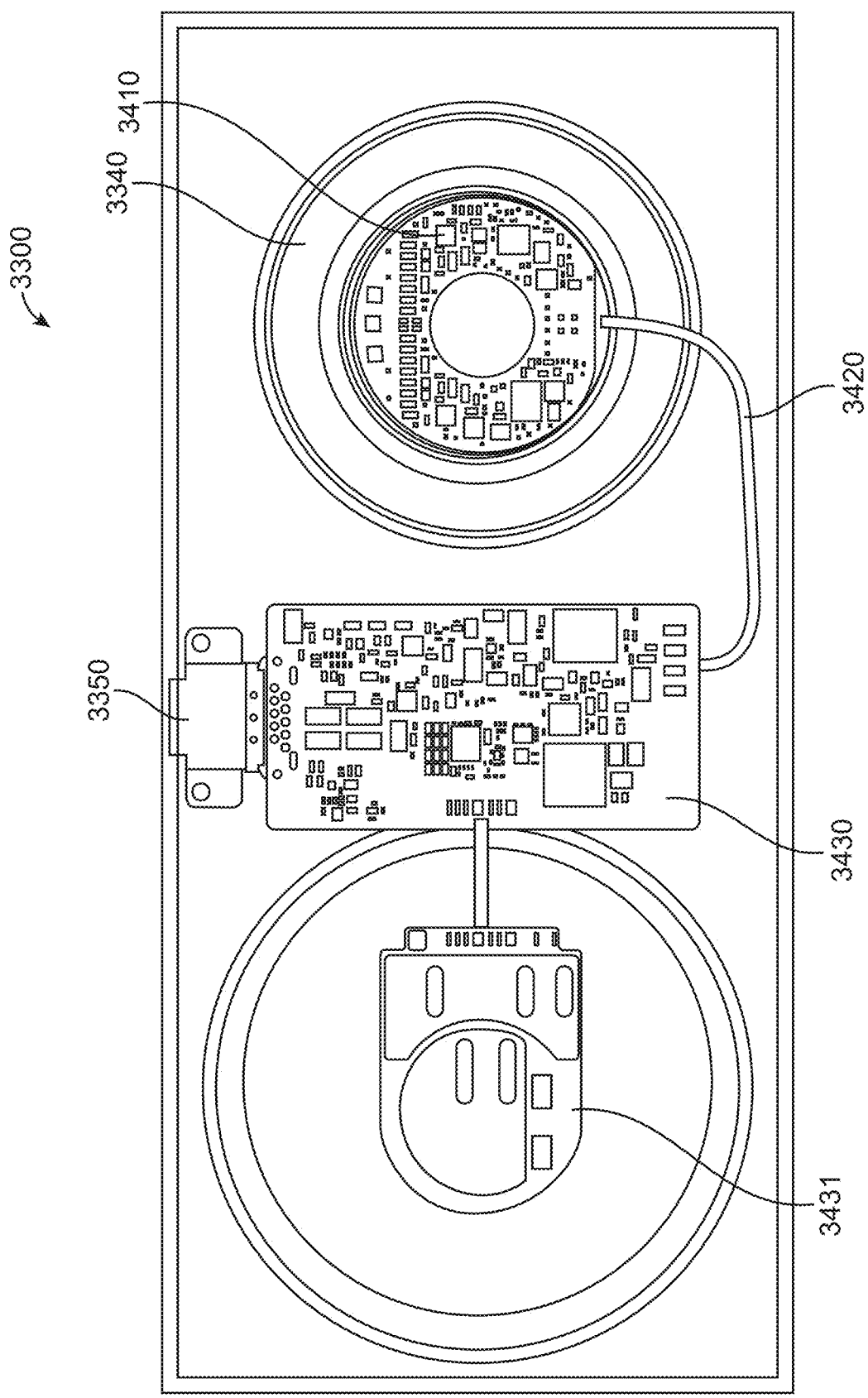
FIG. 34 illustrates electronics that can be used for the wireless charger of FIG. 33A and FIG. 33B.

FIG. 34 illustrates electronics that can be used for the wireless charger of FIG. 33A and FIG. 33B. Power and data can be received at connector 3350 of wireless charger 3300. Power and data can be received from connector 3350 by board 3430. Power and data can be provided to control circuitry 3410 through cable 3420. Control circuitry 3431 can be located under contacting surface 3312 (shown in FIG. 33A). Control circuitry 3410 can be located in charging puck 3340. Data can similarly be provided from control circuitry 3431 or control circuitry 3410 through board 3430 to connector 3350.

Figure 35:
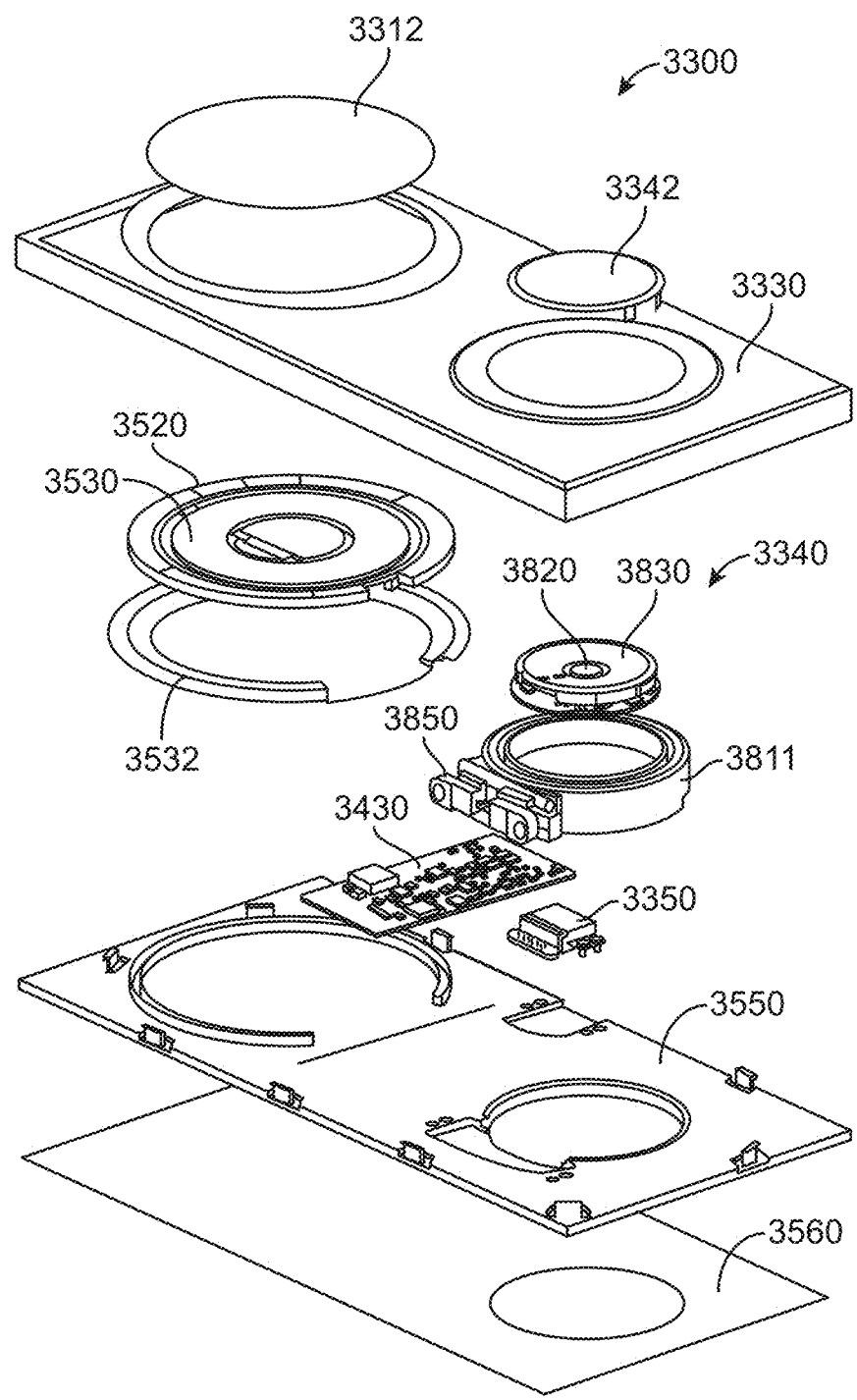
FIG. 35 is an exploded view of the wireless charger of FIG. 33A and FIG. 33B.

FIG. 35 is an exploded view of the wireless charger of FIG. 33A and FIG. 33B. Wireless charger 3300 can include base 3330 supporting contacting surface 3312 and top surface 3342. Alignment and charging components can be provided for contacting surface 3312, which can mate with a first electronic device. Wireless charger 3300 can include magnet array 3520 as an alignment and attachment feature to align the first electronic device with coil 3530 and to secure the first electronic device against contacting surface 3312. Wireless charger can further include coil 3530, which can be laterally and circumferentially surrounded by magnet array 3520. Coil 3530 can be used to provide power to the first electronic device. Shield 3532 can support magnet array 3520 and coil 3530. Shield 3532 can be attached to bottom enclosure 3550. A foot 3560 can be placed under bottom enclosure 3550 to prevent marring scratches on surfaces on which wireless charger 3300 can be used. Charging puck 3340 can include magnet 3820. Magnet 3820 can be used as an alignment feature, as well as an attachment feature, to align and attach the second electronic device to charging puck 3340. Magnet 3820 and coil 3830 can be housed in charging puck enclosure 3811. Coil 3830 can be used to provide power to the second electronic device. Charging puck enclosure 3811 can be attached to bottom enclosure 3550 via puck hinge 3850. Connector 3350 can also be attached to bottom enclosure 3550 and electrically connected to board 3430.

Figure 36A:
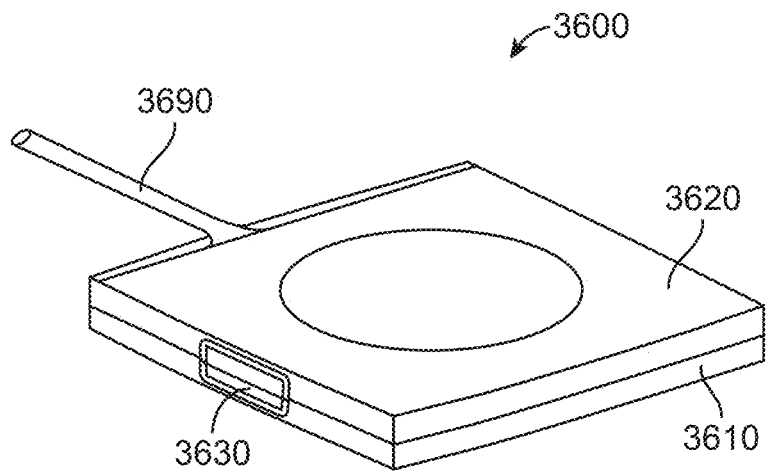
FIGS. 36A and 36B illustrate a wireless charger according to an embodiment of the present invention.
Figure 36B:
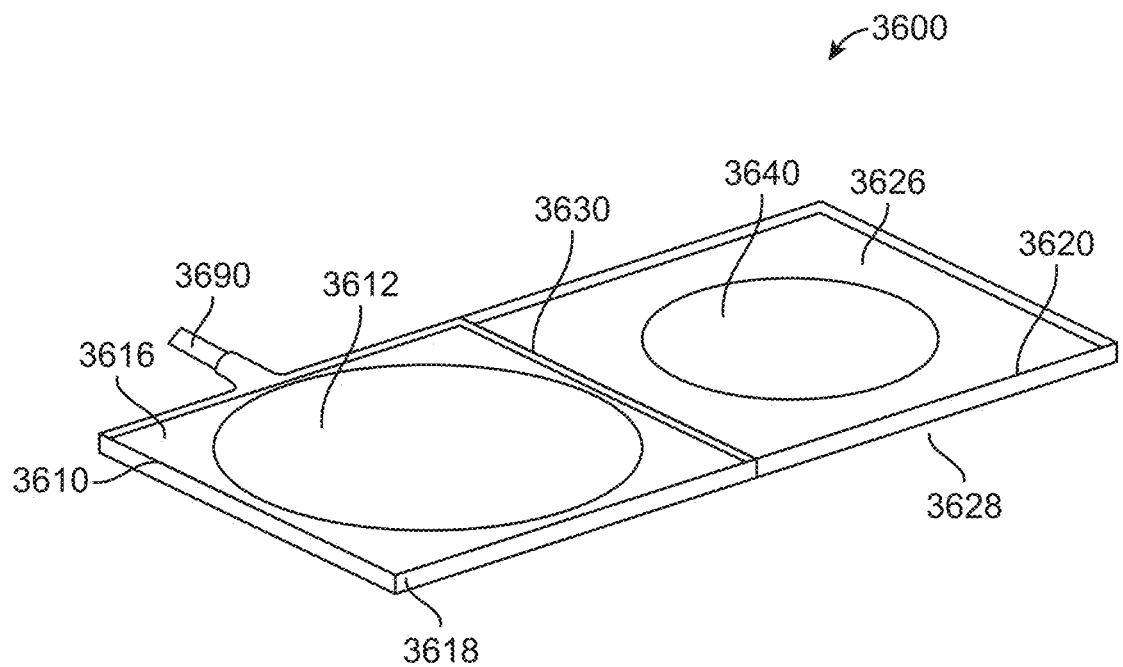

FIGS. 36A and 36B illustrate a wireless charger according to an embodiment of the present invention. Wireless charger 3600 can be similar to wireless charger 100 and the other wireless chargers shown herein. Wireless charger 3600 can include a first leaf 3610 and a second leaf 3620. First leaf 3610 and second leaf 3620 can be joined by main hinge 3630. First leaf 3610 can include a top surface 3616 and a bottom surface 3618. First leaf 3610 can further include a contacting surface 3612. Second leaf 3620 can include charging puck 3640, shown here in a down position.

Embodiments of the present invention can provide wireless chargers that can properly align to and securely hold one or more electronic devices. Accordingly, first leaf 3610 can include one or more alignment features to align charging circuitry in a first electronic device (not shown) to charging circuitry in first leaf 3610. First leaf 3610 can further include one or more attachment features to attach the first electronic device to the first leaf 3610. Further, second leaf 3620 can include one or more alignment features to align charging circuitry in a second electronic device (not shown) to charging circuitry in charging puck 3640 of second leaf 3620. Second leaf 3620 can further include one or more attachment features to attach the second electronic device to the second leaf 3620. Examples of these various alignment features and attachment features are shown herein and can be the same or similar as those shown for wireless charger 100 and the other wireless chargers shown here.

Embodiments of the present invention can further charge more than one electronic device at a time. Accordingly, wireless charger 3600 can include first leaf 3610 for charging a first electronic device and second leaf 3620 having charging puck 3640 for charging a second electronic device. In this example, first leaf 3610 can be configured to charge a phone, while second leaf 3620 and charging puck 3640 can be configured to charge a watch or other wearable computing device. In these and other embodiments of the present invention, first leaf 3610 and second leaf 3620 can be configured to charge a same type of device. For example, both first leaf 3610 and second leaf 3620 can be configured to charge a phone. Alternatively, both first leaf 3610 and second leaf 3620 can be configured to charge a watch or other wearable computing device. In these and other embodiments of the present invention, a wireless charger can include three or more leaves, where each leaf is configured to charge a same or different type of electronic device.

Embodiments of the present invention can further provide wireless chargers that can fold into a compact shape. In this example, main hinge 3630 can allow wireless charger 3600 to close such that top surface 3616 of first leaf 3610 is adjacent to top surface 3626 of second leaf 3620. Main hinge 3630 can further allow wireless charger 3600 to close such that bottom surface 3618 of first leaf 3610 is adjacent to bottom surface 3628 of second leaf 3620.

Figure 37A:
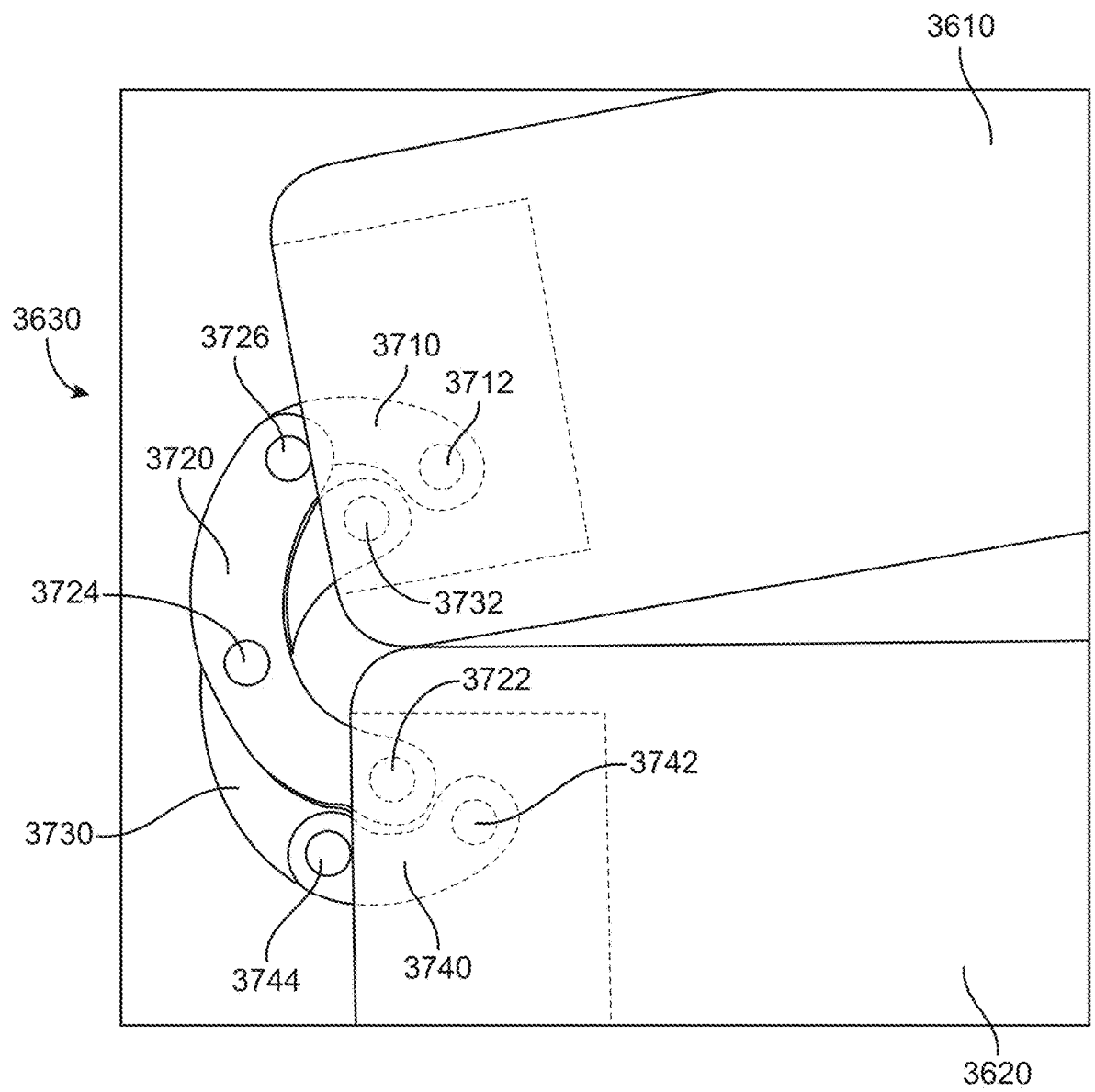
FIGS. 37A and 37B illustrate a hinge for the wireless charger of FIG. 36A and FIG. 36B.
Figure 37B:
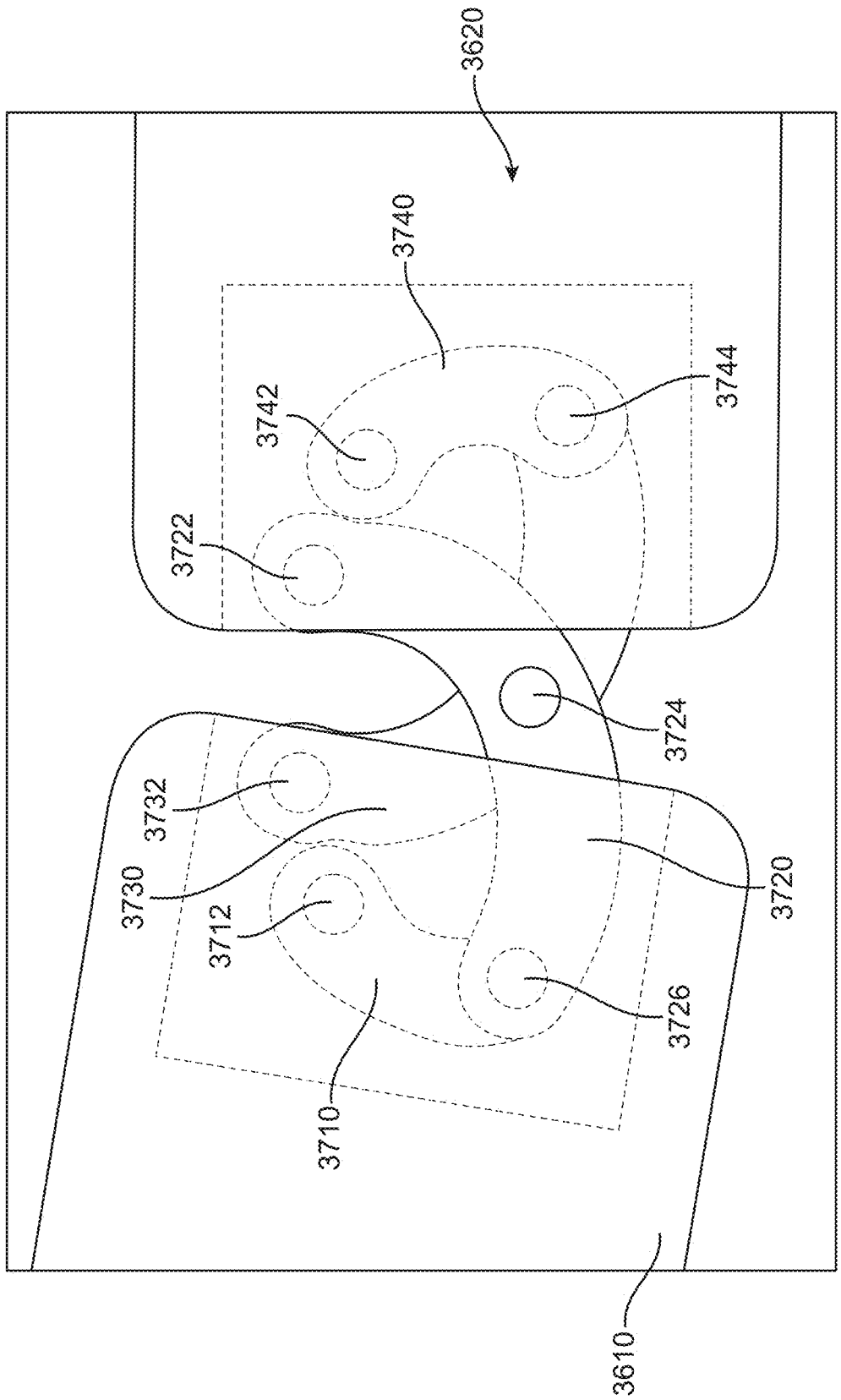

FIGS. 37A and 37B illustrate a main hinge for the wireless charger of FIG. 36A and FIG. 36B. Main hinge 3630 can include two linked sections connected at hinge pins to each of first leaf 3610 and second leaf 3620, and connected to each other at a central hinge pin. Specifically, main hinge 3630 can include a first linked section including links 3710 and 3720. Link 3710 can be attached to first leaf 3610 at pin 3712 and to second link 3720 at pin 3726. Link 3720 can attach to second leaf 3620 at pin 3722. Main hinge 3630 can include a second linked section including links 3730 and 3740. Link 3730 can be attached to first leaf 3610 at pin 3732 and to second link 3740 at pin 3744. Link 3740 can attach to second leaf 3620 at pin 3742. Link 3720 and link 3730 can attach at pin 3724. Each pin can allow the rotation of the links and leafs in a direction normal or orthogonal to the plane of the drawings.

Again, magnet array 320, and the other magnets shown here, can be fixed in place, or they can be movable between a first position and a second position. Examples of fixed magnets that can be used for magnet array 320 are shown in the following figures. For example, magnet array 320, 1320, 3520, or other magnets or magnet arrays shown herein or provided by embodiments of the present invention can be any of the primary magnetic alignment components such as primary magnetic alignment component 3816. As another example, coil 330, 1330, 3530, or other magnets or magnet arrays shown herein or provided by embodiments of the present invention can be inductive coil 3812 or any of the other coils shown herein.

Again, the various magnet arrays shown herein can be fixed in place, or they can be movable between a first position and a second position. Examples of fixed magnet arrays that can be used for these magnet arrays are shown in the following figures.

Described herein are various embodiments of magnetic alignment systems and components thereof. A magnetic alignment system can include annular alignment components comprising a ring of magnets having a particular magnetic orientation or pattern of magnetic orientations such that a "primary" annular alignment component can attract and hold a complementary "secondary" annular alignment component. In some embodiments described below, the primary annular alignment component is assumed to be in a wireless charging device, surrounding an inductive charging coil, while the secondary annular alignment component is assumed to be in a portable electronic device, surrounding a receiver coil that can receive power from the inductive charging coil of the wireless charging device. Many variations are possible; for instance, a "primary" annular alignment component can be in a portable electronic device while a "secondary" annular alignment component can be in a wireless charging device. Also described herein is an "auxiliary" annular alignment component that is complementary to the primary and secondary annular alignment components such that one surface of the auxiliary annular alignment component is attracted to the primary alignment component while the opposite surface is attracted to the secondary alignment component. An auxiliary annular alignment component can be disposed, e.g., in a case for a portable electronic device.

In some embodiments, a magnetic alignment system can also include a rotational alignment component that facilitates aligning two devices in a preferred rotational orientation. It should be understood that any device that has an annular alignment component might or might not also have a rotational alignment component.

In some embodiments, a magnetic alignment system can also include an near-field communication (NFC) coil and supporting circuitry to allow devices to identify themselves to each other using an NFC protocol. NFC coils can be disposed inboard of the annular alignment component or outboard of the annular alignment component. It should be understood that an NFC component is optional in the context of providing magnetic alignment.

Figure 38:
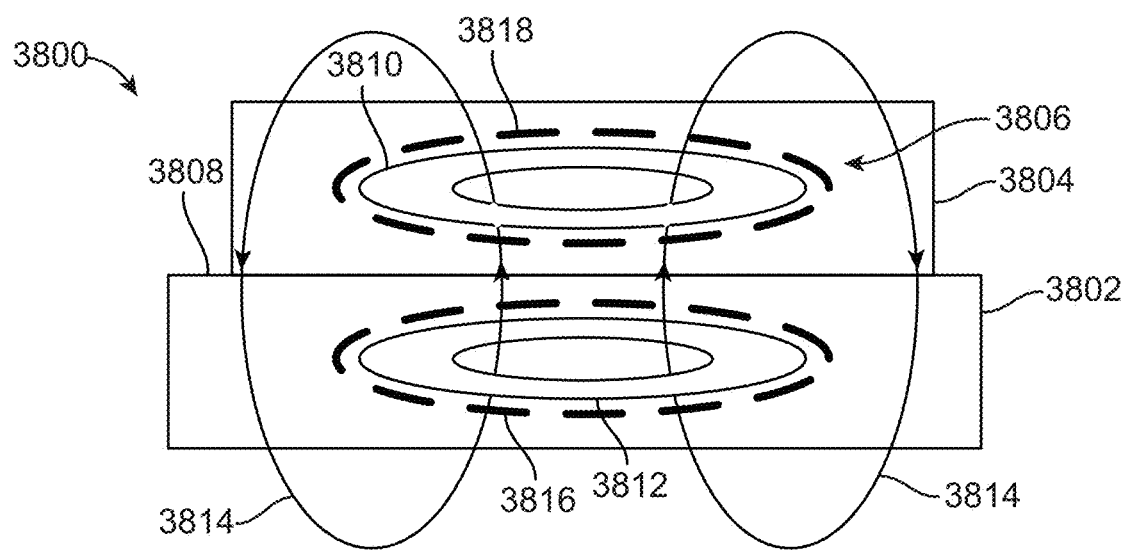
FIG. 38 shows a simplified representation of a wireless charging system incorporating a magnetic alignment system according to some embodiments.

FIG. 38 shows a simplified representation of a wireless charging system 3800 incorporating a magnetic alignment system 3806 according to some embodiments. A portable electronic device 3804 is positioned on a charging surface 3808 of a wireless charging device 3802. Portable electronic device 3804 can be a consumer electronic device, such as a smart phone, tablet, wearable device, or the like, or any other electronic device for which wireless charging is desired. Wireless charging device 3802 can be any device that is configured to generate time-varying magnetic flux to induce a current in a suitably configured receiving device. For instance, wireless charging device 3802 can be any of the wireless chargers herein, a wireless charging mat, puck, docking station, or the like. Wireless charging device 3802 can include or have access to a power source such as battery power or standard AC power.

To enable wireless power transfer, portable electronic device 3804 and wireless charging device 3802 can include inductive coils 3810 and 3812, respectively, which can operate to transfer power between them. For example, inductive coil 3812 can be a transmitter coil that generates a time-varying magnetic flux 3814, and inductive coil 3810 can be a receiver coil in which an electric current is induced in response to time-varying magnetic flux 3814. The received electric current can be used to charge a battery of portable electronic device 3804, to provide operating power to a component of portable electronic device 3804, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 3812 and 3810. According to some embodiments, magnetic alignment system 3806 can provide such alignment. In the example shown in FIG. 38, magnetic alignment system 3806 includes a primary magnetic alignment component 3816 disposed within or on a surface of wireless charging device 3802 and a secondary magnetic alignment component 3818 disposed within or on a surface of portable electronic device 3804. Primary alignment components 3816 and secondary alignment components 3818 are configured to magnetically attract one another into an aligned position in which inductive coils 3810 and 3812 are aligned with one another to effectuate wireless power transfer.

Primary alignment components 3816 can be used as magnet array 320 (shown in FIG. 3) or as any of the other magnet arrays shown herein or otherwise provided by embodiments of the present invention.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

Figure 39A:
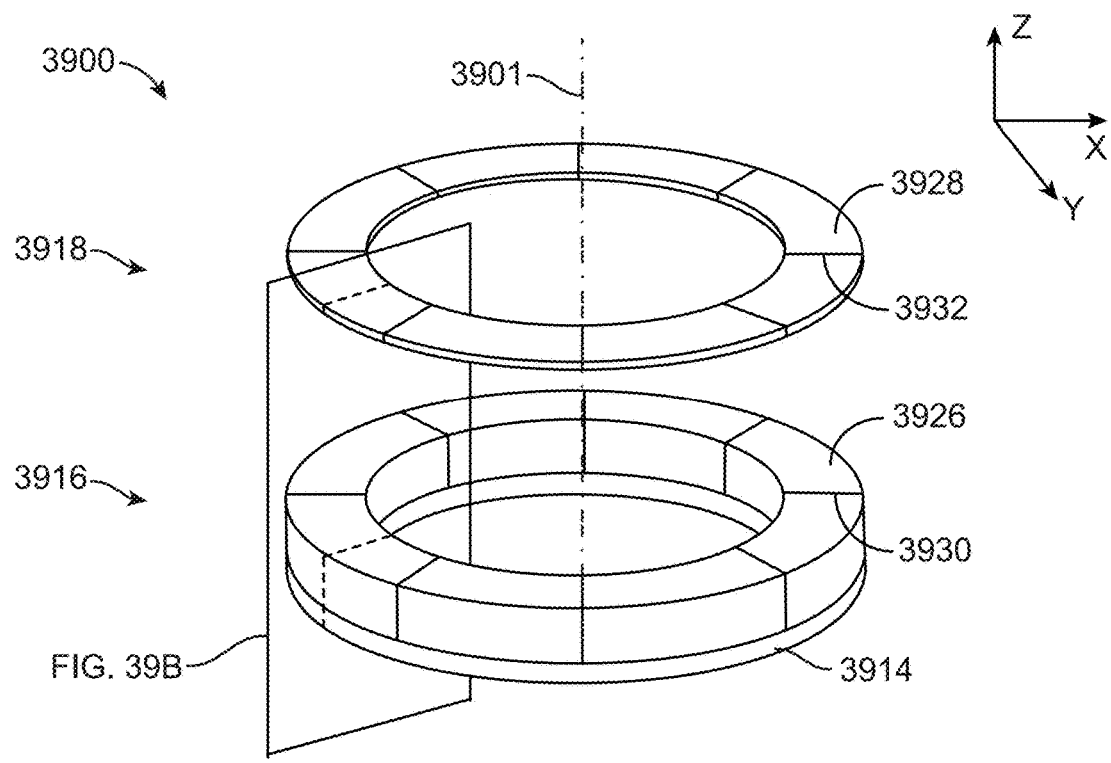
FIG. 39A shows a perspective view of a magnetic alignment system according to some embodiments.
Figure 39B:
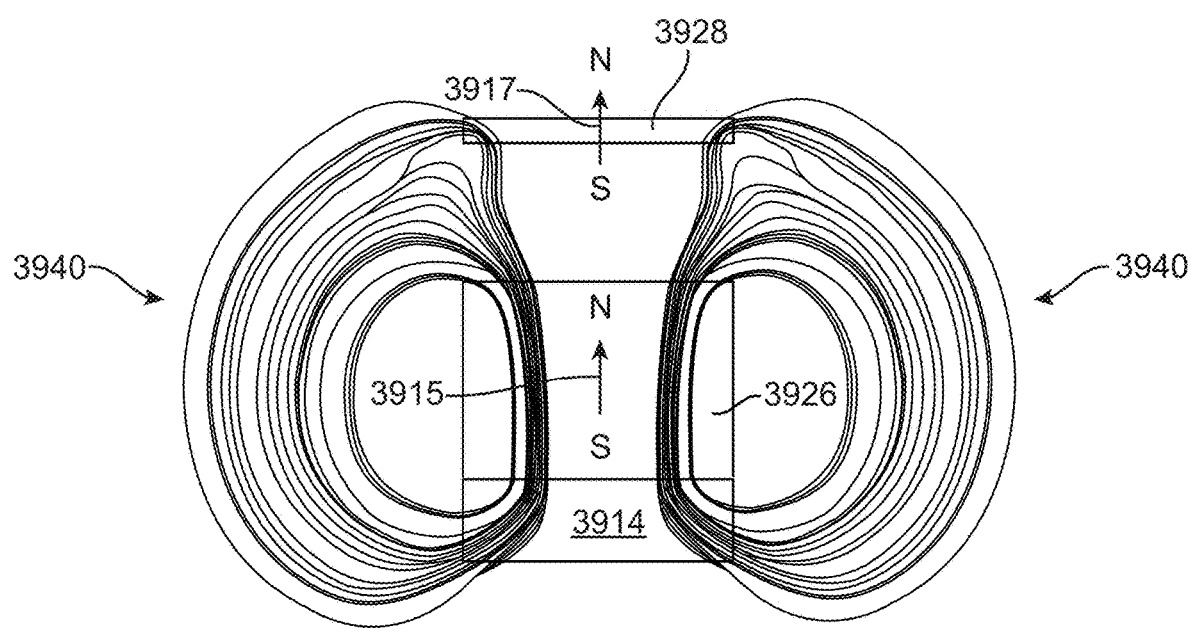
FIG. 39B shows a cross-section through the magnetic alignment system of FIG. 39A.

FIG. 39A shows a perspective view of a magnetic alignment system 3900 according to some embodiments, and FIG. 39B shows a cross-section through magnetic alignment system 3900 across the cut plane indicated in FIG. 39A. Magnetic alignment system 3900 can be an implementation of magnetic alignment system 3806 of FIG. 38. In magnetic alignment system 3900, the alignment components all have magnetic polarity oriented in the same direction (along the axis of the annular configuration). For convenience of description, an "axial" direction (also referred to as a "longitudinal" or "z" direction) is defined to be parallel to an axis of rotational symmetry 3901 of magnetic alignment system 3900, and a transverse plane (also referred to as a "lateral" or "x" or "y" direction) is defined to be normal to axis 3901.

The term "proximal side" is used herein to refer to a side of one alignment component that is oriented toward the other alignment component when the magnetic alignment system is aligned, and the term "distal side" is used to refer to a side opposite the proximal side.

As shown in FIG. 39A, magnetic alignment system 3900 can include a primary alignment component 3916 (which can be an implementation of primary alignment component 3816 of FIG. 38) and a secondary alignment component 3918 (which can be an implementation of secondary alignment component 3818 of FIG. 38). Primary alignment component 3916 and secondary alignment component 3918 have annular shapes and can also be referred to as "annular" alignment components. The particular dimensions can be chosen as desired. In some embodiments, primary alignment component 3916 and secondary alignment component 3918 can each have an outer diameter of about 424 mm and a radial width of about 6 mm. The outer diameters and radial widths of primary alignment component 3916 and secondary alignment component 3918 need not be exactly equal. For instance, the radial width of secondary alignment component 3918 can be slightly less than the radial width of primary alignment component 3916 and/or the outer diameter of secondary alignment component 3918 can also be slightly less than the radial width of primary alignment component 3916 so that, when in alignment, the inner and outer sides of primary alignment component 3916 extend beyond the corresponding inner and outer sides of secondary alignment component 3918. Thicknesses (or axial dimensions) of primary alignment component 3916 and secondary alignment component 3918 can also be chosen as desired. In some embodiments, primary alignment component 3916 has a thickness of about 1.5 mm while secondary alignment component 3918 has a thickness of about 0.37 mm.

Primary alignment component 3916 can include a number of sectors, each of which can be formed of one or more primary arcuate magnets 3926, and secondary alignment component 3918 can include a number of sectors, each of which can be formed of one or more secondary arcuate magnets 3928. In the example shown, the number of primary magnets 3926 is equal to the number of secondary magnets 3928, and each sector includes exactly one magnet, but this is not required. Primary magnets 3926 and secondary magnets 3928 can have arcuate (or curved) shapes in the transverse plane such that when primary magnets 3926 (or secondary magnets 3928) are positioned adjacent to one another end-to-end, primary magnets 3926 (or secondary magnets 3928) form an annular structure as shown. In some embodiments, primary magnets 3926 can be in contact with each other at interfaces 3930, and secondary magnets 3928 can be in contact with each other at interfaces 3932. Alternatively, small gaps or spaces can separate adjacent primary magnets 3926 or secondary magnets 3928, providing a greater degree of tolerance during manufacturing.

In some embodiments, primary alignment component 3916 can also include an annular shield 3914 disposed on a distal surface of primary magnets 3926. In some embodiments, shield 3914 can be formed as a single annular piece of material and adhered to primary magnets 3926 to secure primary magnets 3926 into position. Shield 3914 can be formed of a material that has high magnetic permeability, such as stainless steel, and can redirect magnetic fields to prevent them from propagating beyond the distal side of primary alignment component 3916, thereby protecting sensitive electronic components located beyond the distal side of primary alignment component 3916 from magnetic interference.

Primary magnets 3926 and secondary magnets 3928 can be made of a magnetic material such as an NdFeB material, other rare earth magnetic materials, or other materials that can be magnetized to create a persistent magnetic field. Each primary magnet 3926 and each secondary magnet 3928 can have a monolithic structure having a single magnetic region with a magnetic polarity aligned in the axial direction as shown by magnetic polarity indicators 3915, 3917 in FIG. 39B. For example, each primary magnet 3926 and each secondary magnet 3928 can be a bar magnet that has been ground and shaped into an arcuate structure having an axial magnetic orientation. (As will be apparent, the term "magnetic orientation" refers to the direction of orientation of the magnetic polarity of a magnet.) In the example shown, primary magnet 3926 has its north pole oriented toward the proximal surface and south pole oriented toward the distal surface while secondary magnet 3928 has its south pole oriented toward the proximal surface and north pole oriented toward the distal surface. In other embodiments, the magnetic orientations can be reversed such that primary magnet 3926 has its south pole oriented toward the proximal surface and north pole oriented toward the distal surface while secondary magnet 3928 has its north pole oriented toward the proximal surface and south pole oriented toward the distal surface.

As shown in FIG. 39B, the axial magnetic orientation of primary magnet 3926 and secondary magnet 3928 can generate magnetic fields 3940 that generate an attractive force between primary magnet 3926 and secondary magnet 3928, thereby facilitating alignment between respective electronic devices in which primary alignment component 3916 and secondary alignment component 3918 are disposed (e.g., as shown in FIG. 38). While shield 3914 can redirect some of magnetic fields 3940 away from regions below primary magnet 3926, magnetic fields 3940 can still propagate to regions laterally adjacent to primary magnet 3926 and secondary magnet 3928. In some embodiments, the lateral propagation of magnetic fields 3940 can result in magnetic field leakage to other magnetically sensitive components. For instance, if an inductive coil having a ferromagnetic shield is placed in the interior region of annular primary alignment component 3916 (or secondary alignment component 3918), leakage of magnetic fields 3940 can saturate the ferrimagnetic shield, which can degrade wireless charging performance.

It will be appreciated that magnetic alignment system 3900 is illustrative and that variations and modifications are possible. For instance, while primary alignment component 3916 and secondary alignment component 3918 are each shown as being constructed of eight arcuate magnets, other embodiments can use a different number of magnets, such as sixteen magnets, thirty-six magnets, or any other number of magnets, and the number of primary magnets need not be equal to the number of secondary magnets. In other embodiments, primary alignment component 3916 and/or secondary alignment component 3918 can each be formed of a single, monolithic annular magnet; however, segmenting magnetic alignment components 3916 and 3918 into arcuate magnets can improve manufacturing because smaller arcuate segments are less brittle than a single, monolithic annular magnet and are less prone to yield loss due to physical stresses imposed on the magnetic material during manufacturing.

As noted above with reference to FIG. 39B, a magnetic alignment system with a single axial magnetic orientation can allow lateral leakage of magnetic fields, which can adversely affect performance of other components of an electronic device. Accordingly, some embodiments provide magnetic alignment systems with reduced magnetic field leakage. Examples will now be described.

Figure 40A:
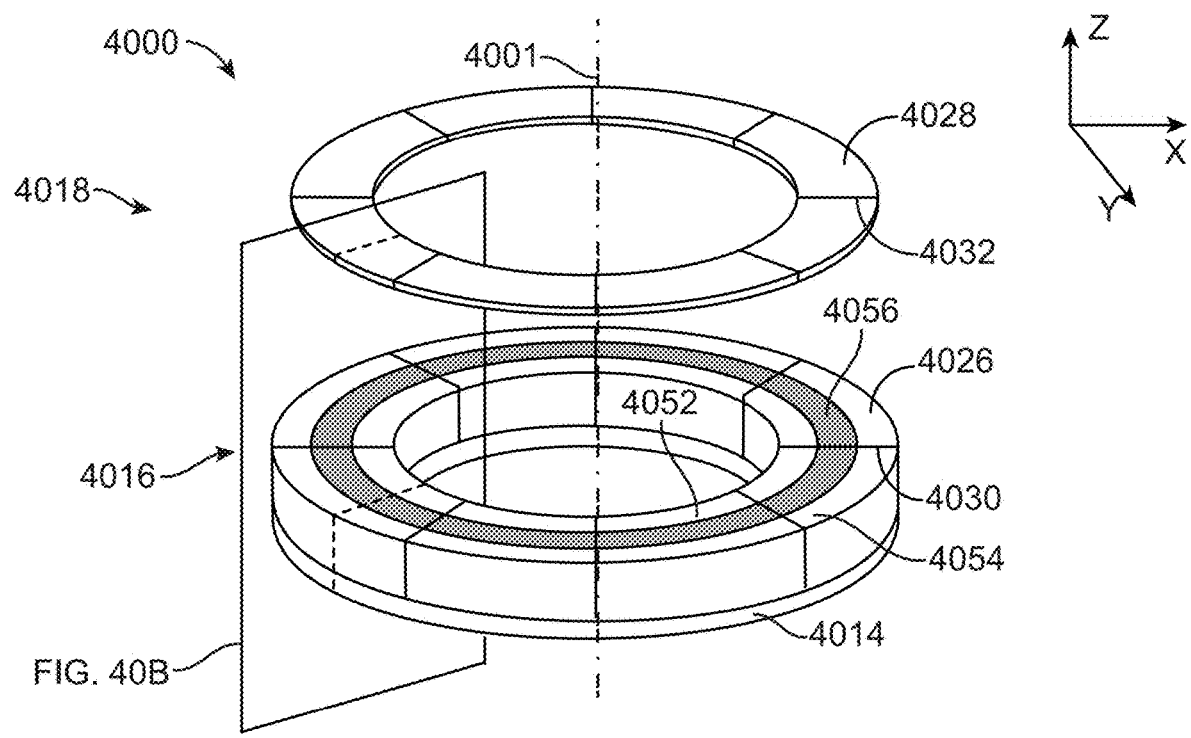
FIG. 40A shows a perspective view of a magnetic alignment system according to some embodiments.
Figure 40B:
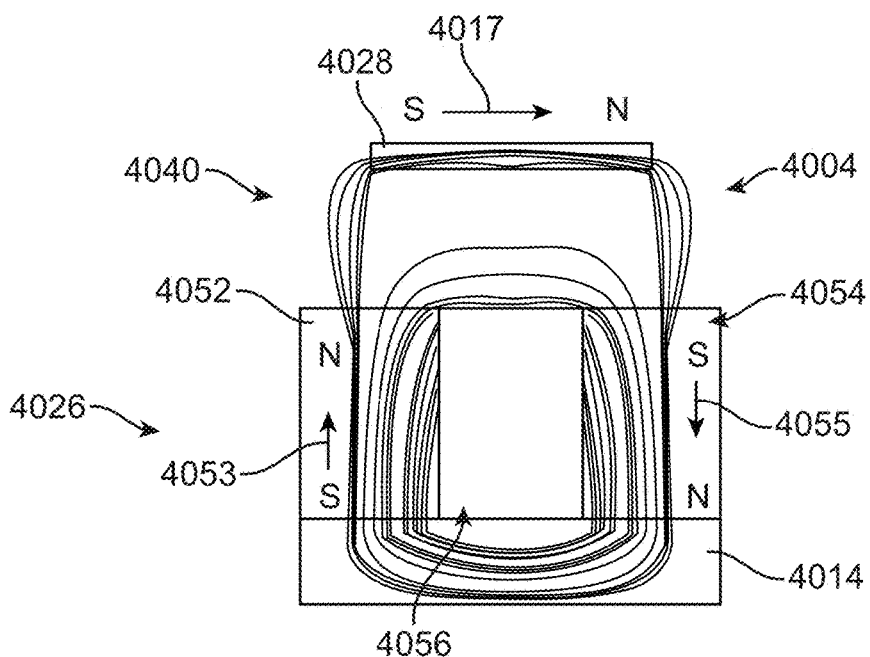
FIG. 40B shows a cross-section through the magnetic alignment system of FIG. 40A.

FIG. 40A shows a perspective view of a magnetic alignment system 4000 according to some embodiments, and FIG. 40B shows a cross-section through magnetic alignment system 4000 across the cut plane indicated in FIG. 40A. Magnetic alignment system 4000 can be an implementation of magnetic alignment system 3806 of FIG. 38. In magnetic alignment system 4000, the alignment components have magnetic components configured in a "closed loop" configuration as described below.

As shown in FIG. 40A, magnetic alignment system 4000 can include a primary alignment component 4016 (which can be an implementation of primary alignment component 3816 of FIG. 38) and a secondary alignment component 4018 (which can be an implementation of secondary alignment component 3818 of FIG. 38). Primary alignment component 4016 and secondary alignment component 4018 have annular shapes and can also be referred to as "annular" alignment components. The particular dimensions can be chosen as desired. In some embodiments, primary alignment component 4016 and secondary alignment component 4018 can each have an outer diameter of about 424 mm and a radial width of about 6 mm. The outer diameters and radial widths of primary alignment component 4016 and secondary alignment component 4018 need not be exactly equal. For instance, the radial width of secondary alignment component 4018 can be slightly less than the radial width of primary alignment component 4016 and/or the outer diameter of secondary alignment component 4018 can also be slightly less than the radial width of primary alignment component 4016 so that, when in alignment, the inner and outer sides of primary alignment component 4016 extend beyond the corresponding inner and outer sides of secondary alignment component 4018. Thicknesses (or axial dimensions) of primary alignment component 4016 and secondary alignment component 4018 can also be chosen as desired. In some embodiments, primary alignment component 4016 has a thickness of about 1.5 mm while secondary alignment component 4018 has a thickness of about 0.37 mm.

Primary alignment component 4016 can include a number of sectors, each of which can be formed of a number of primary magnets 4026, and secondary alignment component 4018 can include a number of sectors, each of which can be formed of a number of secondary magnets 4028. In the example shown, the number of primary magnets 4026 is equal to the number of secondary magnets 4028, and each sector includes exactly one magnet, but this is not required; for example, as described below a sector can include multiple magnets. Primary magnets 4026 and secondary magnets 4028 can have arcuate (or curved) shapes in the transverse plane such that when primary magnets 4026 (or secondary magnets 4028) are positioned adjacent to one another end-to-end, primary magnets 4026 (or secondary magnets 4028) form an annular structure as shown. In some embodiments, primary magnets 4026 can be in contact with each other at interfaces 4030, and secondary magnets 4028 can be in contact with each other at interfaces 4032. Alternatively, small gaps or spaces can separate adjacent primary magnets 4026 or secondary magnets 4028, providing a greater degree of tolerance during manufacturing.

In some embodiments, primary alignment component 4016 can also include an annular shield 4014 disposed on a distal surface of primary magnets 4026. In some embodiments, shield 4014 can be formed as a single annular piece of material and adhered to primary magnets 4026 to secure primary magnets 4026 into position. Shield 4014 can be formed of a material that has high magnetic permeability, such as stainless steel, and can redirect magnetic fields to prevent them from propagating beyond the distal side of primary alignment component 4016, thereby protecting sensitive electronic components located beyond the distal side of primary alignment component 4016 from magnetic interference.

Primary magnets 4026 and secondary magnets 4028 can be made of a magnetic material such as an NdFeB material, other rare earth magnetic materials, or other materials that can be magnetized to create a persistent magnetic field. Each secondary magnet 4028 can have a single magnetic region with a magnetic polarity having a component in the radial direction in the transverse plane (as shown by magnetic polarity indicator 4017 in FIG. 40B). As described below, the magnetic orientation can be in a radial direction with respect to axis 4001 or another direction having a radial component in the transverse plane. Each primary magnet 4026 can include two magnetic regions having opposite magnetic orientations. For example, each primary magnet 4026 can include an inner arcuate magnetic region 4052 having a magnetic orientation in a first axial direction (as shown by polarity indicator 4053 in FIG. 40B), an outer arcuate magnetic region 4054 having a magnetic orientation in a second axial direction opposite the first direction (as shown by polarity indicator 4055 in FIG. 40B), and a central non-magnetized region 4056 that does not have a magnetic orientation. Central non-magnetized region 4056 can magnetically separate inner arcuate region 4052 from outer arcuate region 4054 by inhibiting magnetic fields from directly crossing through central region 4056. Magnets having regions of opposite magnetic orientation separated by a non-magnetized region are sometimes referred to herein as having a "quad-pole" configuration.

In some embodiments, each secondary magnet 4028 can be made of a magnetic material that has been ground and shaped into an arcuate structure, and a magnetic orientation having a radial component in the transverse plane can be created, e.g., using a magnetizer. Similarly, each primary magnet 4026 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 4026 can be a compound structure with two arcuate pieces of magnetic material providing inner arcuate magnetic region 4052 and outer arcuate magnetic region 4054; in such embodiments, central non-magnetized region 4056 can be formed of an arcuate piece of nonmagnetic material or formed as an air gap defined by sidewalls of inner arcuate magnetic region 4052 and outer arcuate magnetic region 4054.

As shown in FIG. 40B, the magnetic polarity of secondary magnet 4028 (shown by indicator 4017) can be oriented such that when primary alignment component 4016 and secondary alignment component 4018 are aligned, the south pole of secondary magnet 4028 is oriented toward the north pole of inner arcuate magnetic region 4052 (shown by indicator 4053) while the north pole of secondary magnet 4028 is oriented toward the south pole of outer arcuate magnetic region 4054 (shown by indicator 4055). Accordingly, the respective magnetic orientations of inner arcuate magnetic region 4052, secondary magnet 4028 and outer arcuate magnetic region 4056 can generate magnetic fields 4040 that produce an attractive force between primary magnet 4026 and secondary magnet 4028, thereby facilitating alignment between respective electronic devices in which primary alignment component 4016 and secondary alignment component 4018 are disposed (e.g., as shown in FIG. 38). Shield 4014 can redirect some of magnetic fields 4040 away from regions below primary magnet 4026. Further, the "closed-loop" magnetic field 4040 formed around central nonmagnetic region 4056 can have tight and compact field lines that do not stray from primary magnets 4026 and secondary magnets 4028 as far as magnetic field 3940 strays from primary magnets 3926 and secondary magnets 3928 in FIG. 39B. Thus, magnetically sensitive components can be placed relatively close to primary alignment component 4016 with reduced concern for stray magnetic fields. Accordingly, as compared to magnetic alignment system 3900, magnetic alignment system 4000 can help to reduce the overall size of a device in which primary alignment component 4016 is positioned and can also help reduce noise created by magnetic field 4040 in adjacent components or devices, such as a power-receiving device in which secondary alignment component 4018 is positioned.

It will be appreciated that magnetic alignment system 4000 is illustrative and that variations and modifications are possible. For instance, while primary alignment component 4016 and secondary alignment component 4018 are each shown as being constructed of eight arcuate magnets, other embodiments can use a different number of magnets, such as sixteen magnets, thirty-six magnets, or any other number of magnets, and the number of primary magnets need not be equal to the number of secondary magnets. In other embodiments, secondary alignment component 4018 can be formed of a single, monolithic annular magnet. Similarly, primary alignment component 4016 can be formed of a single, monolithic annular piece of magnetic material with an appropriate magnetization pattern as described above, or primary alignment component 4016 can be formed of a monolithic inner annular magnet and a monolithic outer annular magnet, with an annular air gap or region of non-magnetic material disposed between the inner annular magnet and outer annular magnet. In some embodiments, a construction using multiple arcuate magnets can improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 41:
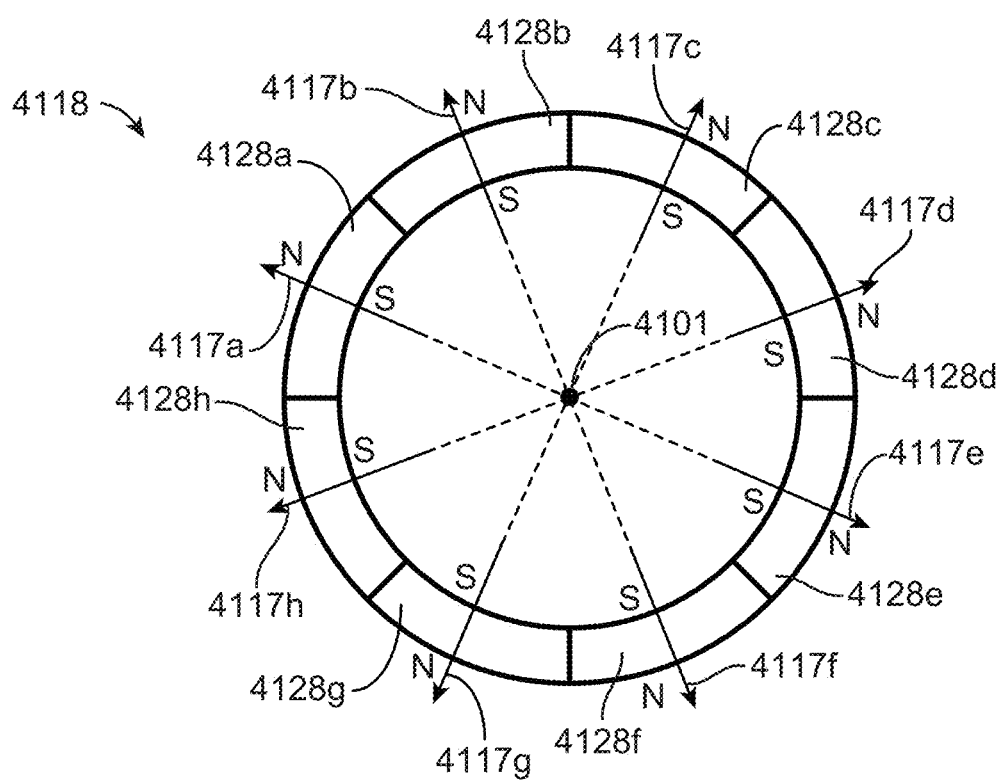
FIG. 41 shows a simplified top-down view of a secondary alignment component according to some embodiments.

As noted above, in embodiments of magnetic alignment systems having closed-loop magnetic orientations, such as magnetic alignment system 4000, secondary alignment component 4018 can have a magnetic orientation in the transverse plane. For example, in some embodiments, secondary alignment component 4018 can have a magnetic polarity in a radial orientation. FIG. 41 shows a simplified top-down view of a secondary alignment component 4118 according to some embodiments having secondary magnets 4128*a-h* with radial magnetic orientations as shown by magnetic polarity indicators 4117*a-h*. In this example, each secondary magnet 4128*a-h* has a north magnetic pole oriented toward the radially outward side and a south magnetic pole toward the radially inward side; however, this orientation can be reversed, and the north magnetic pole of each secondary magnet 4128a-h can be oriented toward the radially inward side while the south magnetic pole is oriented toward the radially outward side.

Figure 42A:
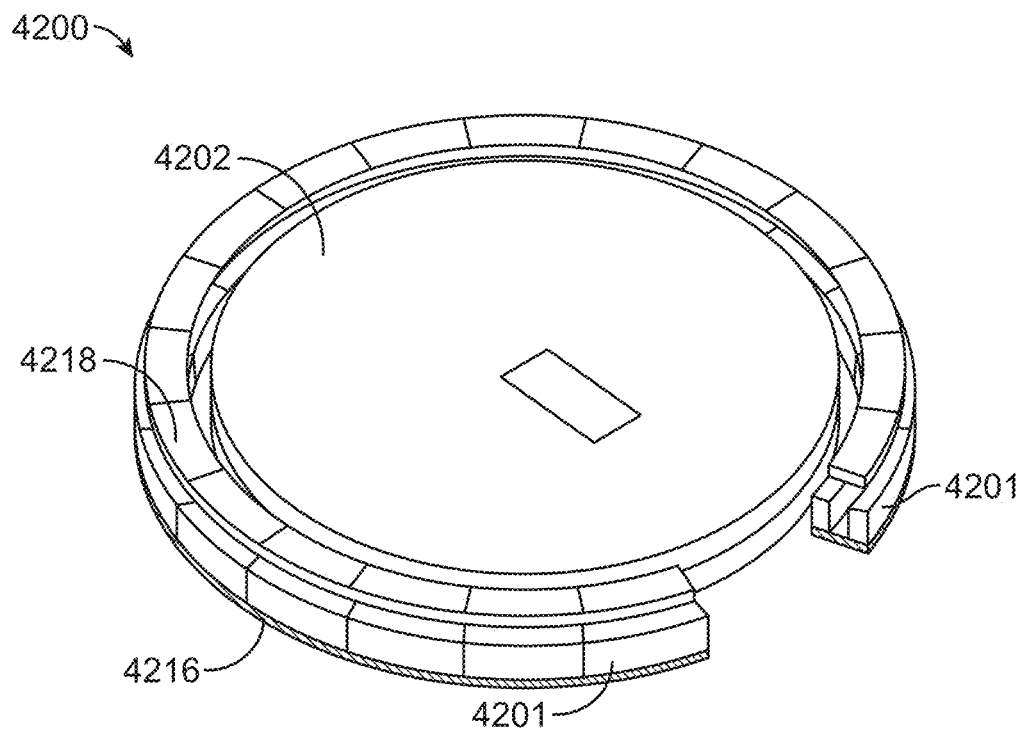
FIG. 42A shows a perspective view of a magnetic alignment system according to some embodiments.

FIG. 42A shows a perspective view of a magnetic alignment system 4200 according to some embodiments. Magnetic alignment system 4200 includes a secondary alignment component 4218 having a radially outward magnetic orientation (e.g., as shown in FIG. 41) and a complementary primary alignment component 4216. Some of the arcuate sections of magnetic alignment system 4200 are not shown in order to reveal internal structure; however, it should be understood that magnetic alignment system 4200 can be a complete annular structure. Also shown are components 4202, which can include, for example an inductive coil assembly or other components located within the central region of primary magnetic alignment component 4216 or secondary magnetic alignment component 4218. Magnetic alignment system 4200 can be a closed-loop magnetic alignment system similar to magnetic alignment system 4000 described above and can include arcuate sectors 4201, each of which can be made of one or more arcuate magnets. In some embodiments, the closed-loop configuration of magnetic alignment system 4200 can reduce or prevent magnetic field leakage that can affect components 4202.

Figure 42B:
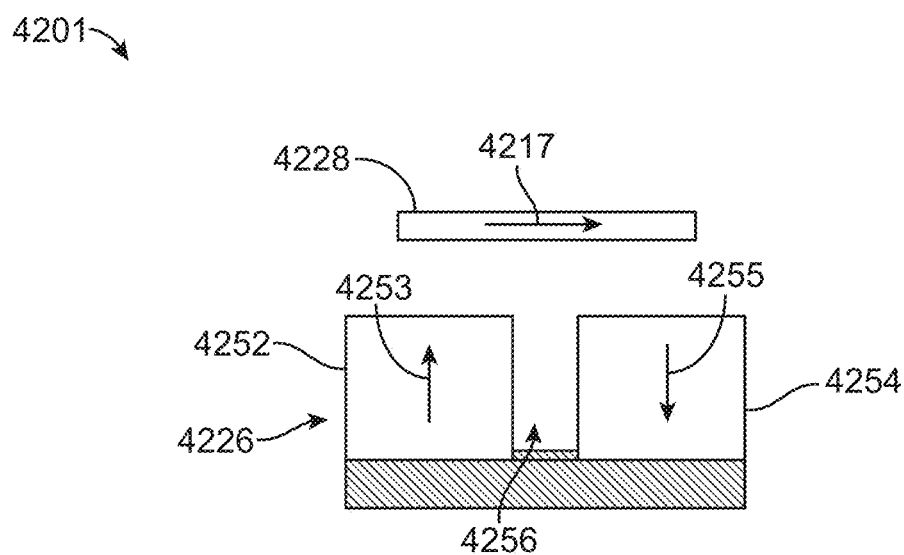

FIG. 42B shows an axial cross-section view through one of arcuate sector 4201. Arcuate sector 4201 includes a primary magnet 4226 and a secondary magnet 4228. As shown by orientation indicator 4217, secondary magnet 4228 has a magnetic polarity oriented in a radially outward direction, i.e., the north magnetic pole is toward the radially outward side of magnetic alignment system 4200. Like primary magnets 4026 described above, primary magnet 4226 includes an inner arcuate magnetic region 4252, an outer arcuate magnetic region 4254, and a central nonmagnetic region 4256 (which can include, e.g., an air gap or a region of nonmagnetic material). Inner arcuate magnetic region 4252 has a magnetic polarity oriented axially such that the north magnetic pole is toward secondary magnet 4228, as shown by indicator 4253, while outer arcuate magnetic region 4254 has an opposite magnetic orientation, with the south magnetic pole oriented toward secondary magnet 4228, as shown by indicator 4255. As described above with reference to FIG. 40B, the arrangement of magnetic orientations shown in FIG. 42B results in magnetic attraction between primary magnet 4226 and secondary magnet 4228. In some embodiments, the magnetic polarities can be reversed such that the north magnetic pole of secondary magnet 4228 is oriented toward the radially inward side of magnetic alignment system 4200, the north magnetic pole of outer arcuate region 4254 of primary magnet 4226 is oriented toward secondary magnet 4228, and the north magnetic pole of inner arcuate region 4252 is oriented away from secondary magnet 4228.

When primary alignment component 4216 and secondary alignment component 4218 are aligned, the radially symmetrical arrangement and directional equivalence of magnetic polarities of primary alignment component 4216 and secondary alignment component 4218 allow secondary alignment component 4218 to rotate freely (relative to primary alignment component 4216) in the clockwise or counterclockwise direction in the lateral plane while maintaining alignment along the axis.

Figure 42C:
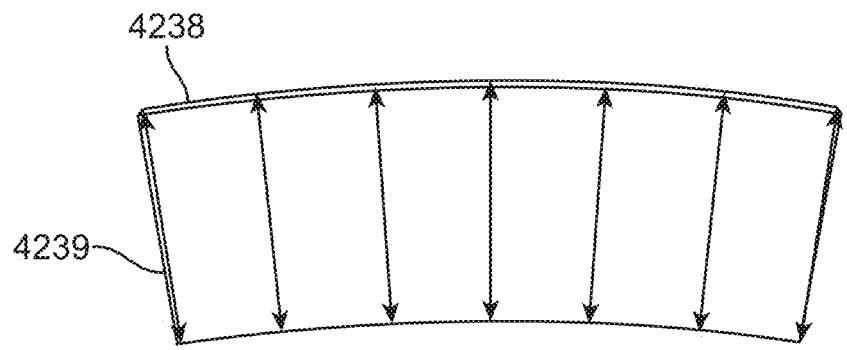
FIGS. 42C through 42E show examples of arcuate magnets with radial magnetic orientation according to some embodiments.
Figure 42D:
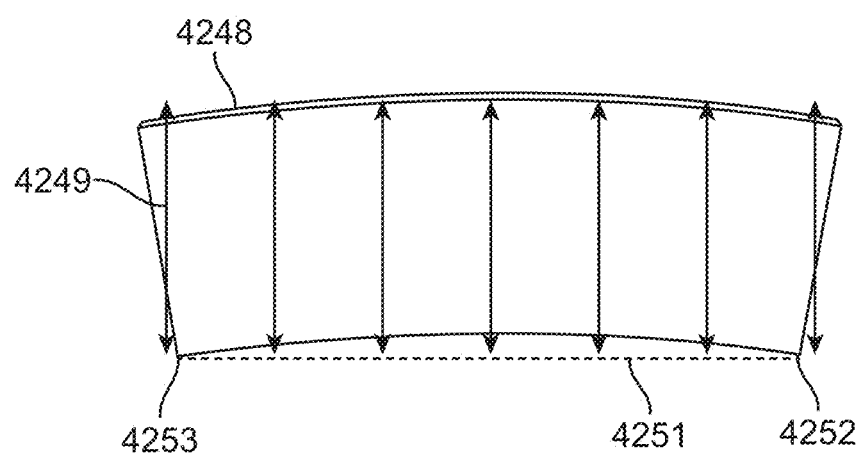
Figure 42E:
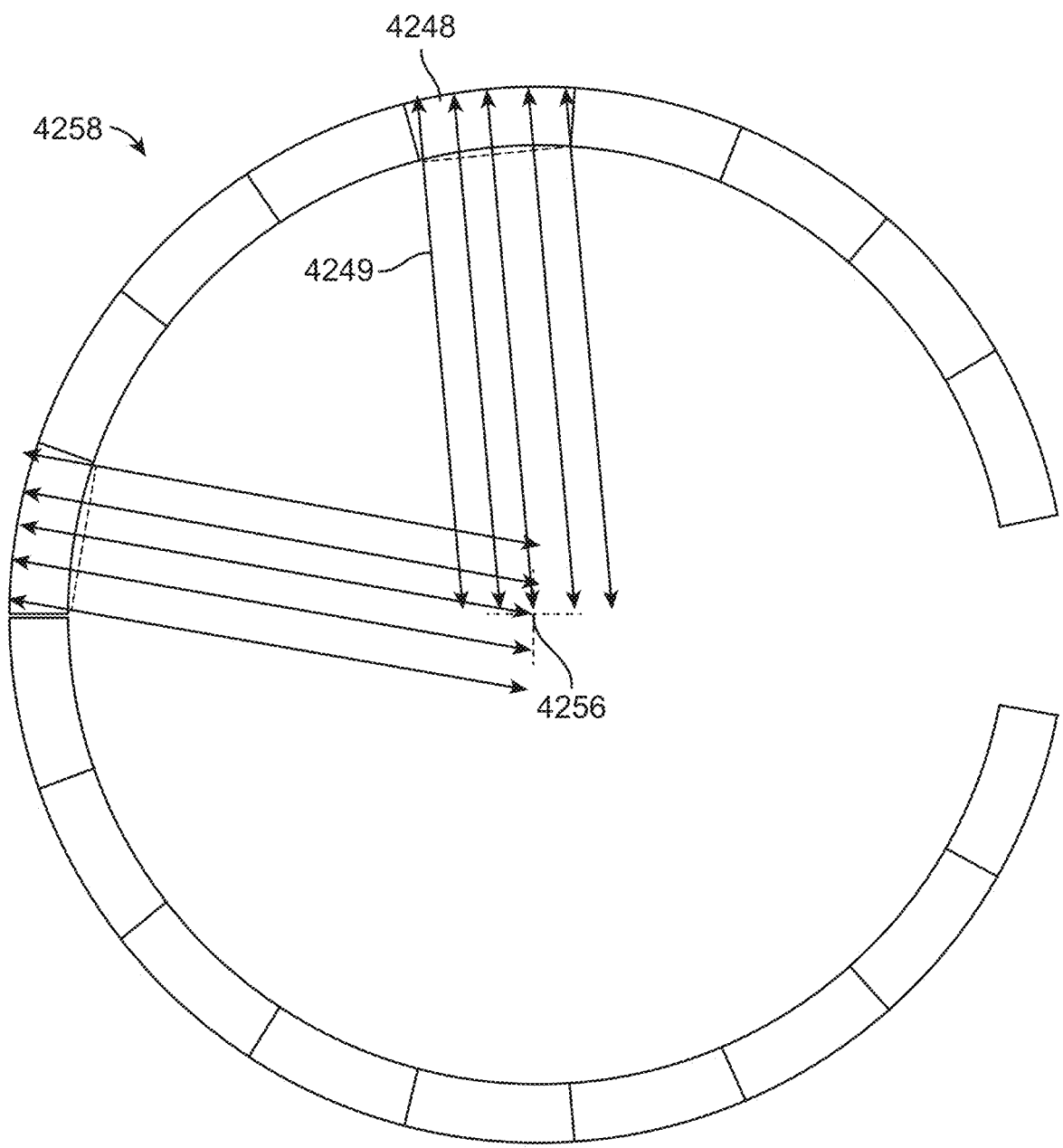

As used herein, a "radial" orientation need not be exactly or purely radial. For example, FIG. 42C shows a secondary arcuate magnet 4238 according to some embodiments. Secondary arcuate magnet 4238 has a purely radial magnetic orientation, as indicated by arrows 4239. Each arrow 4239 is directed at the center of curvature of magnet 4238; if extended inward, arrows 4239 would converge at the center of curvature. However, achieving this purely radial magnetization requires that magnetic domains within magnet 4238 be oriented obliquely to neighboring magnetic domains. For some types of magnetic materials, purely radial magnetic orientation might not be practical. Accordingly, some embodiments use a "pseudo-radial" magnetic orientation that approximates the purely radial orientation of FIG. 42C. FIG. 42D shows a secondary arcuate magnet 4248 with pseudo-radial magnetic orientation according to some embodiments. Magnet 4248 has a magnetic orientation, shown by arrows 4249, that is perpendicular to a baseline 4251 connecting the inner corners 4257, 4259 of arcuate magnet 4248. If extended inward, arrows 4249 would not converge. Thus, neighboring magnetic domains in magnet 4248 are parallel to each other, which is readily achievable in magnetic materials such as NdFeB. The overall effect in a magnetic alignment system, however, can be similar to the purely radial magnetic orientation shown FIG. 42C. FIG. 42E shows a secondary annular alignment component 4258 made up of magnets 4248 according to some embodiments. Magnetic orientation arrows 4249 have been extended to the center point 4261 of annular alignment component 4258. As shown the magnetic field direction can be approximately radial, with the closeness of the approximation depending on the number of magnets 4248 and the inner radius of annular alignment component 4258. In some embodiments, 178 magnets 4248 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 4218 (e.g., as shown in FIG. 42B) provides a magnetic force profile between secondary alignment component 4218 and primary alignment component 4216 that is the same around the entire circumference of the magnetic alignment system. The radial magnetic orientation can also result in greater magnetic permeance, which allows secondary alignment component 4218 to resist demagnetization as well as enhancing the attractive force in the axial direction and improving shear force in the lateral directions when the two components are aligned.

Figure 43A:
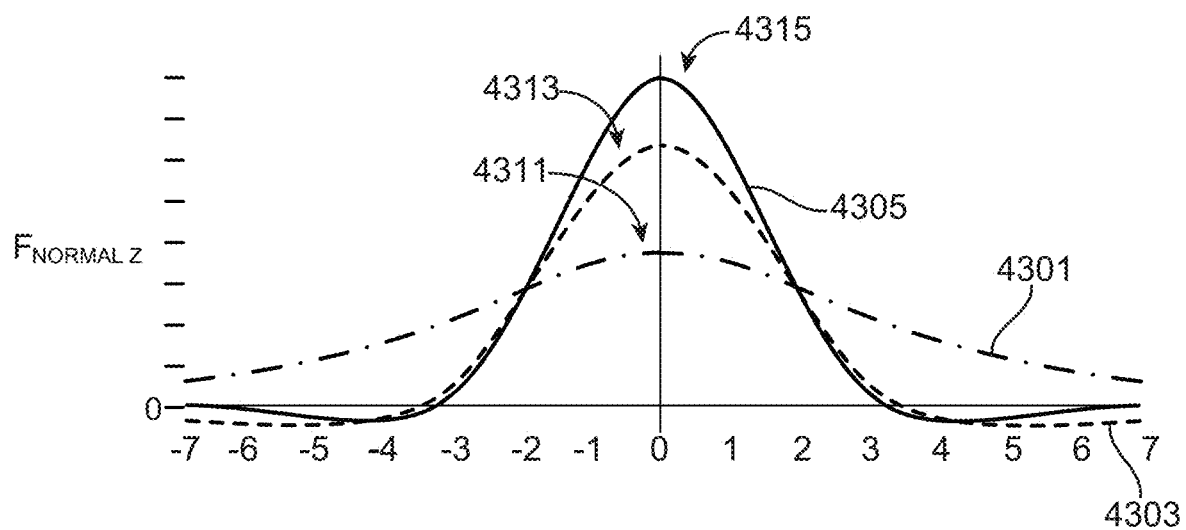
FIG. 43A and FIG. 43B show graphs of force profiles for different magnetic alignment systems, according to some embodiments.
Figure 43B:
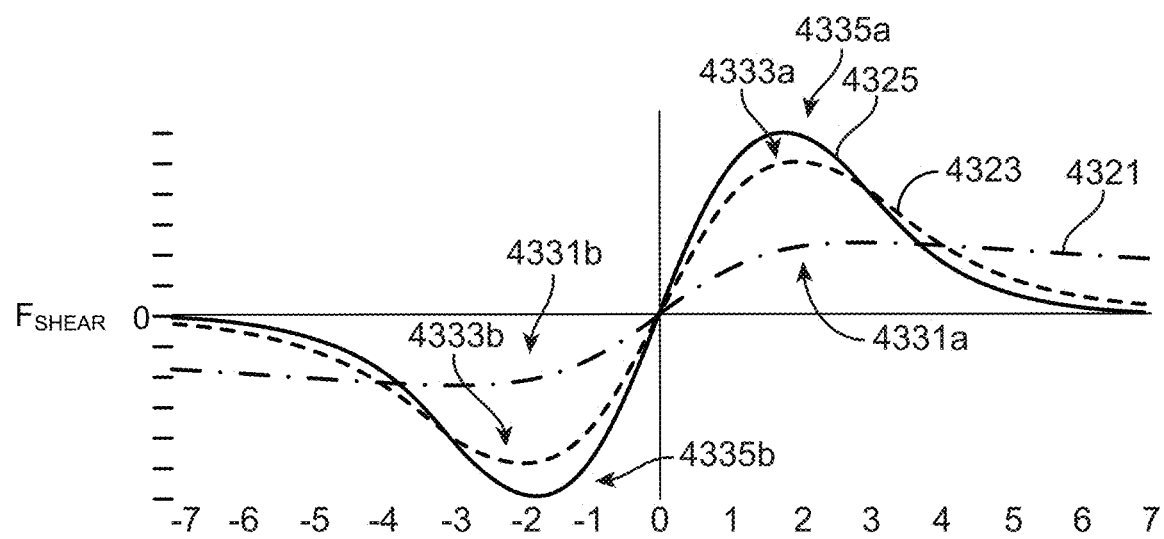

FIGS. 43A and 43B show graphs of force profiles for different magnetic alignment systems, according to some embodiments. Specifically, FIG. 43A shows a graph 4300 of vertical attractive (normal) force in the axial (z) direction for different magnetic alignment systems of comparable size and using similar types of magnets. Graph 4300 has a horizontal axis representing displacement from a center of alignment, where 0 represents the aligned position and negative and positive values represent left and right displacements from the aligned position in arbitrary units, and a vertical axis showing the normal force ($F_{NORMAL}$) as a function of displacement in arbitrary units. For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 4300 shows normal force profiles for three different types of magnetic alignment systems. A first type of magnetic alignment system uses central alignment components, such as a pair of complementary disc-shaped magnets placed along an axis; a representative normal force profile for a "central" magnetic alignment system is shown as line 4301 (dot-dash line). A second type of magnetic alignment system uses annular alignment components with axial magnetic orientations, e.g., magnetic alignment system 3900 of FIGS. 39A and 39B; a representative normal force profile for such an annular-axial magnetic alignment system is shown as line 4303 (dashed line). A third type of magnetic alignment system uses annular alignment components with closed-loop magnetic orientations and radial symmetry (e.g., magnetic alignment system 4200 of FIG. 42); a representative normal force profile for a radially symmetric closed-loop magnetic alignment system is shown as line 4305 (solid line.)

Similarly, FIG. 43B shows a graph 4320 of lateral (shear) force in a transverse direction for different magnetic alignment systems. Graph 4320 has a horizontal axis representing displacement from a center of alignment using the same convention and units as graph 4300, and a vertical axis showing the shear force ($F_{SHEAR}$) as a function of direction in arbitrary units. For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 4320 shows shear force profiles for the same three types of magnetic alignment systems as graph 4300: a representative shear force profile for a central magnetic alignment system is shown as line 4321 (dot-dash line); a representative shear force profile for an annular-axial magnetic alignment system is shown as line 4323 (dashed line); and a representative normal force profile for a radially symmetric closed-loop magnetic alignment system is shown as line 4325 (solid line).

As shown in FIG. 43A, each type of magnetic alignment system achieves the strongest magnetic attraction in the axial direction when the primary and secondary alignment components are in the aligned position (0 on the horizontal axis), as shown by respective peaks 4311, 4313, and 4315. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 4200 of FIG. 42) provides stronger magnetic attraction when in the aligned position than the other types of magnetic alignment systems. This strong attractive normal force can overcome small misalignments due to frictional force and can achieve a more accurate and robust alignment between the primary and secondary alignment components, which in turn can provide a more accurate and robust alignment between a portable electronic device and a wireless charging device within which the magnetic alignment system is implemented.

As shown in FIG. 43B, the strongest shear forces (attractive or repulsive) are obtained when the primary and secondary alignment components are laterally just outside of the aligned position, e.g., at −2 and +2 units of separation from the aligned position, as shown by respective peaks 4331*a-b*, 4333*a-b*, and 4335*a-b*. Similarly to the normal force, the magnitude of the peak strength of shear force depends on the type of magnetic alignment system. In particular, a radially-symmetric closed-loop magnetic alignment system (e.g., magnetic alignment system 4200 of FIG. 42) provides higher magnitude of shear force when just outside of the aligned position than the other types of magnetic alignment systems. This strong shear force can provide tactile feedback to help the user identify when the two components are aligned. In addition, like the strong normal force, the strong shear force can overcome small misalignments due to frictional force and can achieve a more accurate and robust alignment between the primary and secondary alignment components, which in turn can provide a more accurate and robust alignment between a portable electronic device and a wireless charging device within which the magnetic alignment system is implemented.

A radially-symmetric closed-loop magnetic alignment system (e.g., magnetic alignment system 4200 of FIG. 42) can provide accurate and robust alignment in the axial and lateral directions. Further, because of the radial symmetry, the alignment system does not have a preferred rotational orientation in the lateral plane about the axis; the shear force profile is the same regardless of relative rotational orientation of the electronic devices being aligned.

Figure 44:
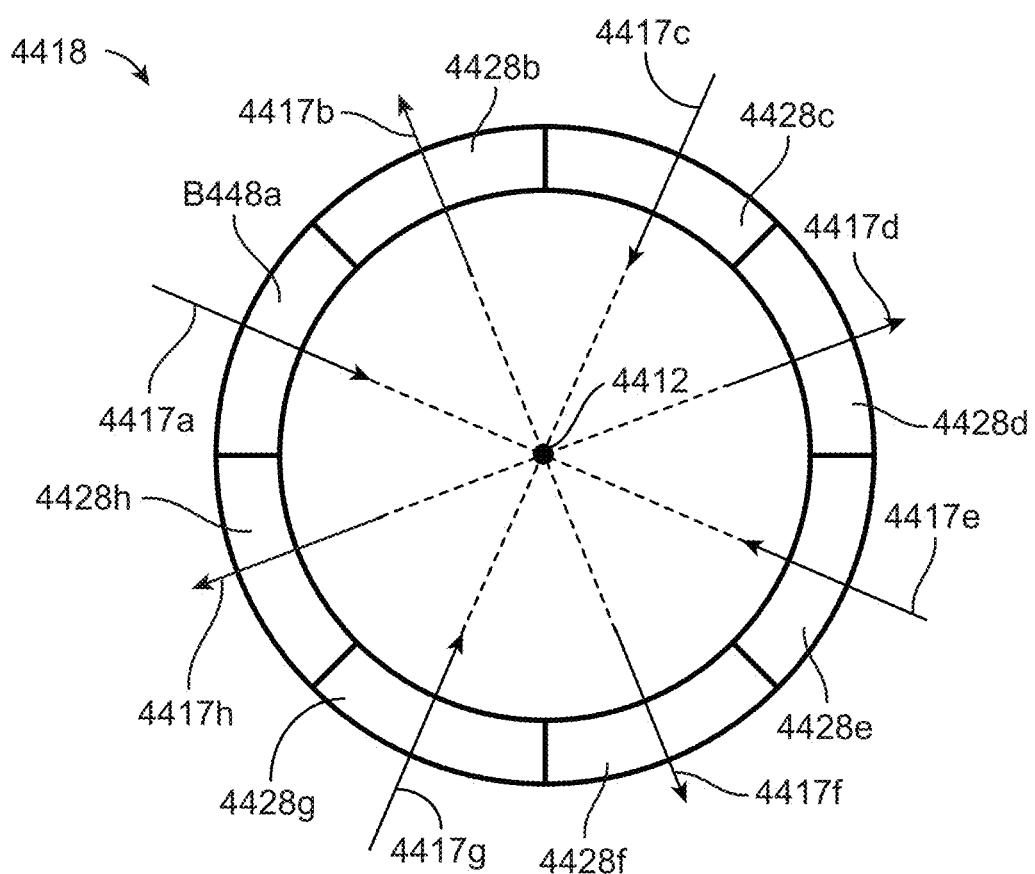
FIG. 44 shows a simplified top-down view of a secondary alignment component according to some embodiments.

In some embodiments, a closed-loop magnetic alignment system can be designed to provide one or more preferred rotational orientations. FIG. 44 shows a simplified top-down view of a secondary alignment component 4418 according to some embodiments. Secondary alignment component 4418 includes sectors 4428*a-h* with radial magnetic orientations as shown by magnetic polarity indicators 4417*a-h*. Each of sectors 4428*a-h* can include one or more secondary arcuate magnets (not shown). In this example, secondary magnets in sectors 4428*b*, 4428*d*, 4428*f*, and 4428*h* each have a north magnetic pole oriented toward the radially outward side and a south magnetic pole toward the radially inward side, while secondary magnets in sectors 4428*a*, 4428*c*, 4428*e*, and 4428*g* each have a north magnetic pole oriented toward the radially inward side and a south magnetic pole toward the radially outward side. In other words, magnets in sectors 4428*a-h* of secondary alignment component 4418 have alternating magnetic orientations. A complementary primary alignment component can have sectors with correspondingly alternating magnetic orientations.

Figure 45A:
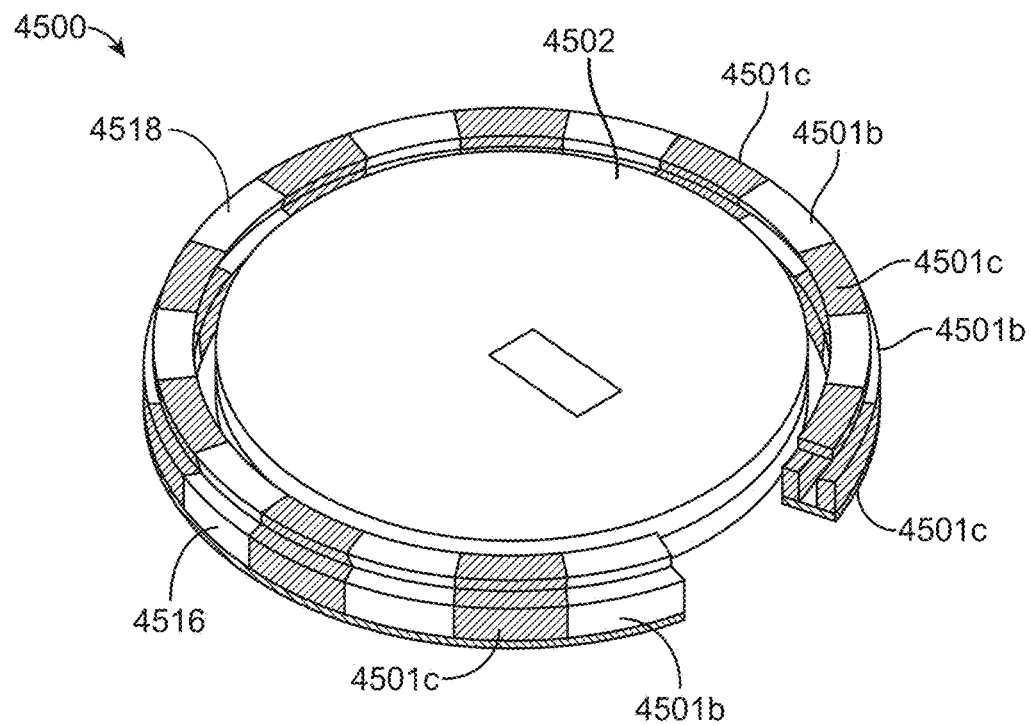
FIG. 45A shows a perspective view of a magnetic alignment system according to some embodiments.

For example, FIG. 45A shows a perspective view of a magnetic alignment system 4500 according to some embodiments. Magnetic alignment system 4500 includes a secondary alignment component 4518 having alternating radial magnetic orientations (e.g., as shown in FIG. 44) and a complementary primary alignment component 4516. Some of the arcuate sections of magnetic alignment system 4500 are not shown in order to reveal internal structure; however, it should be understood that magnetic alignment system 4500 can be a complete annular structure. Also shown are components 4502, which can include, for example, inductive coil assemblies or other components located within the central region of primary annular alignment component 4516 and/or secondary annular alignment component 4518. Magnetic alignment system 4500 can be a closed-loop magnetic alignment system similar to magnetic alignment system 4000 described above and can include arcuate sectors 4501*b*, 4501*c* of alternating magnetic orientations, with each arcuate sector 4501*b*, 4501*c* including one or more arcuate magnets in each of primary annular alignment component 4516 and secondary annular alignment component 4518. In some embodiments, the closed-loop configuration of magnetic alignment system 4500 can reduce or prevent magnetic field leakage that can affect component 4502.

Figures 45B, 45C:
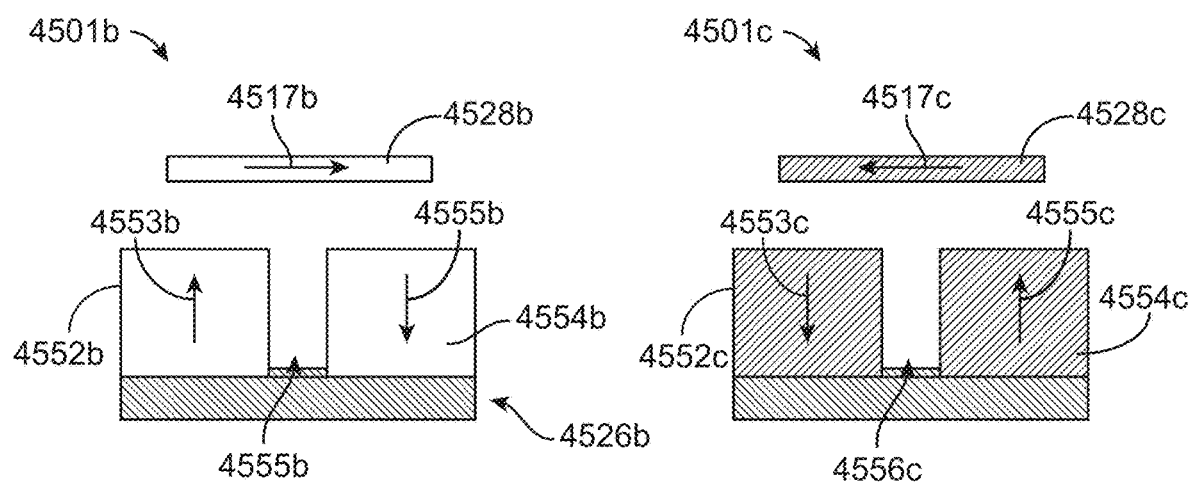
FIGS. 45B and 45C show axial cross-section views through different portions of the system of FIG. 45A.

FIG. 45B shows an axial cross-section view through one of arcuate sectors 4501*b*, and FIG. 45C shows an axial cross-section view through one of arcuate sectors 4501*c*. Arcuate sector 4501*b* includes a primary magnet 4526*b* and a secondary magnet 4528b. As shown by orientation indicator 4517b, secondary magnet 4528b has a magnetic polarity oriented in a radially outward direction, i.e., the north magnetic pole is toward the radially outward side of magnetic alignment system 4500. Like primary magnets 4026 described above, primary magnet 4526b includes an inner arcuate magnetic region 4552b, an outer arcuate magnetic region 4554b, and a central nonmagnetic region 4556b (which can include, e.g., an air gap or a region of nonmagnetic material). Inner arcuate magnetic region 4552b has a magnetic polarity oriented axially such that the north magnetic pole is toward secondary magnet 4528b, as shown by indicator 4553b, while outer arcuate magnetic region 4554b has an opposite magnetic orientation, with the south magnetic pole oriented toward secondary magnet 4528b, as shown by indicator 4555b. As described above with reference to FIG. 40B, the arrangement of magnetic orientations shown in FIG. 45B results in magnetic attraction between primary magnet 4526b and secondary magnet 4528b.

As shown in FIG. 45C, arcuate sector 4501c has a "reversed" magnetic orientation relative to arcuate sector 4501b. Arcuate sector 4501c includes a primary magnet 4526c and a secondary magnet 4528c. As shown by orientation indicator 4517c, secondary magnet 4528c has a magnetic polarity oriented in a radially inward direction, i.e., the north magnetic pole is toward the radially inward side of magnetic alignment system 4500. Like primary magnets 4026 described above, primary magnet 4526c includes an inner arcuate magnetic region 4552c, an outer arcuate magnetic region 4554c, and a central nonmagnetic region 4556c (which can include, e.g., an air gap or a region of nonmagnetic material). Inner arcuate magnetic region 4552c has a magnetic polarity oriented axially such that the south magnetic pole is toward secondary magnet 4528c, as shown by indicator 4553c, while outer arcuate magnetic region 4554c has an opposite magnetic orientation, with the north magnetic pole oriented toward secondary magnet 4528c, as shown by indicator 4555c. As described above with reference to FIG. 40B, the arrangement of magnetic orientations shown in FIG. 45C results in magnetic attraction between primary magnet 4526c and secondary magnet 4528c.

An alternating arrangement of magnetic polarities as shown in FIGS. 44 and 45A-45C can create a "ratcheting" feel when secondary alignment component 4518 is aligned with primary alignment component 4516 and one of alignment components 4516, 4518 is rotated relative to the other about the common axis. For instance, as secondary alignment component 4518 is rotated relative to primary alignment component 4516, radially-outward magnet 4528b alternately come into proximity with a complementary magnet 4526b of primary alignment component 4516, resulting in an attractive magnetic force, and with an anti-complementary magnet 4526c of primary alignment component 4516, resulting in a repulsive magnetic force. If primary magnets 4526b, 4526c and secondary magnets 4528b, 4528c have the same angular size and spacing, in any given orientation, each pair of magnets will experience similar net attractive or repulsive magnetic forces such that alignment is stable and robust in rotational orientations in which complementary magnet pairs 4526b, 4528b and 4526c, 4528c are in proximity. In other rotational orientations, a torque toward a stable rotational orientation can be experienced.

Figure 46A:
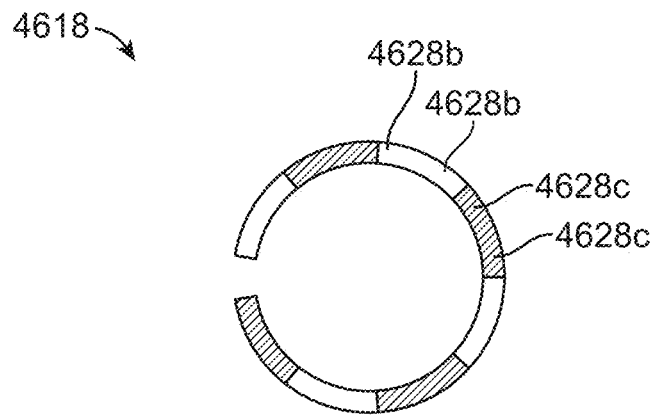
FIGS. 46A and 46B show a simplified top-down view of secondary alignment components according to various embodiments.
Figure 46B:
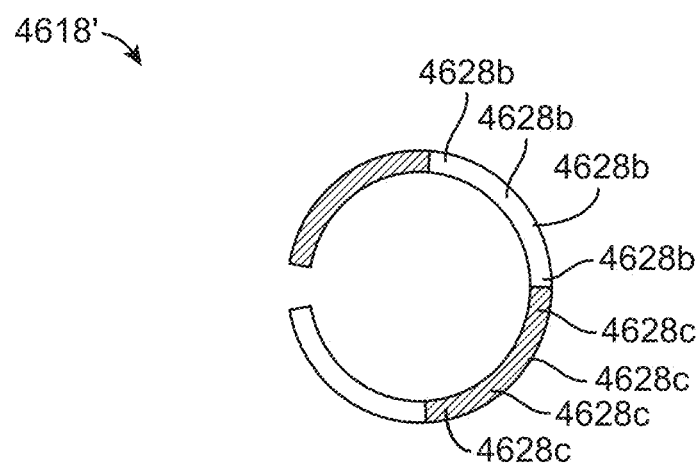

In the examples shown in FIGS. 44 and 45A-45C, each sector includes one magnet, and the direction of magnetic orientation alternates with each magnet. In some embodiments, a sector can include two or more magnets having the same direction of magnetic orientation. For example, FIG. 46A shows a simplified top-down view of a secondary alignment component 4618 according to some embodiments. Secondary alignment component 4618 includes secondary magnets 4628b with radially outward magnetic orientations and secondary magnets 4628c with radially inward orientations, similarly to secondary alignment component 4518 described above. In this example, the magnets are arranged such that a pair of outwardly-oriented magnets 4628b (forming a first sector) are adjacent to a pair of inwardly-oriented magnets 4628c (forming a second sector adjacent to the first sector). The pattern of alternating sectors (with two magnets per sector) repeats around the circumference of secondary alignment component 4618. Similarly, FIG. 46B shows a simplified top-down view of another secondary alignment component 4618' according to some embodiments. Secondary alignment component 4618' includes secondary magnets 4628b with radially outward magnetic orientations and secondary magnets 4628c with radially inward orientations. In this example, the magnets are arranged such that a group of four radially-outward magnets 4628b (forming a first sector) is adjacent to a group of four radially-inward magnets 4628c (forming a second sector adjacent to the first sector). The pattern of alternating sectors (with four magnets per sector) repeats around the circumference of secondary alignment component 4618'. Although not shown in FIGS. 46A and 46B, the structure of a complementary primary alignment component for secondary alignment component 4618 or 4618' should be apparent in view of FIGS. 45A-8C. A shear force profile for the alignment components of FIGS. 46A and 46B can be similar to the ratcheting profile described above, although the number of rotational orientations that provide stable alignment will be different.

Figure 47:
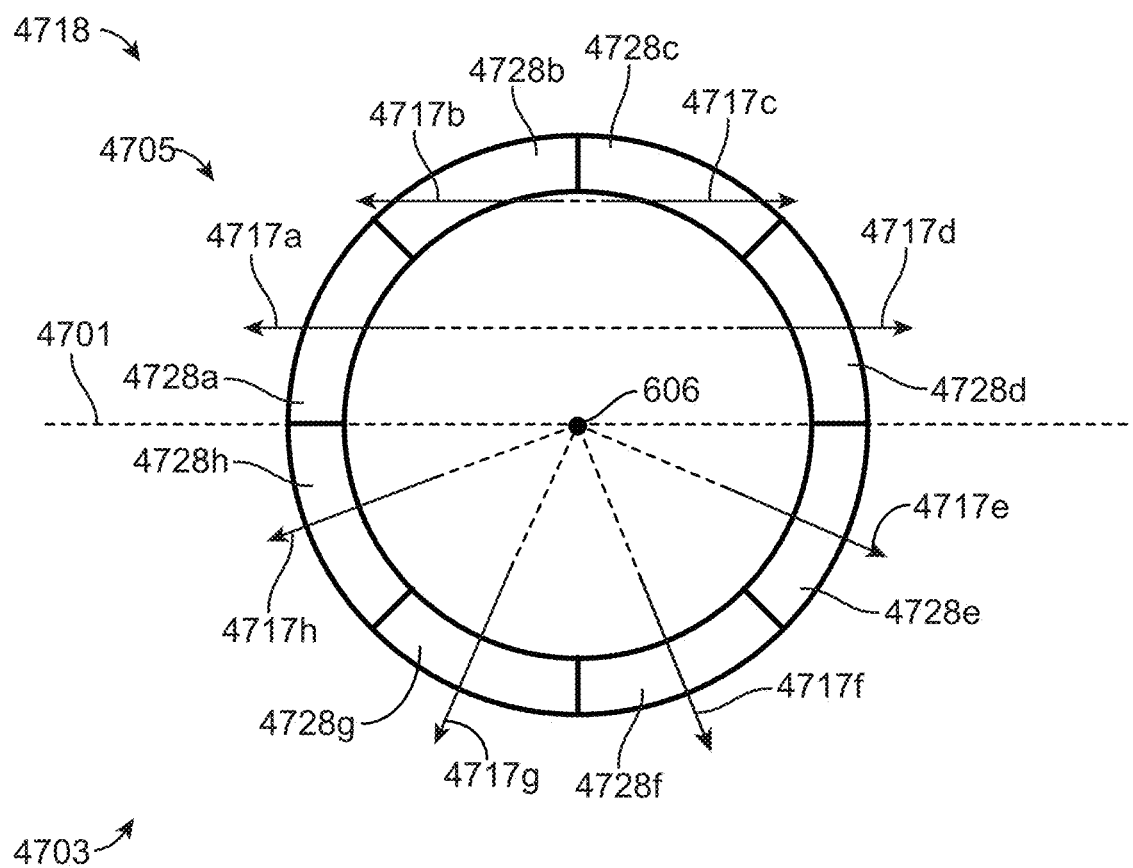
FIG. 47 shows a simplified top-down view of a secondary alignment component according to some embodiments.

In other embodiments, a variety of force profiles can be created by changing the alignment of different component magnets of the primary and/or secondary alignment components. As just one example, FIG. 47 shows a simplified top-down view of a secondary alignment component 4718 according to some embodiments having sectors 4728a-h with location-dependent magnetic orientations as shown by magnetic polarity indicators 4717a-h. In this example, secondary alignment component 4718 can be regarded as bisected by bisector line 4701, which defines two halves of secondary alignment component 4718. In a first half 4703, sectors 4728e-h have magnetic polarities oriented radially outward, similarly to examples described above.

In the second half 4705, sectors 4728a-d have magnetic polarities oriented substantially parallel to bisector line 4701 rather than radially. In particular, sectors 4728a and 4728b have magnetic polarities oriented in a first direction parallel to bisector line 4701, while sectors 4728c and 4728d have magnetic polarities oriented in the direction opposite to the direction of the magnetic polarities of sectors 4728a and 4728b. A complementary primary alignment component can have an inner annular region with magnetic north pole oriented toward secondary alignment component 4718, an outer annular region with magnetic north pole oriented away from secondary alignment component 4718, and a central non-magnetized region, providing a closed-loop magnetic orientation as described above. The asymmetric arrangement of magnetic orientations in secondary alignment component 4718 can modify the shear force profile such that secondary alignment component 4718 generates less shear force in the direction toward second half 4705 than in the direction toward first half 4703. In some embodiments, an asymmetrical arrangement of this kind can be used where the primary alignment component is mounted in a docking station and the secondary alignment component is mounted in a portable electronic device that docks with the docking station. Assuming secondary annular alignment component 4718 is oriented in the portable electronic device such that half-annulus 4705 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations to provide forces toward the desired position of alignment. Different combinations of magnetic orientations can create different shear force profiles, and the selection of magnetic orientations can be made based on a desired shear force profile.

In embodiments described above, it is assumed (though not required) that the magnetic alignment components are fixed in position relative to the device enclosure and do not move in the axial or lateral direction. This provides a fixed magnetic flux. In some embodiments, it can be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

FIGS. 48A through 48C illustrate examples of moving magnets according to an embodiment of the present invention. In these examples, first electronic device 4800 can be a wireless charger, such as any of the wireless chargers shown herein, or other device having a magnet 4810 (which can be, e.g., magnet array 320 in FIG. 3 or any of the annular or other magnetic alignment components such as the magnet arrays and alignment magnets described above), while a second electronic device (not shown) can be a phone or other electronic device. In FIG. 48A, moving magnet 4810 can be housed in a first electronic device 4800. First electronic device 4800 can include device enclosure 4830, magnet 4810, and shield 4820. Magnet 4810 can be in a first position (not shown) adjacent to nonmoving shield 4820. In this position, magnet 4810 can be separated from device enclosure 4830. As a result, the magnetic flux 4812 at a surface of device enclosure 4830 can be relatively low, thereby protecting magnetic devices and magnetically stored information, such as information stored on payment cards. As magnet 4810 in first electronic device 4800 is attracted to a second magnet (not shown) in the second electronic device, magnet 4810 can move, for example it can move away from shield 4820 to be adjacent to device enclosure 4830, as shown. With magnet 4810 at this location, magnetic flux 4812 at surface of device enclosure 4830 can be relatively high. This increase in magnetic flux 4812 can help to attract the second electronic device to first electronic device 4800.

With this configuration, it can take a large amount of magnetic attraction for magnet 4810 to separate from shield 4820. Accordingly, these and other embodiments of the present invention can include a shield that is split into a shield portion and a return plate portion. For example, in FIG. 48B, line 4860 can be used to indicate a split of shield 4820 into a shield 4840 and return plate 4850.

In FIG. 48C, moving magnet 4810 can be housed in first electronic device 4800. First electronic device 4800 can include device enclosure 4830, magnet 4810, shield 4840, and return plate 4850. In the absence of a magnetic attraction, magnet 4810 can be in a first position (not shown) such that shield 4840 can be adjacent to return plate 4850. Again, in this configuration, magnetic flux 4812 at a surface of device enclosure 4830 can be relatively low. As magnet 4810 and first electronic device 4800 is attracted to a second magnet (not shown) in a second electronic device (not shown), magnet 4810 can move, for example it can move away from return plate 4850 to be adjacent to device enclosure 4830, as shown. In this configuration, shield 4840 can separate from return plate 4850 and the magnetic flux 4812 at a surface of device enclosure 4830 can be increased. As before, this increase in magnetic flux 4812 can help to attract the second electronic device to the first electronic device 4800.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

FIGS. 49A and 49B illustrate a moving magnetic structure according to an embodiment of the present invention. In this example, first electronic device 4900 can be a wireless charger, such as any of the wireless chargers shown herein, or other device having a magnet 4910 (which can be, e.g., magnet array 320 in FIG. 3 or any of the annular or other magnetic alignment components such as the magnet arrays and alignment magnets described above), while a second electronic device 4960 (shown in FIG. 49B) can be a phone or other electronic device. FIG. 49A illustrates a moving first magnet 4910 in a first electronic device 4900. First electronic device 4900 can include first magnet 4910, protective surface 4912, housings 4920 and 4922, compliant structure 4924, shield 4940, and return plate 4950. In this figure, first magnet 4910 is not attracted to a second magnet (not shown), and therefore shield 4940 is magnetically attracted to or attached to return plate 4950. In this position, compliant structure 4924 can be expanded or relaxed. Compliant structure 4924 can be formed of an elastomer, silicon rubber open cell foam, silicon rubber, polyurethane foam, or other foam or other compressible material.

In FIG. 49B, second electronic device 4960 has been brought into proximity of first electronic device 4900. Second magnet 4970 can attract first magnet 4910, thereby causing shield 4940 and return plate 4950 to separate from each other. Housings 4920 and 4922 can compress compliant structure 4924, thereby allowing protective surface 4912 of first electronic device 4900 to move towards or adjacent to housing 4980 of second electronic device 4960. Second magnet 4970 can be held in place in second electronic device 4960 by housing 4990 or other structure. As second electronic device 4960 is removed from first electronic device 4900, first magnet 4910 and shield 4940 can be magnetically attracted to return plate 4950, as shown in FIG. 49A.

FIGS. 50A and 50B illustrate moving magnetic structures according to an embodiment of the present invention. In this example, first electronic device 5000 can be a wireless charger, such as any of the wireless chargers shown herein, or other device having a magnet 5010 (which can be, e.g., magnet array 320 in FIG. 3 or any of the annular or other magnetic alignment components such as the magnet arrays and alignment magnets described above), while second electronic device 5060 (shown in FIG. 50B) can be a phone or another electronic device. FIG. 50A illustrates a moving first magnet 5010 in a first electronic device 5000. First electronic device 5000 can include first magnet 5010, pliable surface 5012, housing portions 5020 and 5022, shield 5040, and return plate 5050. In this figure, first magnet 5010 is not attracted to a second magnet, and therefore shield 5040 is magnetically attached or attracted to return plate 5050. In this position, pliable surface 5012 can be relaxed. Pliable surface 5012 can be formed of an elastomer, silicon rubber open cell foam, silicon rubber, polyurethane foam, or other foam or other compressible material.

In FIG. 50B, second electronic device 5060 has been brought into the proximity of first electronic device 5000. Second magnet 5070 can attract first magnet 5010, thereby causing shield 5040 and return plate 5050 to separate from each other. First magnet 5010 can stretch pliable surface 5012 towards second electronic device 5060, thereby allowing first magnet 5010 of first electronic device 5000 to move towards housing 5080 of second electronic device 5060. Second magnet 5070 can be held in place in second electronic device 5060 by housing 5080 or other structure. As second electronic device 5060 is removed from first electronic device 5000, first magnet 5010 and shield 5040 can be magnetically attracted to return plate 5050 as shown in FIG. 50A.

Figure 51:
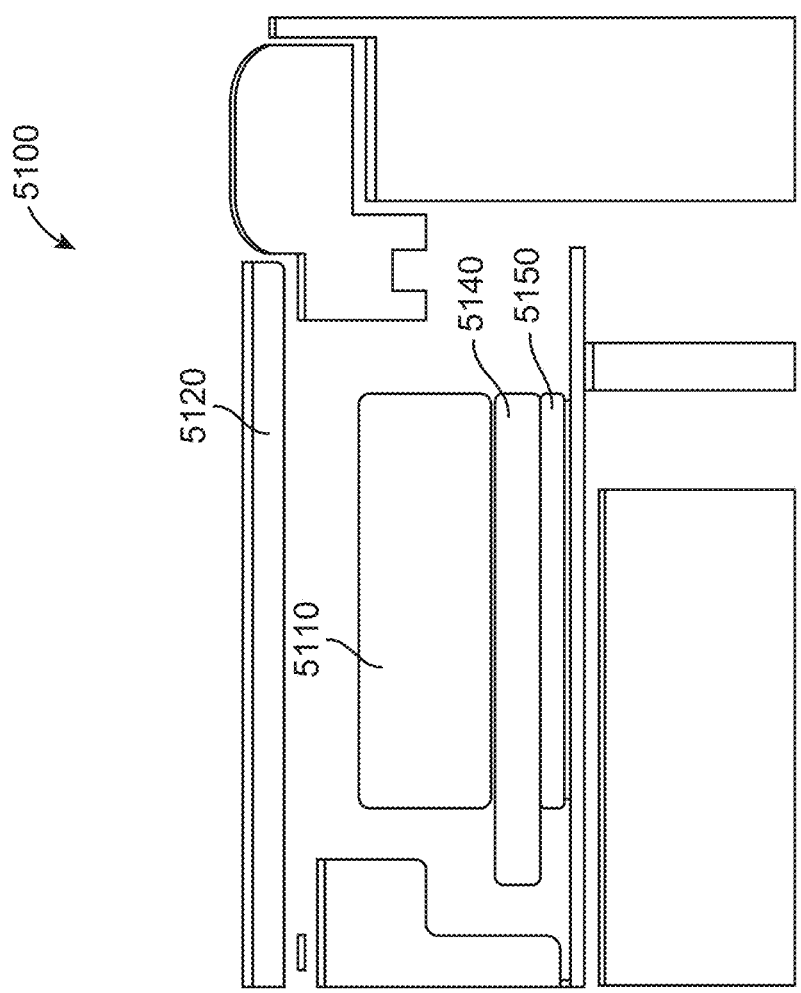
FIG. 51 through FIG. 53 illustrate a moving magnetic structure according to an embodiment of the present invention.
Figure 52:
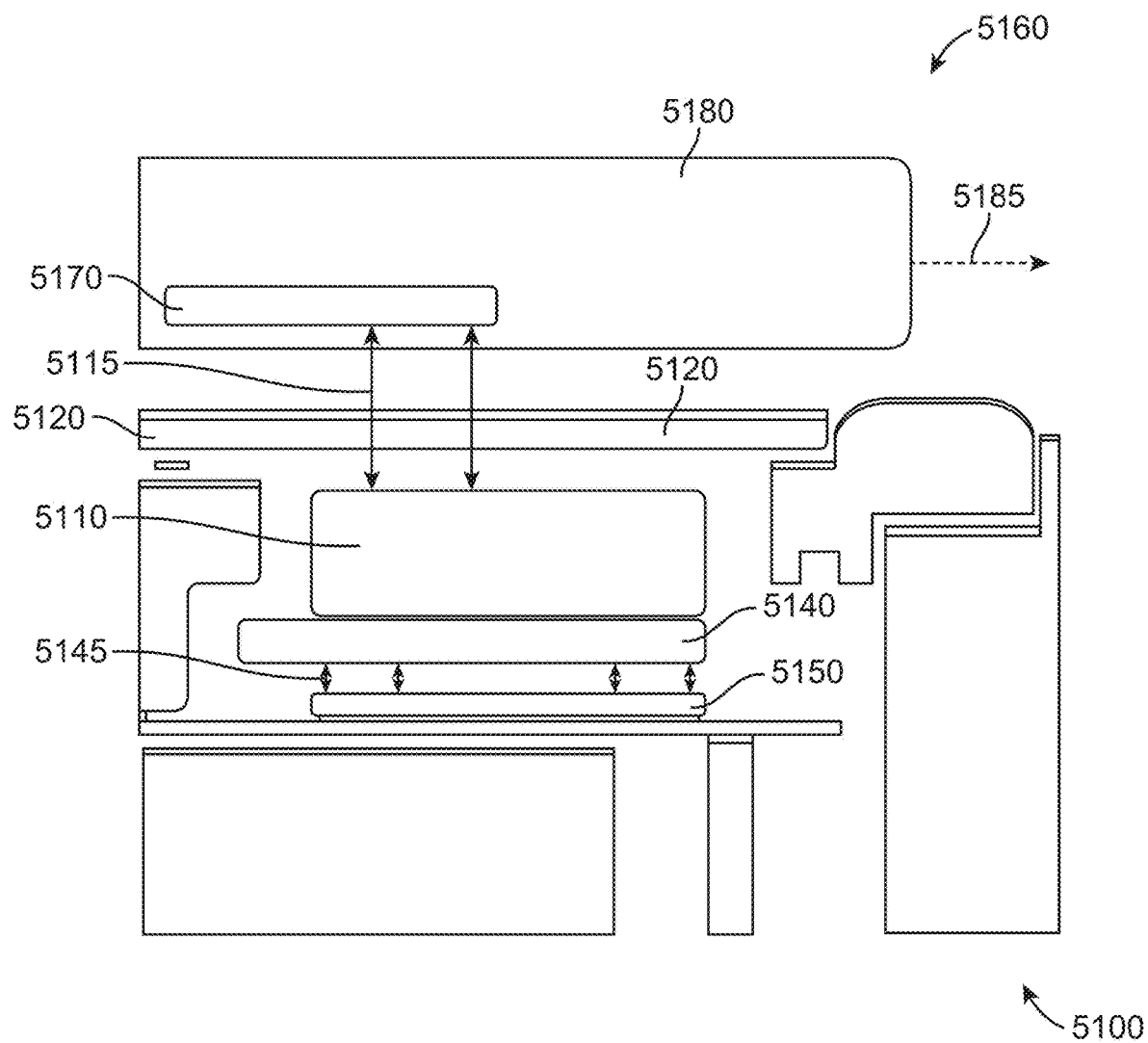
Figure 53:
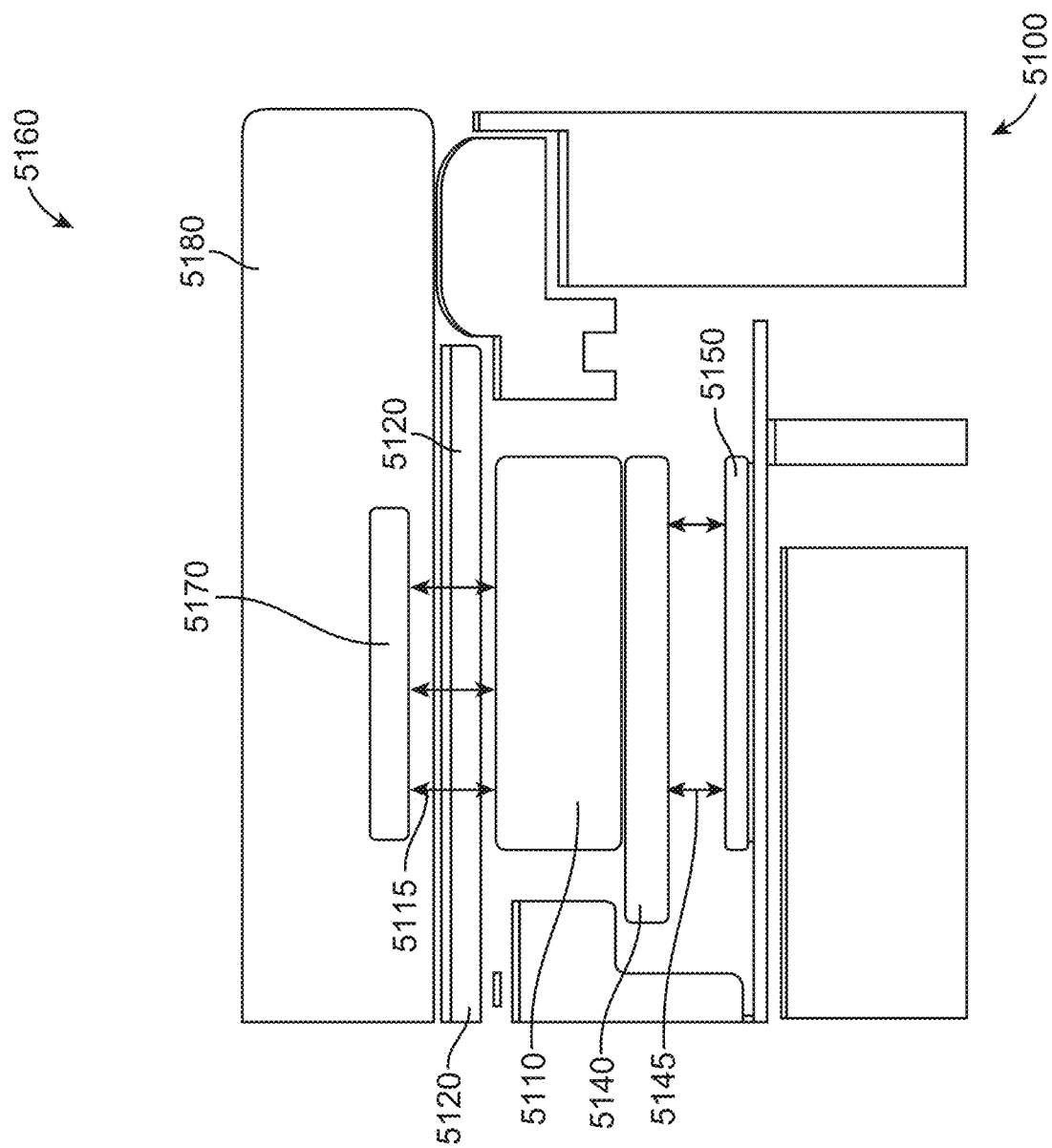

FIG. 51 through FIG. 53 illustrate a moving magnetic structure according to an embodiment of the present invention. In this example, first electronic device 5100 can be a wireless charger, such as any of the wireless chargers shown herein, or other device having a magnet 5110 (which can be, e.g., magnet array 320 in FIG. 3 or any of the annular or other magnetic alignment components such as the magnet arrays and alignment magnets described above), while second electronic device 5090 (shown in FIG. 52) can be a phone or other electronic device. In FIG. 51, first magnet 5110 and shield 5140 can be magnetically attracted or attached to return plate 5150 in first electronic device 5100. First electronic device 5100 can be at least partially housed in device enclosure 5120. In FIG. 52, housing 5180 of second electronic device 5160 can move laterally across a surface of device enclosure 5120 of first electronic device 5100 in a direction 5185. Second magnet 5170 in second electronic device 5160 can begin to attract first magnet 5110 in first electronic device 5100. This magnetic attraction 5115 can cause first magnet 5110 and shield 5140 to pull away from return plate 5150 by overcoming the magnetic attraction 5145 between shield 5140 and return plate 5150. In FIG. 53, second magnet 5170 in second electronic device 5160 has become aligned with first magnet 5110 in first electronic device 5100. First magnet 5110 and shield 5140 have pulled away from return plate 5150 thereby reducing the magnetic attraction 5145. First magnet 5110 has moved nearby or adjacent to device enclosure 5120, thereby increasing the magnetic attraction 5115 to second magnet 5170 in second electronic device 5160.

As shown in FIG. 51 through FIG. 53, the magnetic attraction between first magnet 5110 in first electronic device 5100 and the second magnet 5170 in the second electronic device 5160 can increase when first magnet 5110 and shield 5140 pull away from return plate 5150. This is shown graphically in the following figures.

Figure 54:
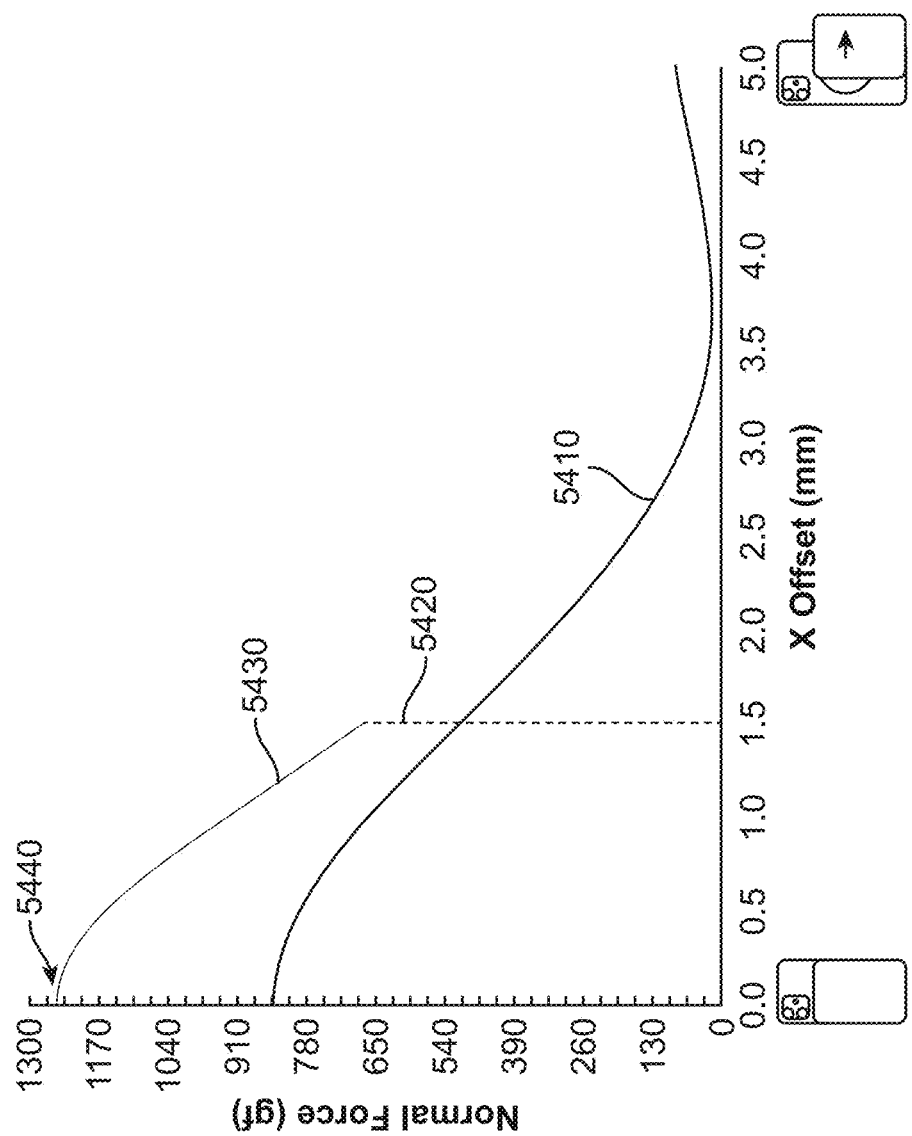
FIG. 54 illustrates a normal force between a first magnet in a first electronic device and a second magnet in a second electronic device.

FIG. 54 illustrates a normal force between a first magnet in first electronic device and a second magnet in a second electronic device as a function of a lateral offset between them. As shown in FIG. 51 through FIG. 53, with a large offset between first magnet 5110 and second magnet 5170, first magnet 5110 and shield 5140 can remain attached to return plate 5150 in first electronic device 5100 and the magnetic attraction 5115 can be minimal. The shear force necessary to overcome this magnetic attraction is illustrated here as curve 5410. As shown in FIG. 52, as the offset or lateral distance between first magnet 5110 and second magnet 5170 decreases, first magnet 5110 and shield 5140 can pull away or separate from return plate 5150, thereby increasing the magnetic attraction 5115 between first magnet 5110 and second magnet 5170. This is illustrated here as discontinuity 5420. As shown in FIG. 53, as first magnet 5110 and second magnet 5170 come into alignment, the magnetic attraction 5115 increases along curve 5430 to a maximum 5440. The difference between curve 5410 and curve 5430 can show the increase in magnetic attraction between a phone or other electronic device, such as second electronic device 5160 and a wireless charger, such as first electronic device 5100, that results from first magnet 5110 being able to move axially. It should also be noted that in this example first magnet 5110 does not move in a lateral direction, though in other embodiments of the present invention, it is capable of such movement. Where first magnet 5110 is capable of moving in a lateral direction, curve 5430 can have a flattened peak from an offset of zero to an offset that can be overcome by a range of possible lateral movement of first magnet 5110.

Figure 55:
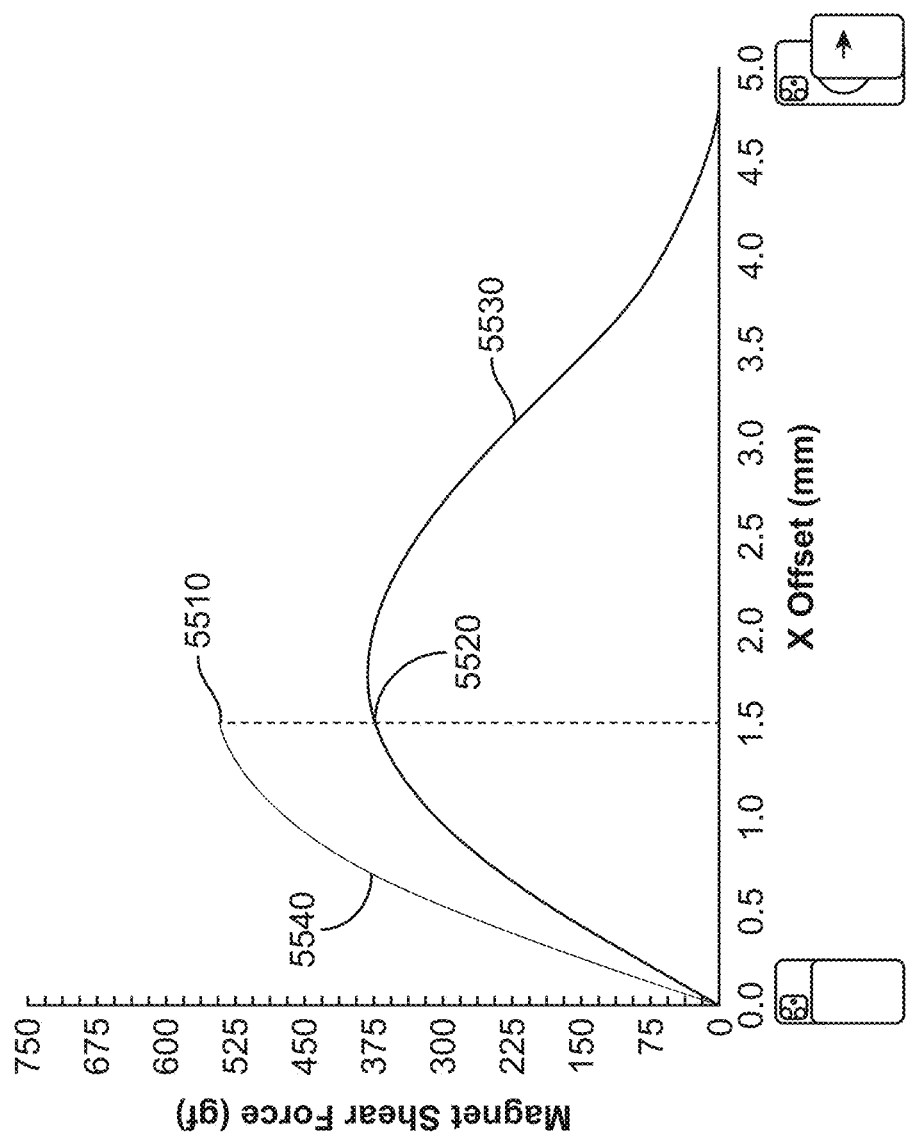
FIG. 55 illustrates a shear force between a first magnet in a first electronic device and a second magnet in a second electronic device.

FIG. 55 illustrates a shear force between a first magnet in a first electronic device and a second magnet in a second electronic device as a function of a lateral offset between them. With no offset between first magnet 5110 and second magnet 5170, there it is no shear force to move second magnet 5170 relative to first magnet 5110, as shown in FIG. 53. As the offset is increased, the shear force, that is the force attempting to realign the magnets, can increase along curve 5540. At discontinuity 5510, first magnet 5110 and shield 5140 can return to return plate 5150 (as shown in FIG. 51 and FIG. 52), thereby decreasing the magnetic shear force to point 5520. The magnetic shear force can continue to drop off along curve 5530 as the offset increases. The difference between curve 5530 and curve 5540 can show the increase in magnetic attraction between a phone or other electronic device, such as second electronic device 5160 and wireless charger, such as first electronic device 5100, that results from first magnet 5110 being able to move axially. It should also be noted that in this example first magnet 5110 does not move in a lateral direction, though in other examples it is capable of such movement. Where first magnet 5110 is capable of moving in a lateral direction, curve 5530 can remain at zero until the lateral movement of the second magnet 5170 overcomes the range of possible lateral movement of first magnet 5110.

For various applications, it can be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as an NFC subsystem can be provided to enable additional communication between devices. For example, each device that has an annular magnetic alignment component can also have an NFC coil that can be disposed inside and concentric with the annular magnetic alignment component. Where the device also has an inductive charging coil (which can be a transmitter coil or a receiver coil), the NFC coil can be disposed in a gap between the inductive charging coil and an annular magnetic alignment component. In some embodiments, the NFC coils can be used to allow a portable electronic device to identify other devices, such as a wireless charging device and/or an auxiliary device, when the respective magnetic alignment components of the devices are brought into alignment. For example, the NFC coil of a power-receiving device can be coupled to an NFC reader circuit while the NFC coil of a power-transmitting device or an accessory device is coupled to an NFC tag circuit. When devices are brought into proximity, the NFC reader circuit of the power-receiving device can be activated to read the NFC tag of the power-transmitting device and/or the accessory device. In this manner, the power-receiving device can obtain information (e.g., device identification) from the power-transmitting device and/or the accessory device.

In some embodiments, an NFC reader in a portable electronic device can be triggered by detecting a change in the DC (or static) magnetic field generated by the magnetic alignment component of the portable electronic device that corresponds to a change expected when another device with a complementary magnetic alignment component is brought into alignment. When the expected change is detected, the NFC reader can be activated to read an NFC tag in the other device, assuming the other device is present.

In some embodiments, an NFC tag can be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 56:
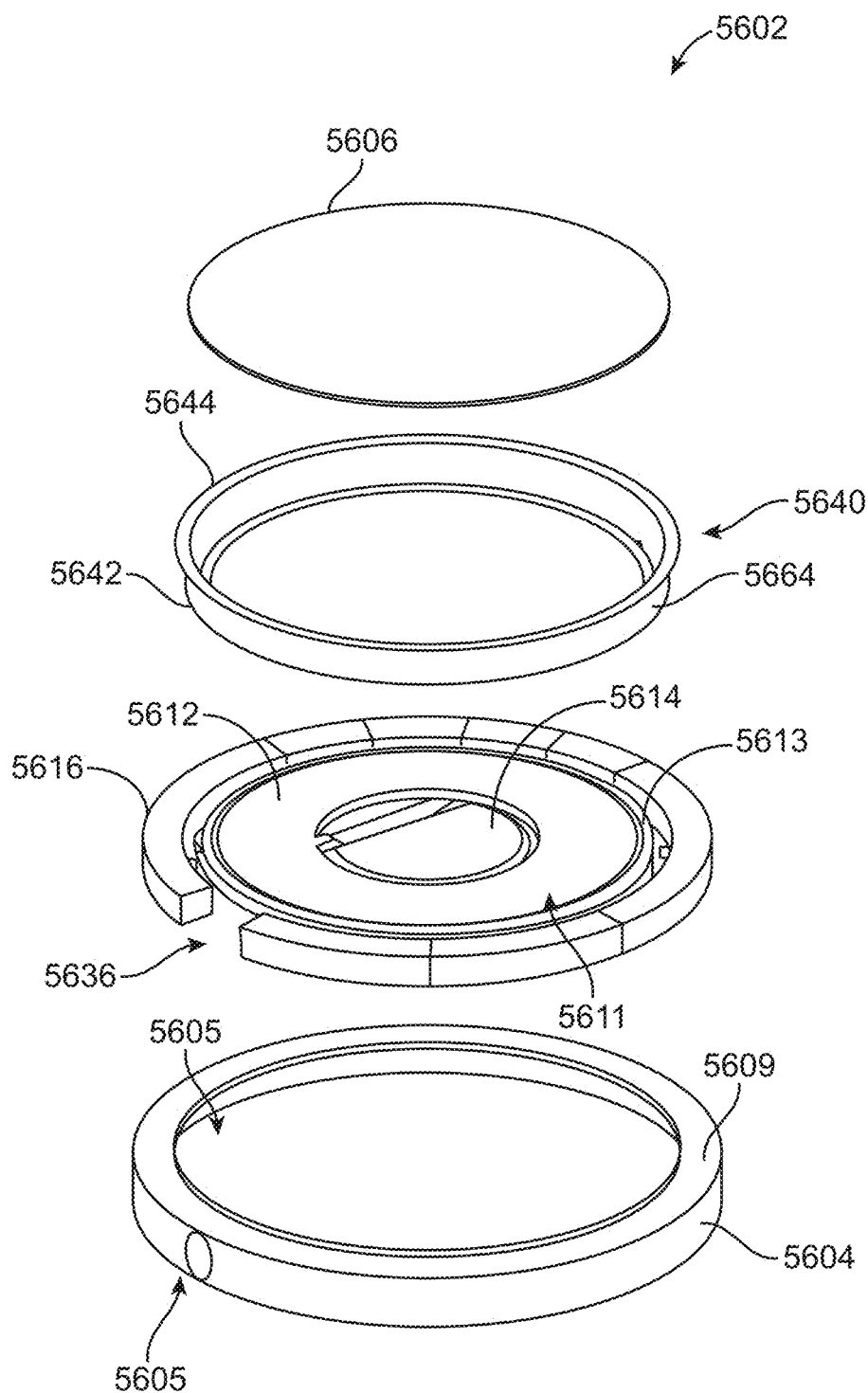
FIG. 56 shows an exploded view of a wireless charger device incorporating an NFC tag circuit according to some embodiments.
Figure 57:
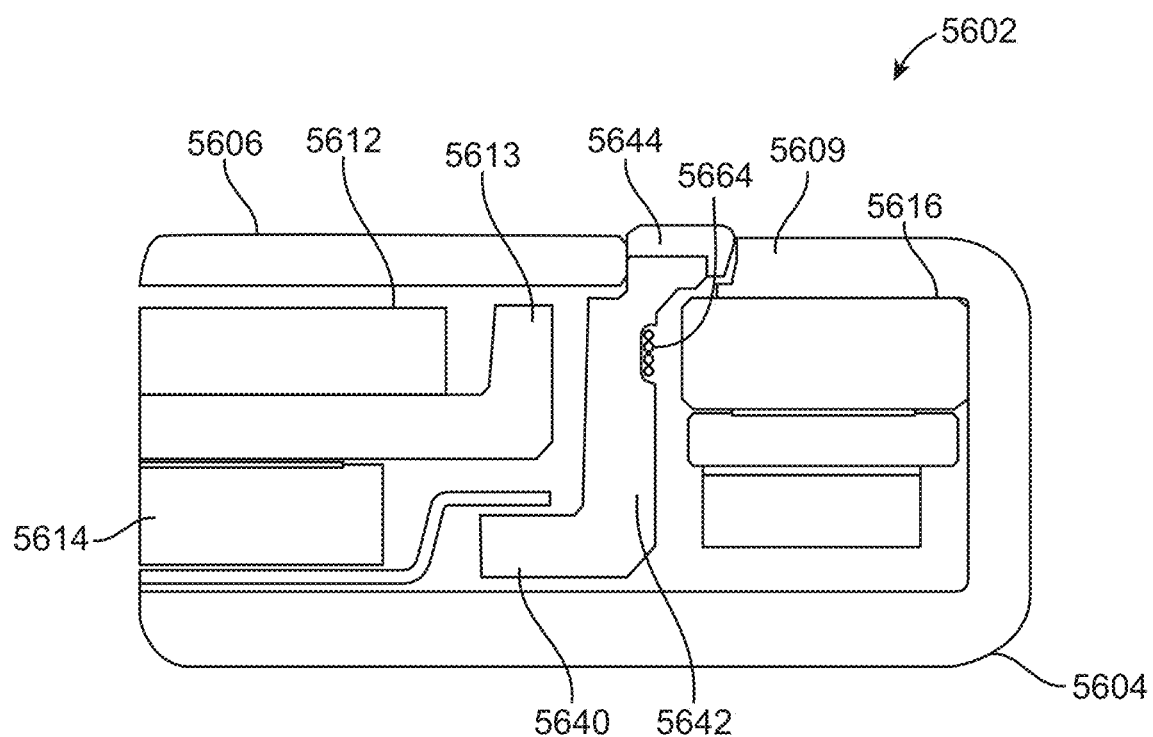
FIG. 57 shows a partial cross-section view of a wireless charger device according to some embodiments.

FIG. 56 shows an exploded view of a wireless charger device 5602 incorporating an NFC tag according to some embodiments, and FIG. 57 shows a partial cross-section view of wireless charger device 5602 according to some embodiments. As shown in FIG. 56, wireless charger device 5602 can include an enclosure 5604, which can be made of plastic or metal (e.g., aluminum), and a charging surface 5606, which can be made of silicone, plastic, glass, or other material that is permeable to AC and DC magnetic fields. Charging surface 5606 can be shaped to fit within a circular opening 5603 at the top of enclosure 5604.

A wireless transmitter coil assembly 5611 can be disposed within enclosure 5604. Wireless transmitter coil assembly 5611 can include a wireless transmitter coil 5612 for inductive power transfer to another device as well as AC magnetic and/or electric shield(s) 5613 disposed around some or all surfaces of wireless transmitter coil 5612. Control circuitry 5614 (which can include, e.g., a logic board and/or power circuitry) to control wireless transmitter coil 5612 can be disposed in the center of coil 5612 and/or underneath coil 5612. In some embodiments, control circuitry 5614 can operate wireless transmitter coil 5612 in accordance with a wireless charging protocol such as the Qi protocol or other protocols.

A primary annular magnetic alignment component 5616 can surround wireless transmitter coil assembly 5611. Primary annular magnetic alignment component 5616 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. In some embodiments, the diameter and thickness of primary annular magnetic alignment component 5616 is chosen such that arcuate magnet sections of primary annular magnetic alignment component 5616 fit under a lip 5609 at the top surface of enclosure 5604, as best seen in FIG. 57. For instance, each arcuate magnet section can be inserted into position under lip 5609, either before or after magnetizing the inner and outer regions. In some embodiments, primary annular magnetic alignment component 5616 can have a gap 5636 between two adjacent arcuate magnet sections. Gap 5636 can be aligned with an opening 5607 in a side surface of enclosure 5604 to allow external wires to be connected to wireless transmitter coil 5612 and/or control circuitry 5614.

A support ring subassembly 5640 can include an annular frame 5642 that extends in the axial direction and a friction pad 5644 at the top edge of frame 5642. Friction pad 5644 can be made of a material such as silicone or thermoplastic elastomers (TPE) such as thermoplastic urethane (TPU) and can provide support and protection for charging surface 5606. Frame 5642 can be made of a material such as polycarbonate (PC), glass-fiber reinforced polycarbonate (GFPC), or glass-fiber reinforced polyamide (GFPA). Frame 5642 can have an NFC coil 5664 disposed thereon. For example, NFC coil 5664 can be a four-turn or five-turn solenoidal coil made of copper wire or other conductive wire that is wound onto frame 5642. In some embodiments, NFC coil 5664 can be electrically connected to NFC tag circuitry (not shown) that can be disposed on frame 5642. The relevant design principles of NFC circuits are well understood in the art and a detailed description is omitted. Frame 5642 can be inserted into a gap region 5617 between primary annular magnetic alignment component 5616 and wireless transmitter coil assembly 5611. In some embodiments, gap region 5617 is shielded by AC shield 5613 from AC electromagnetic fields generated in wireless transmitter coil 5612 and is also shielded from DC magnetic fields of primary annular magnetic alignment component 5616 by the closed-loop configuration of the arcuate magnet sections.

Figure 58:
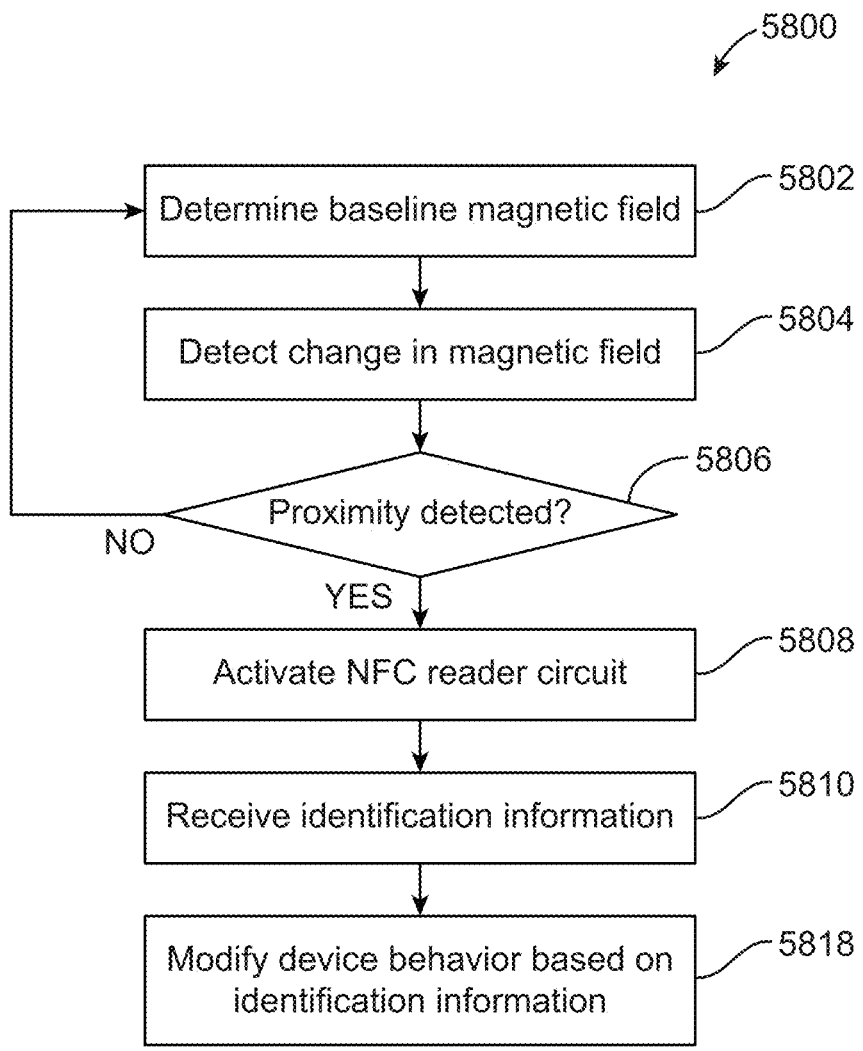
FIG. 58 shows a flow diagram of a process that can be implemented in a portable electronic device according to some embodiments.

FIG. 58 shows a flow diagram of a process 5800 that can be implemented in portable electronic device 5204 according to some embodiments. In some embodiments, process 5800 can be performed iteratively while portable electronic device 5204 is powered on. At block 5802, process 5800 can determine a baseline magnetic field, e.g., using magnetometer 5280. At block 5804, process 5800 can continue to monitor signals from magnetometer 5280 until a change in magnetic field is detected. At block 5806, process 5800 can determine whether the change in magnetic field matches a magnitude and direction of change associated with alignment of a complementary magnetic alignment component. If not, then the baseline magnetic field can be updated at block 5802. If, at block 5806, the change in magnetic field matches a magnitude and direction of change associated with alignment of a complementary alignment component, then at block 5808, process 5800 can activate the NFC reader circuitry associated with NFC coil 5260 to read an NFC tag of an aligned device. At block 5810, process 5800 can receive identification information read from the NFC tag. At block 5812, process 5800 can modify a behavior of portable electronic device 5204 based on the identification information, for example, generating a color wash effect as described above. After block 5812, process 5800 can optionally return to block 5802 to provide continuous monitoring of magnetometer 5280. It should be understood that process 5800 is illustrative and that other processes can be performed in addition to or instead of process 5800.

Figure 59:
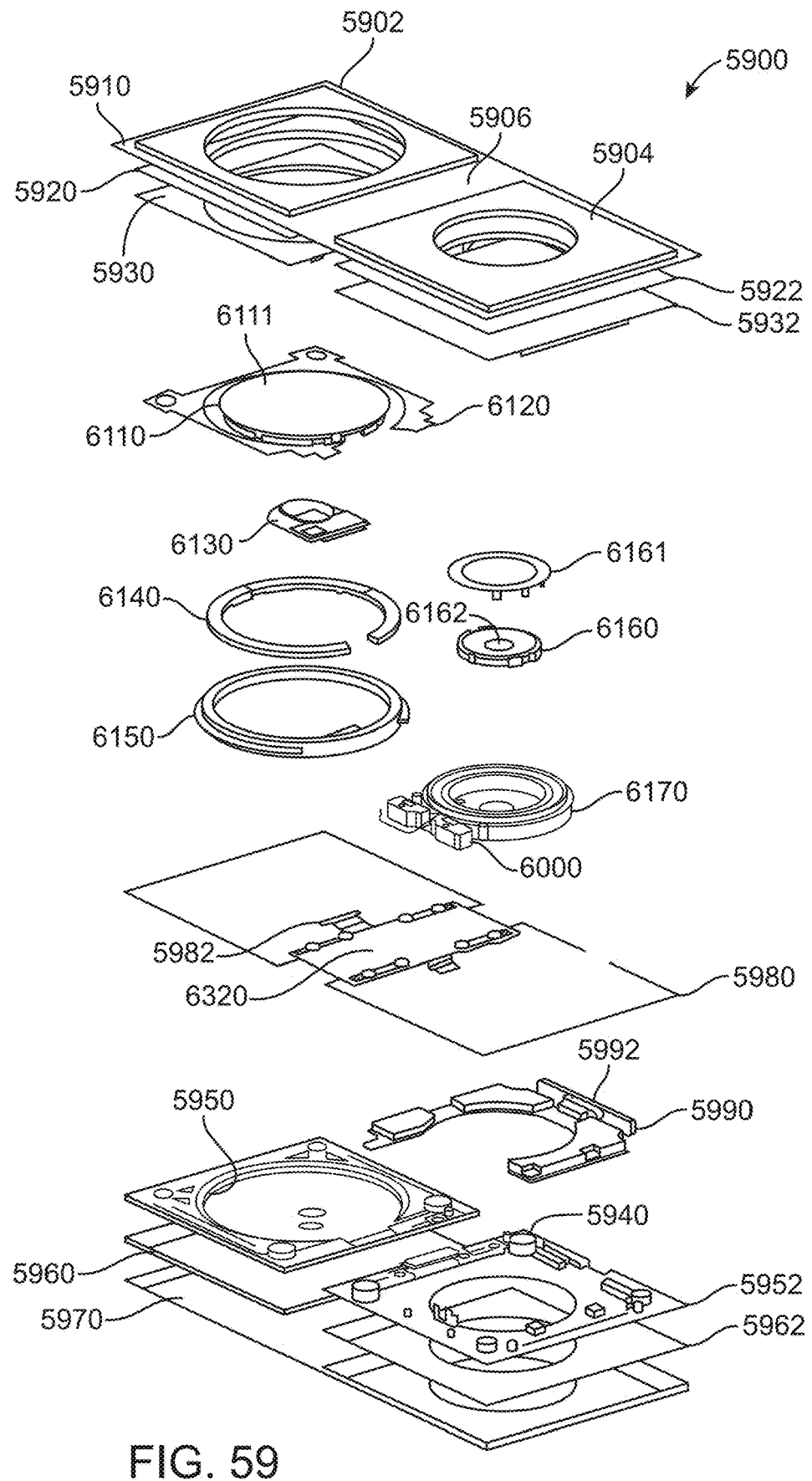
FIG. 59 is an alternative exploded diagram of the wireless charger of FIG. 1.

FIG. 59 is an alternative exploded diagram of the wireless charger of FIG. 1. Wireless charger 5900 can be substantially similar to wireless charger 100 (shown in FIG. 1) and the other wireless chargers shown here. Wireless charger 5900 can include first leaf 5902 for charging a first electronic device (not shown) and second leaf 5904 for charging a second electronic device (not shown.) First leaf 5902 can be joined to second leaf 5904 by main hinge 5906.

First leaf 5902 can include one or more alignment features to align the first electronic device to first leaf 5902. Specifically, first leaf 5902 can include annular magnet array 6140. Magnet array 6140 can attract a corresponding magnet array (not shown) in the first electronic device (not shown) when the first electronic device is brought into proximity with first leaf 5902. Magnet array 6140 can further act as an attachment device to attach the first electronic device to first leaf 5902. Contacting surface of 6111 can also act as an attachment device. Specifically, contacting surface 6111 can be formed of a high friction or high stiction material that holds a back side of a phone (for example) to first leaf 5902. The high friction or high stiction surface of contacting surface 6111 can increase a shear force needed to remove the first electronic device from first leaf 5902. Contacting surface 6111 can also or instead be formed using an adhesive. Using an adhesive can increase a normal force needed to remove the first electronic device from first leaf 5902.

Once aligned, first leaf 5902 can provide charging to the first electronic device using coil 6110. Magnet array 6140 can latterly and circumferentially surround coil 6110. Power can be received at connector 5992. Connector 5992 can be a lightning, USB type C, or other type of connector. This power can be provided through board 5990 to control circuitry 6130. Control circuitry 6130 can generate alternating currents in coil 6110. These alternating currents can generate a time-varying magnetic flux that couples to a corresponding coil (not shown) in the first electronic device. The first electronic device can use these induced currents to charge a battery (not shown) in the first electronic device. Coil 6110 and magnet array 6140 can be housed in enclosure 6150, which can be supported by first bottom enclosure 5950. Enclosure 6150 can be formed of aluminum, stainless steel, or other material. Shield 6120 can help to increase a capacitive coupling between first leaf 5902 and a first electronic device being charged. This increase in capacitive coupling can help to reduce electro-magnetic interference generated by coil 6110 and can help to reduce emissions and noise. Shield 6120 can be formed of copper, stainless steel, or other material. Conductive foam and other conductive structures can be used to improve this shielding. For example, a conductive foam ring (not shown) can be placed around contacting surface 6111.

Second leaf 5904 can include one or more alignment features to align the second electronic device to second leaf 5904. Specifically, second leaf 5904 can include magnet 6162. Magnet 6162 can attract a corresponding magnet (not shown) in the second electronic device when the second electronic device is brought into proximity with charging puck 6170. Magnet 6162 can further act as an attachment device to attach the second electronic device to charging puck 6170. Magnet 6162 and coil 6160 can be housed in charging puck 6170. Puck cap 6161 can be formed of polycarbonate or other material and can cover coil 6160 and magnet 6162. A surface of, and other aspects of, puck cap 6161 can be the same or similar to contacting surface 6111.

Once the second electronic device is aligned to charging puck 6170, charging puck 6170 can provide charging to the second electronic device using coil 6160. Coil 6160 can laterally and circumferentially surround magnet 6162. Power received at connector 5992 can be provided by board 5990 to control circuitry (not shown), which can be connected to coil 6160 in charging puck 6170. The control circuitry in charging puck 6170 can generate alternating currents in coil 6160. Alternatively, the control circuitry can be placed on board 5990. In this arrangement, control circuitry on board 5990 can provide alternating currents via cable 414 (shown in FIG. 4) through puck hinge 6000 to coil 6160 in charging puck 6170. These alternating currents can generate a time varying magnetic flux that couples to a corresponding coil (not shown) in the second electronic device. The second electronic device can use these induced currents to charge a battery (not shown) in the second electronic device. Coil 6160, magnet 6162, and the control circuitry can be supported in charging puck 6170, which can be supported by second bottom enclosure 5952. Puck hinge 6000 can attach charging puck 6170 to second bottom enclosure 5952. Board 5990 can communicate with the control circuitry over cable 414.

Wireless charger 5900 can further include a top layer 5910 and a bottom layer 5970. These layers can be natural or man-made and can have a surface that is appealing to the touch. First top enclosure 5930 and second top enclosure 5932 can be joined to top layer 5910 by layer 5920 and layer 5922. First bottom enclosure 5950 and second bottom enclosure 5952 can be joined to bottom layer 5970 by layer 5960 and layer 5962. Wireless charger 5900 can further include magnets 5940. Magnets 5940 can be arranged to secure a top surface of first leaf 5902 to a top surface of second leaf 5904 when wireless charger 5900 is folded in a first direction. Magnets 5940 can be arranged to secure a bottom surface of first leaf 5902 to a bottom surface of second leaf 5904 when wireless charger 5900 is folded in a second direction.

Flexible circuit board 5982 in main hinge 5906 can be included in flange spacer 6320. Further details regarding flange spacer 6320 are shown below in FIG. 63.

One or more e-shields (not shown) can be placed over either or both coil 6110 and coil 6160. These e-shields can be formed of a layer of copper or other conductive material to intercept electric fields between coil 6110 or coil 6160 and a corresponding coil in an electronic device, and can have a low magnetic permeability to pass magnetic fields between the corresponding coils. These e-shields can include breaks to prevent the formation of eddy currents. One or more ferrites or ferritic elements (not shown) can be placed below either or both coil 6110 and coil 6160 to further improve coupling and shielding. These ferrites can be formed of a material that has high magnetic permeability, such as stainless steel, ferritic stainless steel, oxides of iron, manganese, zinc, or other material or combination of materials.

Portions of these wireless chargers can be formed of various materials. Contacting surface 6111 and other high-friction surfaces can be formed of an elastomer, plastic, PVC plastic, rubber, silicon rubber, urethane, polyurethane, nitrile, neoprene, silicone, or other material. Contacting surface 6111 can be formed using a double-shot molding process. For example, contacting surface 6111 can be formed of a polycarbonate layer covered by a softer, silicone layer. Charging puck 6170, puck hinge 6000, first bottom enclosure 5950, second bottom enclosure 5952, enclosure 6150, and other portions can be formed of aluminum, stainless steel, or other material. These and other structures can be formed by computer-numerically controlled (CNC) machining, metal-injection-molding, stamping, forging, by using a deep-draw process, or other technique. Top layer 5910 and bottom layer 5970 can be formed of synthetic, leather or other natural or man-made material. Each of the magnets shown herein, such as magnets 5940, magnet array 6140, and magnet 6162 in this example, can be formed using recycled rare-earth magnets, or other magnets or magnetic structures.

Figure 60B:
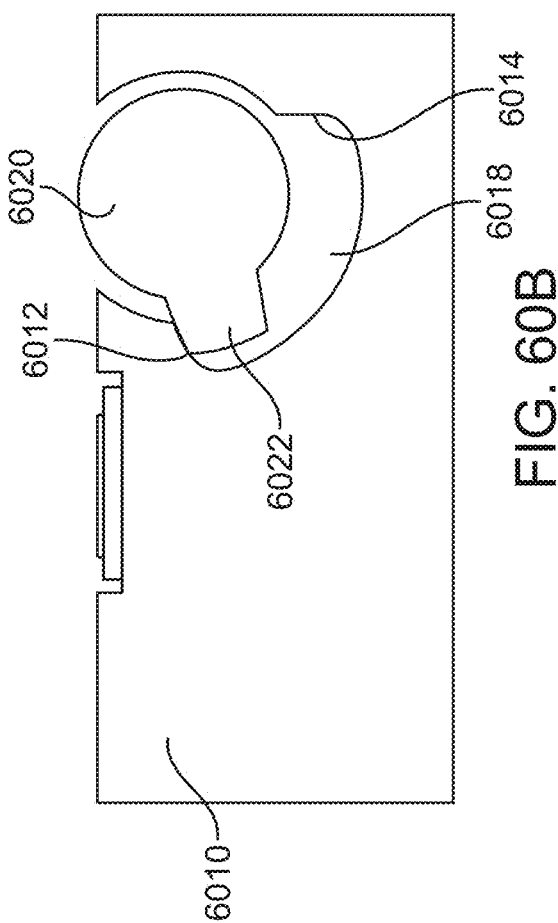
FIG. 60A and FIG. 60B illustrate a puck hinge according to an embodiment of the present invention.
Figure 60A:
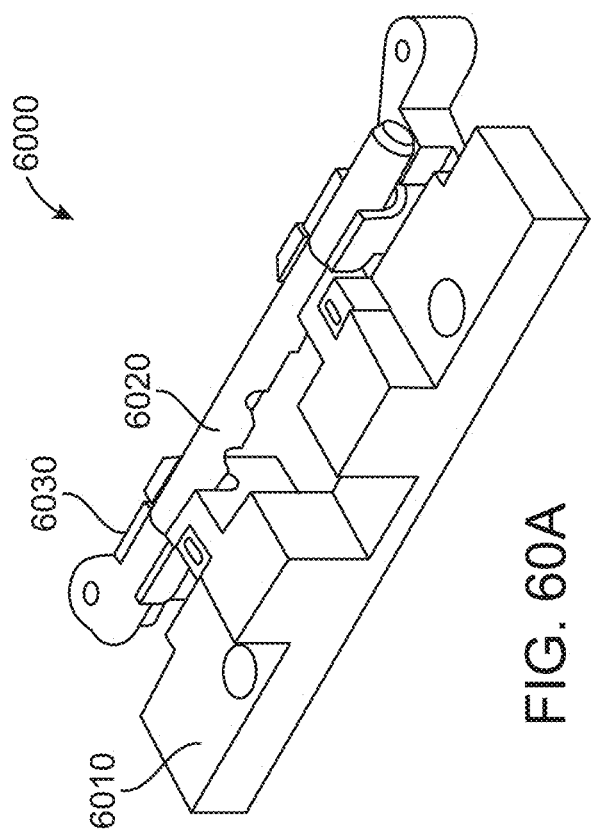

FIG. 60A and FIG. 60B illustrate a puck hinge according to an embodiment of the present invention. In this example, puck hinge 6000 can include shaft 6020. Shaft 6020 can be held in place by spring clips 6030, which can be the same or similar to spring clips 1930 (shown in FIG. 19B.) Spring clips 6030 can include tabs 6032 (shown in FIG. 61) that can be located in slots 6016 (shown in FIG. 61) of block 6010 of puck hinge 6000. Shaft 6020 can be cammed or otherwise non-cylindrical to provide a differential resistance between up-and-down movements of charging puck 6170 (shown in FIG. 59.) Arms 6034 (shown in FIG. 61) can have differing widths to provide an asymmetrical resistance to up-and-down movement of charging puck 6170, or arms 6034 can be equal to provide a symmetrical resistance to up-and-down movement of charging puck 6170.

In this example, shaft 6020 can have stops 6022 that can move between limits 6012 and limits 6014 in slots 6018. Limits 6014 can limit an upward travel of charging puck 6170 relative to a top surface of wireless charger 5900. Limits 6012 can limit a downward travel of charging puck 6170 relative to the top surface of wireless charger 5900 (shown in FIG. 59.) That is, shaft 6020 can rotate counter-clockwise (as drawn) raising charging puck 6170 until stops 6022 of shaft 6020 engage limits 6014 of slots 6018. Shaft 6020 can rotate clockwise lowering charging puck 6170 until stops 6022 of shaft 6020 engage limits 6012 of slots 6018. During assembly, shaft 6020 can be positioned such that stops 6022 engage limits 6012. Charging puck 6170 can be placed in a desired position relative to a top surface of wireless charger 5900. A stem (not shown) attached to charging puck 6170 can then be fixed to shaft 6020, for example by soldering or laser-welding. In this position, when stops 6022 return to limits 6012, charging puck 6170 can be in the desired position relative to wireless charger 5900. In these and other embodiments of the present invention, this desired position can be in a plane with a plane of a top surface of wireless charger 5900, in a plane parallel to the plane of the top surface of wireless charger 5900, or other appropriate relative position.

Figure 61:
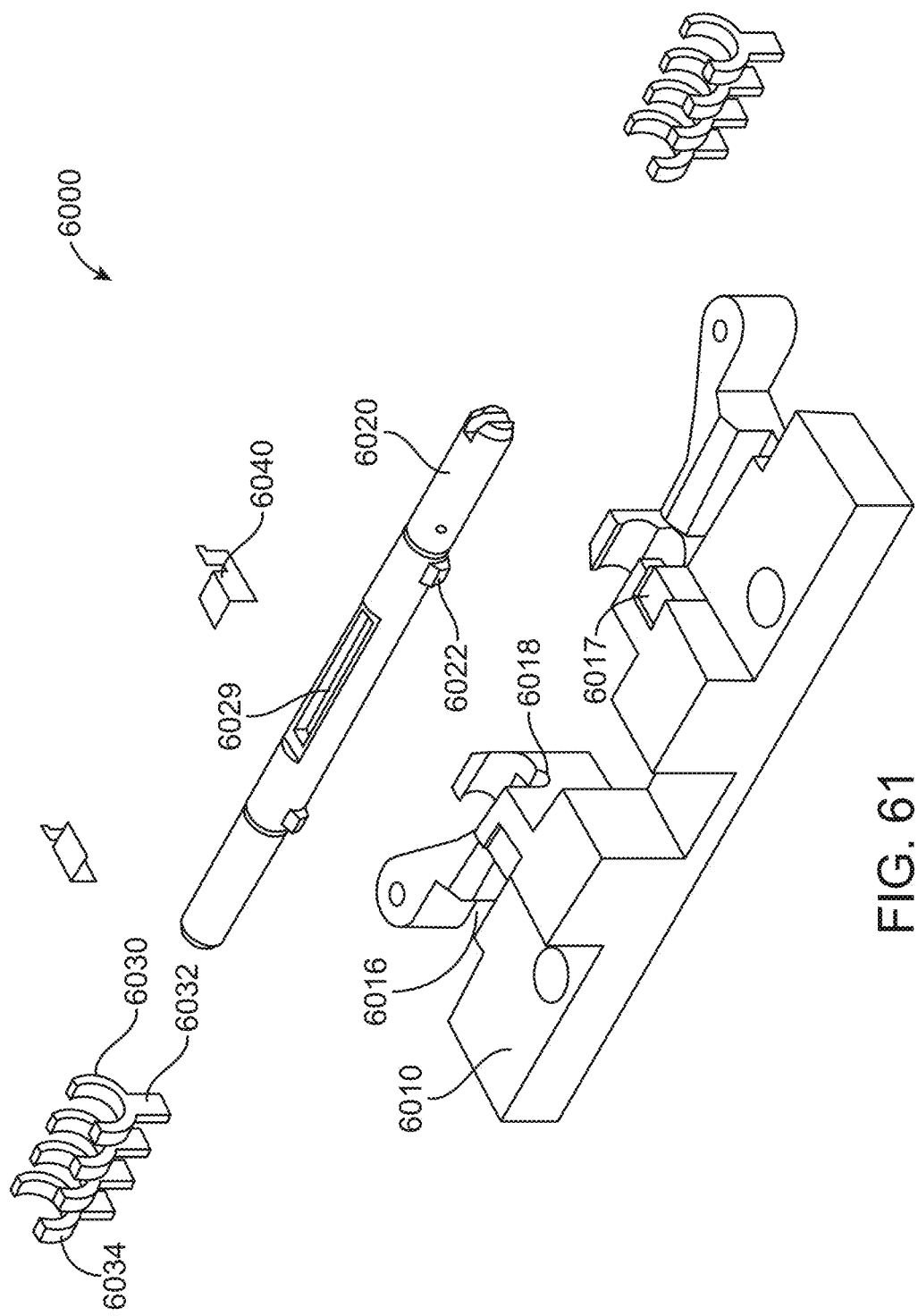
FIG. 61 illustrates a components of a puck hinge according to an embodiment of the present invention.

FIG. 61 illustrates a components of a puck hinge according to an embodiment of the present invention. In this example, puck hinge 6000 can include shaft 6020. Shaft 6020 can be held in place by spring clips 6030. Spring clip arms 6034 can have an interference fit with shaft 6020 to provide rotational friction for shaft 6020. Spring clips 6030 can include tabs 6032 that can be located in slots 6016 of block 6010 of puck hinge 6000. Tabs 6032 can have an interference fit with slots 6016. Shaft 6020 can be cammed or otherwise non-cylindrical to provide a differential resistance between up-and-down movements of charging puck 6170 (shown in FIG. 59.) Arms 6034 can have differing widths to provide an asymmetrical resistance to up-and-down movement of charging puck 6170, or arms 6034 can be equal to provide a symmetrical resistance to up-and-down movement of charging puck 6170. While spring clips 6030 can retain shaft 6020 in a vertical direction, locking clips 6040 can be attached to block 6010 at recess 6017 to help to prevent axial translation of shaft 6020, that is, the movement of shaft 6020 along its axis.

In this example, shaft 6020 can have stops 6022 that can move between limits 6012 and limits 6014 (shown in FIG. 60) in slots 6018. Two stops 6022 can be used to increase the strength of puck hinge 6000 when excess force is applied to charging puck 6170. Limits 6014 can limit an upward travel of charging puck 6170 relative to a top surface of wireless charger 5900 (shown in FIG. 59.) Limits 6012 can limit a downward travel of charging puck 6170 relative to the top surface of wireless charger 5900. That is, shaft 6020 can rotate counter-clockwise raising charging puck 6170 until stops 6022 of shaft 6020 engage limits 6014 of slots 6018. Shaft 6020 can rotate clockwise lowering charging puck 6170 until stops 6022 of shaft 6020 engages limits 6012 of slots 6018. During assembly, shaft 6020 can be positioned such that stops 6022 engage limits 6012. Charging puck 6170 can be placed in a desired position relative to a top surface of wireless charger 5900. A stem attached to charging puck 6170 can then be fixed to shaft 6020, for example by soldering or laser-welding through opening 6029 in shaft 6020. In this position, when stops 6022 return to limits 6012, charging puck 6170 can be in the desired position relative to wireless charger 5900. In these and other embodiments of the present invention, this desired position can be in a plane with a plane of a top surface of wireless charger 5900, in a plane parallel to the plane of the top surface of wireless charger 5900, or other appropriate position.

Charging puck 6170 can be attached to puck hinge 6000 via a stem. This stem can be a variation on stems shown in FIGS. 15A-15B and FIGS. 16A-16B. For example, an exit for a cable in the stem can be formed at a small or limited angle relative to the stem in order to simplify routing of the cable 414 (shown in FIG. 4) through the stem. The stem can attach to shaft 6020 along a line that is higher on the shaft. This change can help to hide cable 414 behind the stem when charging puck 6170 is in the up position. An example of such a stem is shown in the following figure.

Figure 62:
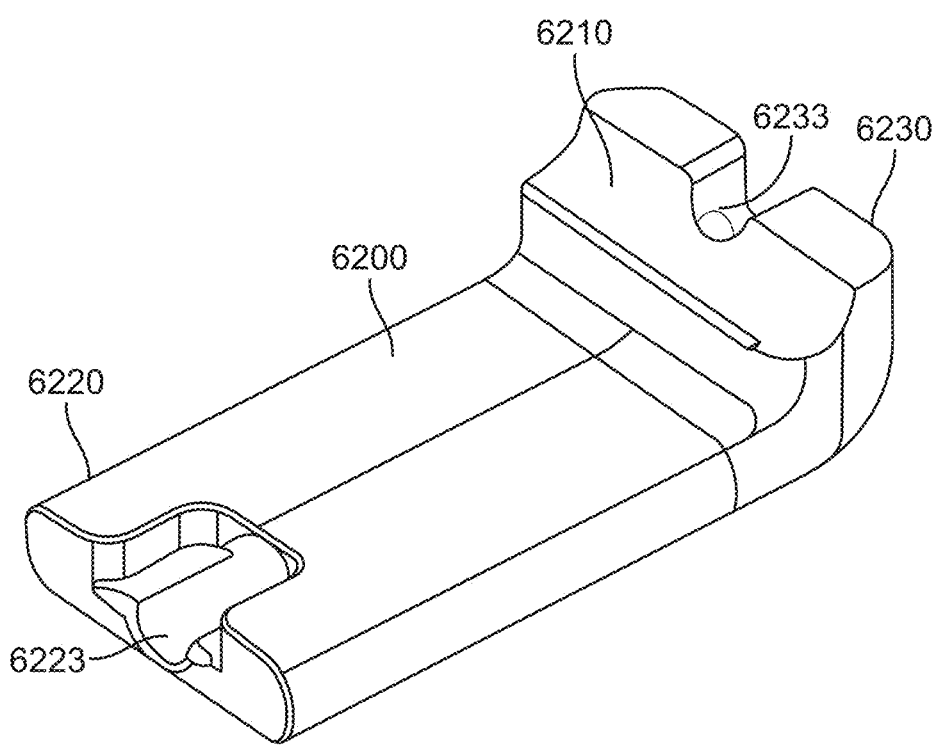
FIG. 62 illustrates a stem that can be used to attach a hinge to a charging puck according to an embodiment of the present invention.

FIG. 62 illustrates a stem that can be used to attach a puck hinge to a charging puck according to an embodiment of the present invention. Stem 6200 can attach to shaft 6020 (shown in FIG. 60) along groove 6210. Stem 6200 can be soldered or laser-welded to shaft 6020 through opening 6029 (shown in FIG. 61) in shaft 6020. End 6220 of stem 6200 can be attached to charging puck 6170 (shown in FIG. 59.) Cable 414 (shown in FIG. 4) can be routed through stem from opening 6223 at end 6220 to opening 6233 at end 6230. An angle between opening 6223 and opening 6233 can be limited (for example, less than 90 degrees) in order to facilitate routing of cable 414 through stem 6200. Groove 6210 can be positioned away from end 6230 such that end 6230 can sit lower inside wireless charger 5900 (shown in FIG. 59.) This can help to limit a visibility of cable 414 when charging puck 6170 is in an upright position.

In these and other embodiments of the present invention, it can be desirable that traces on flexible circuit board 5982 (shown in FIG. 59), as well as flexible circuit board 5982 itself, do not form visible patterns on outside surfaces of main hinge 5906 shown in FIG. 59.) That is, it can be desirable that traces on flexible circuit board 5982 not show through to a surface of wireless charger 5900. Accordingly, embodiments of the present invention can include structures to mitigate such visibility or show-through. Examples are shown in the following figures.

Figure 63:
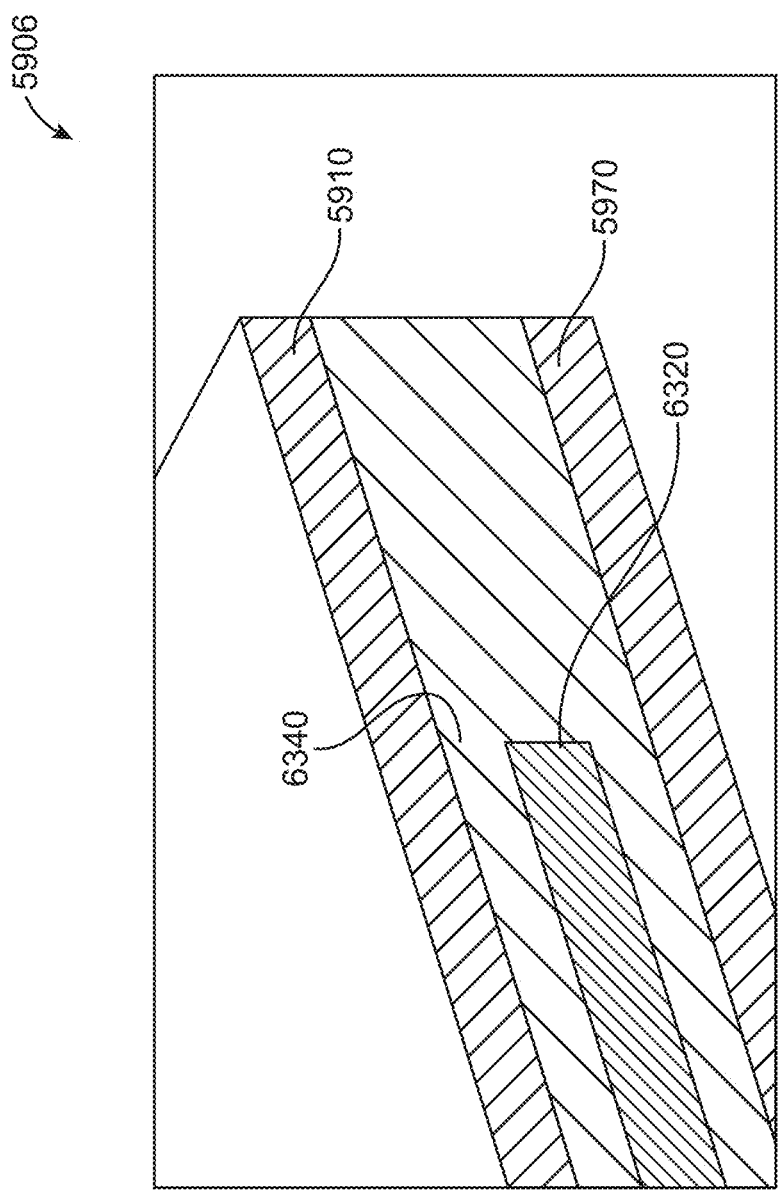
FIG. 63 illustrates a portion of a main hinge according to an embodiment of the present invention.

FIG. 63 illustrates a portion of a main hinge according to an embodiment of the present invention. In this example, flexible circuit board 5982 (shown in FIG. 65) can be part of flange spacer 6320 between top layer 5910 and bottom layer 5970. During manufacturing, molding 6340 can be applied to a bottom of top layer 5910 and a top of bottom layer 5970. With flange spacer 6320 in between, top layer 5910 and bottom layer 5970 can be compressed in a compression molding machine. This can provide a uniform surface at a top of top layer 5910 and a bottom of bottom layer 5970.

Figure 64:
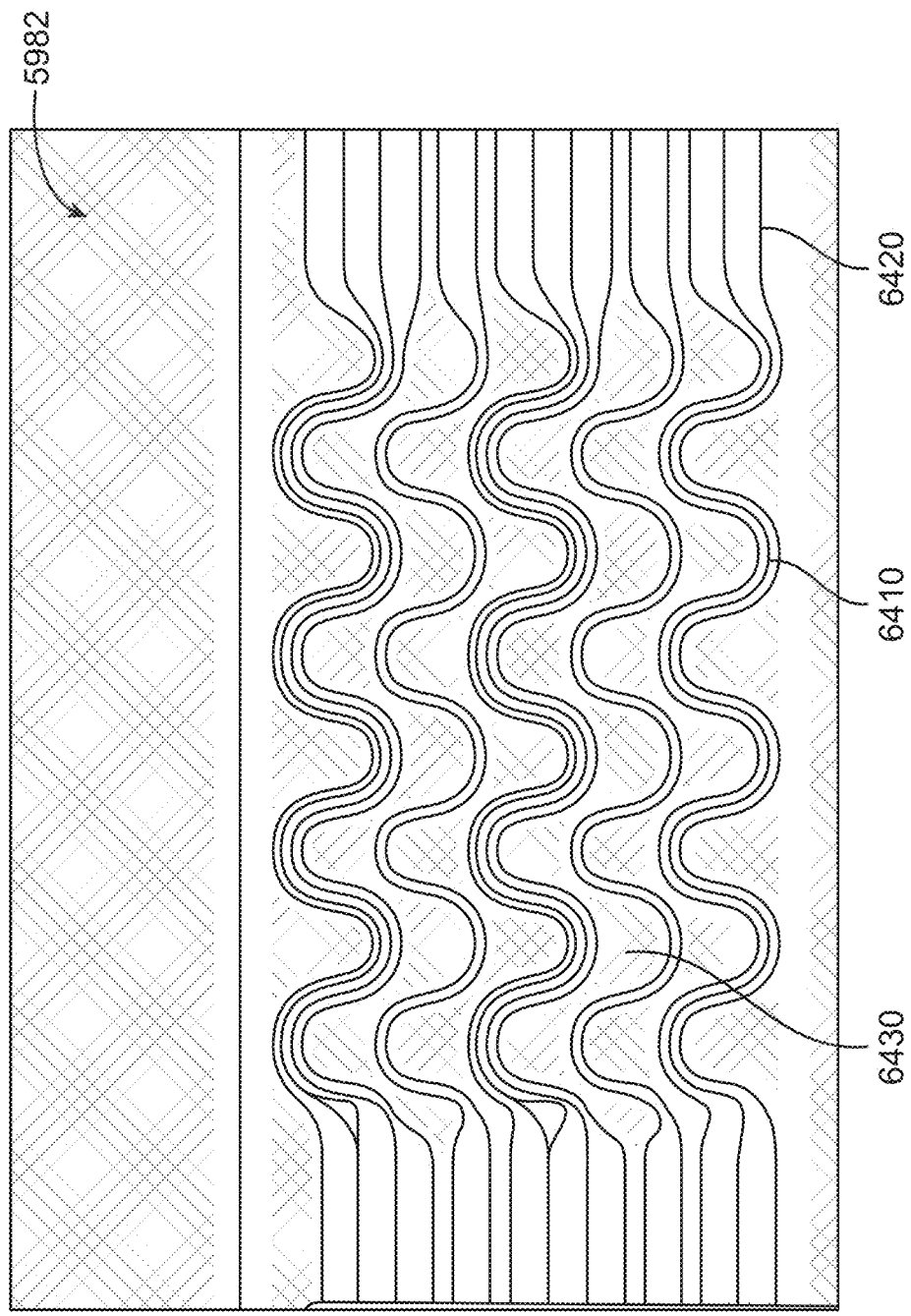
FIG. 64 illustrates an example of metallization patterns that can be used to form traces on a flexible circuit board in a main hinge according to an embodiment of the present invention.

FIG. 64 illustrates an example of metallization patterns that can be used to form traces on a flexible circuit board in a main hinge according to an embodiment of the present invention. Flexible circuit board 5982 can include traces 6410. Similar to traces 2760 (shown in FIG. 27A), traces 6410 can have a serpentine shape. Multiple traces 6410 can be nested. Traces 6410 can terminate in ends 6420. These traces 6410 can be used for one or more signals, and multiple traces 6410 can be used for redundancy.

It can be desirable to prevent traces 6410 from being visible through top layer 5910 and layers of flange spacer 6320 or bottom layer 5970 and layers of flange spacer 6320 (both shown in FIG. 59) at surfaces of main hinge 5906. Accordingly, embodiments of the present invention can provide additional metalized regions 6430 formed between, above, and below, traces 6410. Additional metalized regions 6430 can be solid, they can be perforated, they can have cross-hatched patterns, or they can be formed using other patterns. These regions can tend to shrink the size of non-metalized areas such that they do not show through layers of flange spacer 6320 and top layer 5910 or layers of flange spacer 6320 and bottom layer 5970 and appear on a surface of main hinge 5906.

Figure 65:
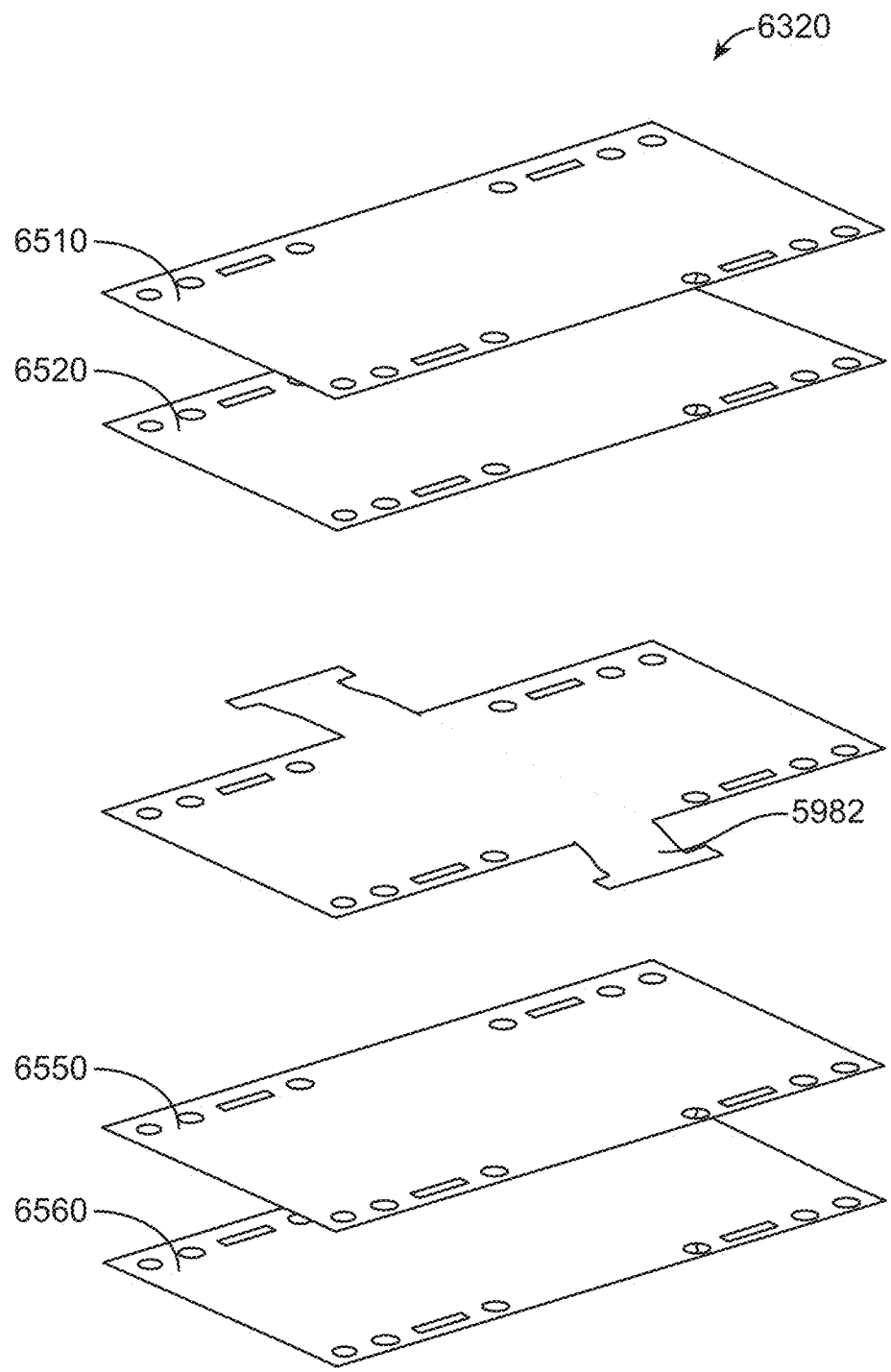
FIG. 65 illustrates a flange spacer according to an embodiment of the present invention.

FIG. 65 illustrates a flange spacer according to an embodiment of the present invention. Flange spacer 6320 can include flexible circuit board 5982 for main hinge 5906 (shown in FIG. 59.) Flexible circuit board 5982 can span the entire width of main hinge 5906. This can prevent material transitions in main hinge 5906 that could otherwise show on a surface of main hinge 5906. Flexible circuit board 5982 can be laminated with layer 6510 on a top side and layer 6560 on a bottom side. Layer 6510 and layer 6560 can be formed of taffeta or other rayon or polyester material, or other woven-fabric type material. Layer 6510 and layer 6560 can help to reduce strain on flexible circuit board 5982 when wireless charger 5900 (shown in FIG. 1) is opened and closed. Flange spacer 6320 can further include adhesive layer 6520 and adhesive layer 6550. Adhesive layer 6520 can secure layer 6510 to a top side of flexible circuit board 5982 and adhesive layer 6550 can secure layer 6560 to a bottom side of flexible circuit board 5982. Adhesive layer 6520 and adhesive layer 6550 can be formed of a pressure-sensitive adhesive, a heat-activated film, a polyimide film, or other adhesive layer.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A foldable charger comprising:
   a first leaf having a top side and a bottom side and comprising:
   a first contacting surface on the top side;
   a magnet array below the first contacting surface;
   a first coil;
   a first enclosure to support the magnet array and the first coil; and
   a first securing magnet;
   a second leaf having a top side and a bottom side and comprising:
   a charging puck;
   a second enclosure to support the charging puck; and
   a second securing magnet; and
   a main hinge joining the first leaf to the second leaf wherein the main hinge is foldable in a first direction such that the top side of the first leaf is adjacent to the top side of the second leaf and the main hinge is foldable in a second direction such that the bottom side of the first leaf is adjacent to the bottom side of the second leaf,
   and wherein when the bottom side of the first leaf is adjacent to the bottom side of the second leaf, the first securing magnet is attracted to the second securing magnet.

2. The foldable charger of claim 1 wherein when the top side of the first leaf is adjacent to the top side of the second leaf, the first securing magnet is attracted to the second securing magnet.

3. The foldable charger of claim 2 wherein the charging puck comprises:
   a magnet; and
   a second coil.

4. The foldable charger of claim 3 wherein the charging puck is attached to the second enclosure through a puck hinge.

5. The foldable charger of claim 4 wherein the magnet array aligns a first electronic device to the first contacting surface of the first leaf.

6. The foldable charger of claim 5 wherein the charging puck further comprises a second contacting surface and the magnet in the charging puck aligns a second electronic device to the second contacting surface.

7. The foldable charger of claim 6 wherein the main hinge further comprises a flexible circuit board, the flexible circuit board comprising a plurality of conductors, each of the plurality of conductors forming an electrical connection.

8. The foldable charger of claim 7 wherein each of the plurality of conductors comprises a first trace and a second trace, wherein the first trace and the second trace are connected together in the first leaf and the first trace and the second trace are connected together in the second leaf.

9. The foldable charger of claim 6 wherein the main hinge further comprises a flexible circuit board, the flexible circuit board comprising a plurality of traces forming electrical connections, wherein each of the plurality of traces forms a serpentine pattern.

10. The foldable charger of claim 9 wherein each of the plurality of traces forms a partially nested serpentine pattern.

11. The foldable charger of claim 9 wherein each of the plurality of traces forms a fully nested serpentine pattern.

12. The foldable charger of claim 6 wherein the puck hinge comprises a single pivot hinge having a single shaft.

13. The foldable charger of claim 6 wherein the puck hinge comprises a sliding hinge having a first shaft attached to the charging puck and a second shaft driven by the first shaft, wherein the second shaft comprises a pinion to engage a rack of the puck hinge.

14. A foldable charger comprising:
a first leaf having a top side and a bottom side and comprising:
a first contacting surface on the top side;
a magnet array below the first contacting surface;
a first coil; and
a first enclosure to support the magnet array and the first coil;
a second leaf having a top side and a bottom side and comprising:
a second contacting surface;
a magnet;
a second coil; and
a second enclosure to support the magnet array and the second coil; and
a main hinge joining the first leaf to the second leaf, the main hinge comprising:
a flexible circuit board, the flexible circuit board comprising a plurality of traces forming electrical connections, wherein each of the plurality of traces has a serpentine pattern,
wherein the main hinge is closeable such that the top side of the first leaf is adjacent to the top side of the second leaf and the main hinge is openable such that the first leaf can charge a first electronic device at the first contacting surface and the second leaf can charge a second electronic device at the second contacting surface.

15. The foldable charger of claim 14 wherein the second leaf further comprises a charging puck housing the magnet and the second coil and supporting the second contacting surface, wherein the charging puck is movable from a down position in the first leaf to an up position above the first leaf to charge the second electronic device.

16. The foldable charger of claim 15 wherein each electrical connection comprises a first trace and a second trace, wherein the first trace and the second trace are connected together in the first leaf and the first trace and the second trace are connected together in the second leaf.

17. The foldable charger of claim 16 wherein the magnet array is circumferentially located around the first coil and the second coil is circumferentially located around the magnet.

* * * * *